US011710382B1

(12) United States Patent
Malvagna et al.

(10) Patent No.: US 11,710,382 B1
(45) Date of Patent: ***Jul. 25, 2023

(54) DEVICES AND METHODS FOR CARRYING OUT A FANTASY SPORTS CONTEST HAVING MILESTONES

(71) Applicants: Stephen Malvagna, East Meadow, NY (US); Joseph Maranino, Bronx, NY (US)

(72) Inventors: Stephen Malvagna, East Meadow, NY (US); Joseph Maranino, Bronx, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/494,685

(22) Filed: Oct. 5, 2021

Related U.S. Application Data

(63) Continuation-in-part of application No. 17/223,627, filed on Apr. 6, 2021, now Pat. No. 11,501,611, (Continued)

(51) Int. Cl.
   *G07F 17/32* (2006.01)
   *G06F 3/0484* (2022.01)
   *G06F 3/04815* (2022.01)

(52) U.S. Cl.
   CPC ...... *G07F 17/3288* (2013.01); *G07F 17/3209* (2013.01); *G07F 17/3211* (2013.01); (Continued)

(58) Field of Classification Search
   CPC ............ G07F 17/3288; G07F 17/3209; G07F 17/3211; G07F 17/3244; G07F 17/3276; G06F 3/0484; G06F 3/04815
   See application file for complete search history.

(56) References Cited

U.S. PATENT DOCUMENTS 4,883,636 A   11/1989   Fantie, Jr.
6,296,250 B1  10/2001   Langan
(Continued)

FOREIGN PATENT DOCUMENTS

WO   2010085429 A1   7/2010
WO   2010085429 A9   11/2010
(Continued)

*Primary Examiner* — Steve Rowland
(74) *Attorney, Agent, or Firm* — Hodgson Russ LLP

(57) ABSTRACT

Disclosed herein are systems, methods, and apparatuses for managing contests that may be made available to one or more participants desiring to participate in a fantasy sports contest in which participants may use their knowledge of players and/or teams found in real-world sports. Participants are enabled to select one or more locations on a grid in order to participate in the contest, each location having been previously associated with two or more real-world players or teams. During the contest, at least one milestone is identified, the milestone being a preselected goal that may be achieved by the players or teams. When the milestone is achieved by one of the players or teams, one or more of the following may occur:
 (a) the processing apparatus indicates at least one of the participants will receive a prize;
 (b) at least one of the participants receives milestone-points, and the milestone-points are used to determine one or more winners from among the participants;
 (c) the contest ends.

42 Claims, 36 Drawing Sheets

Related U.S. Application Data which is a continuation-in-part of application No. 16/924,330, filed on Jul. 9, 2020, now Pat. No. 11,205,326.

(60) Provisional application No. 62/966,485, filed on Jan. 27, 2020, provisional application No. 62/872,043, filed on Jul. 9, 2019.

(52) U.S. Cl.
CPC ...... *G07F 17/3244* (2013.01); *G07F 17/3276* (2013.01); *G06F 3/0484* (2013.01); *G06F 3/04815* (2013.01)

(56) References Cited

U.S. PATENT DOCUMENTS

| | | | |
|---|---|---|---|
| 8,210,916 | B2 | 7/2012 | Ma et al. |
| 8,663,012 | B2 | 3/2014 | Weingardt |
| 8,992,296 | B2 | 3/2015 | Weiss et al. |
| 9,123,205 | B2 | 9/2015 | Weingardt et al. |
| 9,218,711 | B2 | 12/2015 | Weiss et al. |
| 9,361,762 | B2 | 6/2016 | Weingardt et al. |
| 9,367,996 | B2 | 6/2016 | Scalise |
| 9,652,940 | B1 | 5/2017 | Matturro |
| 9,679,446 | B2 | 6/2017 | Weiss et al. |
| 9,754,453 | B2 | 9/2017 | O'Hagan |
| 9,858,764 | B2* | 1/2018 | Maggio ............... G07F 17/3288 |
| 9,868,056 | B2 | 1/2018 | Kehoe et al. |
| 9,943,766 | B2 | 4/2018 | Balsbaugh |
| 9,965,926 | B2 | 5/2018 | Weiss et al. |
| 10,220,321 | B2 | 3/2019 | Baazov et al. |
| 10,238,956 | B2 | 3/2019 | Litman |
| 10,297,115 | B2 | 5/2019 | Maggio |
| 10,318,879 | B2 | 6/2019 | Lopez et al. |
| 10,490,028 | B1 | 11/2019 | Malizia |
| 2004/0087356 | A1 | 5/2004 | Collins |
| 2007/0004516 | A1* | 1/2007 | Jordan .................... A63F 13/46 463/42 |
| 2007/0102877 | A1 | 5/2007 | Personius et al. |
| 2007/0270202 | A1 | 11/2007 | Vostoris |
| 2008/0085770 | A1 | 4/2008 | Morgan |
| 2014/0274332 | A1* | 9/2014 | Carlin ................ G07F 17/3244 463/25 |
| 2015/0080124 | A1* | 3/2015 | Andersen ............ G07F 17/3288 463/31 |
| 2015/0179021 | A1* | 6/2015 | Alexander .......... G07F 17/3272 463/22 |
| 2016/0210815 | A1* | 7/2016 | Holt ...................... G07F 17/329 |
| 2019/0143225 | A1 | 5/2019 | Baazov et al. |
| 2019/0251463 | A1 | 8/2019 | Lopez et al. |
| 2019/0272710 | A1* | 9/2019 | Maggio ............... G07F 17/3211 |
| 2019/0279467 | A1* | 9/2019 | Saunders .............. G07F 17/326 |
| 2019/0340885 | A1 | 11/2019 | Kehoe |
| 2020/0134971 | A1* | 4/2020 | Vilardo ............... G07F 17/3223 |

FOREIGN PATENT DOCUMENTS

| | | |
|---|---|---|
| WO | 2011014675 A1 | 2/2011 |
| WO | 2014060850 A2 | 4/2014 |
| WO | 2014060850 A3 | 6/2014 |
| WO | 2014179493 A1 | 11/2014 |
| WO | 2015183335 A1 | 12/2015 |
| WO | 2016081652 A1 | 5/2016 |
| WO | 2016100942 A1 | 6/2016 |
| WO | 2016127148 A1 | 8/2016 |
| WO | 2015183335 A8 | 1/2017 |
| WO | 2017004308 A1 | 1/2017 |
| WO | 2016100942 A9 | 8/2017 |
| WO | 2018002936 A1 | 1/2018 |
| WO | 2018031829 A1 | 2/2018 |

\* cited by examiner

Fig. 1A

| TEAM 1 | | | | | | | | | | | |
|---|---|---|---|---|---|---|---|---|---|---|---|
| | 9 | 4 | 0 | 8 | 7 | 2 | 1 | 6 | 5 | 3 | |
| 6 | Name 1 | Name 2 | Name 3 | Name 4 | Name 5 | Name 6 | Name 7 | Name 8 | Name 9 | Name 10 | |
| 5 | Name 11 | Name 12 | Name 13 | Name 14 | Name 15 | Name 16 | Name 17 | Name 18 | Name 19 | Name 20 | |
| 1 | Name 21 | Name 22 | Name 23 | Name 24 | Name 25 | Name 26 | Name 27 | Name 28 | Name 29 | Name 30 | |
| 4 | Name 31 | Name 32 | Name 33 | Name 34 | Name 35 | Name 36 | Name 37 | Name 38 | Name 39 | Name 40 | |
| 9 | Name 41 | Name 42 | Name 43 | Name 44 | Name 45 | Name 46 | Name 47 | Name 48 | Name 49 | Name 50 | |
| 3 | Name 51 | Name 52 | Name 53 | Name 54 | Name 55 | Name 56 | Name 57 | Name 58 | Name 59 | Name 60 | |
| 0 | Name 61 | Name 62 | Name 63 | Name 64 | Name 65 | Name 66 | Name 67 | Name 68 | Name 69 | Name 70 | |
| 2 | Name 71 | Name 72 | Name 73 | Name 74 | Name 75 | Name 76 | Name 77 | Name 78 | Name 79 | Name 80 | |
| 8 | Name 81 | Name 82 | Name 83 | Name 84 | Name 85 | Name 86 | Name 87 | Name 88 | Name 89 | Name 90 | |
| 7 | Name 91 | Name 92 | Name 93 | Name 94 | Name 95 | Name 96 | Name 97 | Name 98 | Name 99 | Name 100 | |
| | | | | | | | | | | | TEAM 2 |

Fig. 1B

|  | PLAYER OR TEAM 1 | PLAYER OR TEAM 2 | PLAYER OR TEAM 3 | PLAYER OR TEAM 4 | PLAYER OR TEAM 5 | PLAYER OR TEAM 6 | PLAYER OR TEAM 7 | PLAYER OR TEAM 8 | PLAYER OR TEAM 9 | PLAYER OR TEAM 10 |
|---|---|---|---|---|---|---|---|---|---|---|
| PLAYER OR TEAM 11 | 1 | 2 | 3 | 4 | 5 | 6 | 7 | 8 | 9 | 10 |
| PLAYER OR TEAM 12 | 11 | 12 | 13 | 14 | 15 | 16 | 17 | 18 | 19 | 20 |
| PLAYER OR TEAM 13 | 21 | 22 | 23 | 24 | 25 | 26 | 27 | 28 | 29 | 30 |
| PLAYER OR TEAM 14 | 31 | 32 | 33 | 34 | 35 | 36 | 37 | 38 | 39 | 40 |
| PLAYER OR TEAM 15 | 41 | 42 | 43 | 44 | 45 | 46 | 47 | 48 | 49 | 50 |
| PLAYER OR TEAM 16 | 51 | 52 | 53 | 54 | 55 | 56 | 57 | 58 | 59 | 60 |
| PLAYER OR TEAM 17 | 61 | 62 | 63 | 64 | 65 | 66 | 67 | 68 | 69 | 70 |
| PLAYER OR TEAM 18 | 71 | 72 | 73 | 74 | 75 | 76 | 77 | 78 | 79 | 80 |
| PLAYER OR TEAM 19 | 81 | 82 | 83 | 84 | 85 | 86 | 87 | 88 | 89 | 90 |
| PLAYER OR TEAM 20 | 91 | 92 | 93 | 94 | 95 | 96 | 97 | 98 | 99 | 100 |

Fig. 2A

|  | PLAYER OR TEAM 11 | PLAYER OR TEAM 12 | PLAYER OR TEAM 13 | PLAYER OR TEAM 14 | PLAYER OR TEAM 15 | PLAYER OR TEAM 16 | PLAYER OR TEAM 17 | PLAYER OR TEAM 18 | PLAYER OR TEAM 19 | PLAYER OR TEAM 20 |
|---|---|---|---|---|---|---|---|---|---|---|
|  | PLAYER OR TEAM 1 | PLAYER OR TEAM 2 | PLAYER OR TEAM 3 | PLAYER OR TEAM 4 | PLAYER OR TEAM 5 | PLAYER OR TEAM 6 | PLAYER OR TEAM 7 | PLAYER OR TEAM 8 | PLAYER OR TEAM 9 | PLAYER OR TEAM 10 |
| PLAYER OR TEAM 21 / PLAYER OR TEAM 31 | 1 | 2 | 3 | 4 | 5 | 6 | 7 | 8 | 9 | 10 |
| PLAYER OR TEAM 22 / PLAYER OR TEAM 32 | 11 | 12 | 13 | 14 | 15 | 16 | 17 | 18 | 19 | 20 |
| PLAYER OR TEAM 23 / PLAYER OR TEAM 33 | 21 | 22 | 23 | 24 | 25 | 26 | 27 | 28 | 29 | 30 |
| PLAYER OR TEAM 24 / PLAYER OR TEAM 34 | 31 | 32 | 33 | 34 | 35 | 36 | 37 | 38 | 39 | 40 |
| PLAYER OR TEAM 25 / PLAYER OR TEAM 35 | 41 | 42 | 43 | 44 | 45 | 46 | 47 | 48 | 49 | 50 |
| PLAYER OR TEAM 26 / PLAYER OR TEAM 36 | 51 | 52 | 53 | 54 | 55 | 56 | 57 | 58 | 59 | 60 |
| PLAYER OR TEAM 27 / PLAYER OR TEAM 37 | 61 | 62 | 63 | 64 | 65 | 66 | 67 | 68 | 69 | 70 |
| PLAYER OR TEAM 28 / PLAYER OR TEAM 38 | 71 | 72 | 73 | 74 | 75 | 76 | 77 | 78 | 79 | 80 |
| PLAYER OR TEAM 29 / PLAYER OR TEAM 39 | 81 | 82 | 83 | 84 | 85 | 86 | 87 | 88 | 89 | 90 |
| PLAYER OR TEAM 30 / PLAYER OR TEAM 40 | 91 | 92 | 93 | 94 | 95 | 96 | 97 | 98 | 99 | 100 |

Fig. 2B

|  | PLAYER OR TEAM 1 | PLAYER OR TEAM 2 | PLAYER OR TEAM 3 | PLAYER OR TEAM 4 | PLAYER OR TEAM 5 | PLAYER OR TEAM 6 | PLAYER OR TEAM 7 | PLAYER OR TEAM 8 | PLAYER OR TEAM 9 | PLAYER OR TEAM 10 |  |
|---|---|---|---|---|---|---|---|---|---|---|---|
| PLAYER OR TEAM 31 |  |  |  |  |  |  |  |  |  |  | PLAYER OR TEAM 11 |
| PLAYER OR TEAM 32 | 1 | 2 | 3 | 4 | 5 | 6 | 7 | 8 | 9 | 10 | PLAYER OR TEAM 12 |
| PLAYER OR TEAM 33 | 11 | 12 | 13 | 14 | 15 | 16 | 17 | 18 | 19 | 20 | PLAYER OR TEAM 13 |
| PLAYER OR TEAM 34 | 21 | 22 | 23 | 24 | 25 | 26 | 27 | 28 | 29 | 30 | PLAYER OR TEAM 14 |
| PLAYER OR TEAM 35 | 31 | 32 | 33 | 34 | 35 | 36 | 37 | 38 | 39 | 40 | PLAYER OR TEAM 15 |
| PLAYER OR TEAM 36 | 41 | 42 | 43 | 44 | 45 | 46 | 47 | 48 | 49 | 50 | PLAYER OR TEAM 16 |
| PLAYER OR TEAM 37 | 51 | 52 | 53 | 54 | 55 | 56 | 57 | 58 | 59 | 60 | PLAYER OR TEAM 17 |
| PLAYER OR TEAM 38 | 61 | 62 | 63 | 64 | 65 | 66 | 67 | 68 | 69 | 70 | PLAYER OR TEAM 18 |
| PLAYER OR TEAM 39 | 71 | 72 | 73 | 74 | 75 | 76 | 77 | 78 | 79 | 80 | PLAYER OR TEAM 19 |
| PLAYER OR TEAM 40 | 81 | 82 | 83 | 84 | 85 | 86 | 87 | 88 | 89 | 90 | PLAYER OR TEAM 20 |
|  | 91 | 92 | 93 | 94 | 95 | 96 | 97 | 98 | 99 | 100 |  |
|  | PLAYER OR TEAM 21 | PLAYER OR TEAM 22 | PLAYER OR TEAM 23 | PLAYER OR TEAM 24 | PLAYER OR TEAM 25 | PLAYER OR TEAM 26 | PLAYER OR TEAM 27 | PLAYER OR TEAM 28 | PLAYER OR TEAM 29 | PLAYER OR TEAM 30 |  |

Fig. 2C

| PLAYER | POINTS |
|---|---|
| PLAYER OR TEAM 1 | 12 |
| PLAYER OR TEAM 2 | 3 |
| PLAYER OR TEAM 3 | 6 |
| PLAYER OR TEAM 4 | 14 |
| PLAYER OR TEAM 5 | 11 |
| PLAYER OR TEAM 6 | 10 |
| PLAYER OR TEAM 7 | 12 |
| PLAYER OR TEAM 8 | 6 |
| PLAYER OR TEAM 9 | 4 |
| PLAYER OR TEAM 10 | 9 |

| PLAYER | POINTS |
|---|---|
| PLAYER OR TEAM 11 | 4 |
| PLAYER OR TEAM 12 | 10 |
| PLAYER OR TEAM 13 | 3 |
| PLAYER OR TEAM 14 | 7 |
| PLAYER OR TEAM 15 | 18 |
| PLAYER OR TEAM 16 | 16 |
| PLAYER OR TEAM 17 | 1 |
| PLAYER OR TEAM 18 | 14 |
| PLAYER OR TEAM 19 | 8 |
| PLAYER OR TEAM 20 | 2 |

Fig. 3

| PLAYER | POINTS |
|---|---|
| PLAYER OR TEAM 1 | 12 |
| PLAYER OR TEAM 2 | 3 |
| PLAYER OR TEAM 3 | 6 |
| PLAYER OR TEAM 4 | 14 |
| PLAYER OR TEAM 5 | 11 |
| PLAYER OR TEAM 6 | 10 |
| PLAYER OR TEAM 7 | 12 |
| PLAYER OR TEAM 8 | 6 |
| PLAYER OR TEAM 9 | 4 |
| PLAYER OR TEAM 10 | 9 |

| PLAYER | POINTS |
|---|---|
| PLAYER OR TEAM 11 | 4 |
| PLAYER OR TEAM 12 | 10 |
| PLAYER OR TEAM 13 | 3 |
| PLAYER OR TEAM 14 | 7 |
| PLAYER OR TEAM 15 | 18 |
| PLAYER OR TEAM 16 | 15 |
| PLAYER OR TEAM 17 | 1 |
| PLAYER OR TEAM 18 | 14 |
| PLAYER OR TEAM 19 | 8 |
| PLAYER OR TEAM 20 | 2 |

|  | PLAYER OR TEAM 1 | PLAYER OR TEAM 2 | PLAYER OR TEAM 3 | PLAYER OR TEAM 4 | PLAYER OR TEAM 5 | PLAYER OR TEAM 6 | PLAYER OR TEAM 7 | PLAYER OR TEAM 8 | PLAYER OR TEAM 9 | PLAYER OR TEAM 10 |
|---|---|---|---|---|---|---|---|---|---|---|
| PLAYER OR TEAM 11 | 1 | 2 | 3 | 4 | 5 | 6 | 7 | 8 | 9 | 10 |
| PLAYER OR TEAM 12 | 11 | 12 | 13 | 14 | 15 | 16 | 17 | 18 | 19 | 20 |
| PLAYER OR TEAM 13 | 21 | 22 | 23 | 24 | 25 | 26 | 27 | 28 | 29 | 30 |
| PLAYER OR TEAM 14 | 31 | 32 | 33 | 34 | 35 | 36 | 37 | 38 | 39 | 40 |
| PLAYER OR TEAM 15 | 41 | 42 | 43 | 44 | 45 | 46 | 47 | 48 | 49 | 50 |
| PLAYER OR TEAM 16 | 51 | 52 | 53 | 54 | 55 | 56 | 57 | 58 | 59 | 60 |
| PLAYER OR TEAM 17 | 61 | 62 | 63 | 64 | 65 | 66 | 67 | 68 | 69 | 70 |
| PLAYER OR TEAM 18 | 71 | 72 | 73 | 74 | 75 | 76 | 77 | 78 | 79 | 80 |
| PLAYER OR TEAM 19 | 81 | 82 | 83 | 84 | 85 | 86 | 87 | 88 | 89 | 90 |
| PLAYER OR TEAM 20 | 91 | 92 | 93 | 94 | 95 | 96 | 97 | 98 | 99 | 100 |

Fig. 4

| | PLAYER OR TEAM 1 | PLAYER OR TEAM 2 | PLAYER OR TEAM 3 | PLAYER OR TEAM 4 | PLAYER OR TEAM 5 | PLAYER OR TEAM 6 | PLAYER OR TEAM 7 | PLAYER OR TEAM 8 | PLAYER OR TEAM 9 | PLAYER OR TEAM 10 |
|---|---|---|---|---|---|---|---|---|---|---|
| PLAYER OR TEAM 11 | 1 | 2 | 3 | 4 | 5 | 6 | 7 | 8 | 9 | 10 |
| PLAYER OR TEAM 12 | 11 | 12 | 13 | 14 | 15 | 16 | 17 | 18 | 19 | 20 |
| PLAYER OR TEAM 13 | 21 | 22 | 23 | 24 | 25 | 26 | 27 | 28 | 29 | 30 |
| PLAYER OR TEAM 14 | 31 | 32 | 33 | 34 | 35 | 36 | 37 | 38 | 39 | 40 |
| PLAYER OR TEAM 15 | 41 | 42 | 43 | 44 | 45 | 46 | 47 | 48 | 49 | 50 |
| PLAYER OR TEAM 16 | 51 | 52 | 53 | 54 | 55 | 56 | 57 | 58 | 59 | 60 |
| PLAYER OR TEAM 17 | 61 | 62 | 63 | 64 | 65 | 66 | 67 | 68 | 69 | 70 |
| PLAYER OR TEAM 18 | 71 | 72 | 73 | 74 | 75 | 76 | 77 | 78 | 79 | 80 |
| PLAYER OR TEAM 19 | 81 | 82 | 83 | 84 | 85 | 86 | 87 | 88 | 89 | 90 |
| PLAYER OR TEAM 20 | 91 | 92 | 93 | 94 | 95 | 96 | 97 | 98 | 99 | 100 |

STEP 1 - REVIEW PLAYERS OR TEAM

STEP 3 - TRACK YOUR TEAM WITH LIVE SCORE UPDATES

| PLAYER OR TEAM | PLAYER OR TEAM 1 | PLAYER OR TEAM 2 | PLAYER OR TEAM 3 | PLAYER OR TEAM 4 | PLAYER OR TEAM 5 | PLAYER OR TEAM 6 | PLAYER OR TEAM 7 | PLAYER OR TEAM 8 | PLAYER OR TEAM 9 | PLAYER OR TEAM 10 |
|---|---|---|---|---|---|---|---|---|---|---|
| PLAYER OR TEAM 11 | NAME 1 | NAME 2 | NAME 3 | NAME 4 | NAME 5 | NAME 6 | NAME 7 | NAME 8 | NAME 9 | NAME 10 |
| PLAYER OR TEAM 12 | NAME 11 | NAME 12 | NAME 13 | NAME 14 | NAME 15 | NAME 16 | NAME 17 | NAME 18 | NAME 19 | NAME 20 |
| PLAYER OR TEAM 13 | NAME 21 | NAME 22 | NAME 23 | NAME 24 | NAME 25 | NAME 26 | NAME 27 | NAME 28 | NAME 29 | NAME 30 |
| PLAYER OR TEAM 14 | NAME 31 | NAME 32 | NAME 33 | NAME 34 | NAME 35 | NAME 36 | NAME 37 | NAME 38 | NAME 39 | NAME 40 |
| PLAYER OR TEAM 15 | NAME 41 | NAME 42 | NAME 43 | NAME 44 | NAME 45 | NAME 46 | NAME 47 | NAME 48 | NAME 49 | NAME 50 |
| PLAYER OR TEAM 16 | NAME 51 | NAME 52 | NAME 53 | NAME 54 | NAME 55 | NAME 56 | NAME 57 | NAME 58 | NAME 59 | NAME 60 |
| PLAYER OR TEAM 17 | NAME 61 | NAME 62 | NAME 63 | NAME 64 | NAME 65 | NAME 66 | NAME 67 | NAME 68 | NAME 69 | NAME 70 |
| PLAYER OR TEAM 18 | NAME 71 | NAME 72 | NAME 73 | NAME 74 | NAME 75 | NAME 76 | NAME 77 | NAME 78 | NAME 79 | NAME 80 |
| PLAYER OR TEAM 19 | NAME 81 | NAME 82 | NAME 83 | NAME 84 | NAME 85 | NAME 86 | NAME 87 | NAME 88 | NAME 89 | NAME 90 |
| PLAYER OR TEAM 20 | NAME 91 | NAME 92 | NAME 93 | NAME 94 | NAME 95 | NAME 96 | NAME 97 | NAME 98 | NAME 99 | NAME 100 |

| PLAYER | POINTS |
|---|---|
| PLAYER OR TEAM 1 | 12 |
| PLAYER OR TEAM 2 | 3 |
| PLAYER OR TEAM 3 | 6 |
| PLAYER OR TEAM 4 | 14 |
| PLAYER OR TEAM 5 | 11 |
| PLAYER OR TEAM 6 | 10 |
| PLAYER OR TEAM 7 | 12 |
| PLAYER OR TEAM 8 | 6 |
| PLAYER OR TEAM 9 | 4 |
| PLAYER OR TEAM 10 | 9 |

| PLAYER | POINTS |
|---|---|
| PLAYER OR TEAM 11 | 4 |
| PLAYER OR TEAM 12 | 10 |
| PLAYER OR TEAM 13 | 3 |
| PLAYER OR TEAM 14 | 7 |
| PLAYER OR TEAM 15 | 18 |
| PLAYER OR TEAM 16 | 16 |
| PLAYER OR TEAM 17 | 1 |
| PLAYER OR TEAM 18 | 14 |
| PLAYER OR TEAM 19 | 8 |
| PLAYER OR TEAM 20 | 2 |

| | PLAYER OR TEAM 1 | PLAYER OR TEAM 2 | PLAYER OR TEAM 3 | PLAYER OR TEAM 4 | PLAYER OR TEAM 5 | PLAYER OR TEAM 6 | PLAYER OR TEAM 7 | PLAYER OR TEAM 8 | PLAYER OR TEAM 9 | PLAYER OR TEAM 10 |
|---|---|---|---|---|---|---|---|---|---|---|
| PLAYER OR TEAM 11 | 1 | 2 | 3 | 4 | 5 | 6 | 7 | 8 | 9 | 10 |
| PLAYER OR TEAM 12 | 11 | 12 | 13 | 14 | 15 | 16 | 17 | 18 | 19 | 20 |
| PLAYER OR TEAM 13 | 21 | 22 | 23 | 24 | 25 | 26 | 27 | 28 | 29 | 30 |
| PLAYER OR TEAM 14 | 31 | 32 | 33 | 34 | 35 | 36 | 37 | 38 | 39 | 40 |
| PLAYER OR TEAM 15 | 41 | 42 | 43 | 44 | 45 | 46 | 47 | 48 | 49 | 50 |
| PLAYER OR TEAM 16 | 51 | 52 | 53 | 54 | 55 | 56 | 57 | 58 | 59 | 60 |
| PLAYER OR TEAM 17 | 61 | 62 | 63 | 64 | 65 | 66 | 67 | 68 | 69 | 70 |
| PLAYER OR TEAM 18 | 71 | 72 | 73 | 74 | 75 | 76 | 77 | 78 | 79 | 80 |
| PLAYER OR TEAM 19 | 81 | 82 | 83 | 84 | 85 | 86 | 87 | 88 | 89 | 90 |
| PLAYER OR TEAM 20 | 91 | 92 | 93 | 94 | 95 | 96 | 97 | 98 | 99 | 100 |

Fig. 12

| | PLAYER OR TEAM 11 | PLAYER OR TEAM 12 | PLAYER OR TEAM 13 | PLAYER OR TEAM 14 | PLAYER OR TEAM 15 | PLAYER OR TEAM 16 | PLAYER OR TEAM 17 | PLAYER OR TEAM 18 | PLAYER OR TEAM 19 | PLAYER OR TEAM 20 |
|---|---|---|---|---|---|---|---|---|---|---|
| | PLAYER OR TEAM 1 | PLAYER OR TEAM 2 | PLAYER OR TEAM 3 | PLAYER OR TEAM 4 | PLAYER OR TEAM 5 | PLAYER OR TEAM 6 | PLAYER OR TEAM 7 | PLAYER OR TEAM 8 | PLAYER OR TEAM 9 | PLAYER OR TEAM 10 |
| | 1 | 2 | 3 | 4 | 5 | 6 | 7 | 8 | 9 | 10 |
| PLAYER OR TEAM 21 | 11 | 12 | 13 | 14 | 15 | 16 | 17 | 18 | 19 | 20 |
| PLAYER OR TEAM 22 | 21 | 22 | 23 | 24 | 25 | 26 | 27 | 28 | 29 | 30 |
| PLAYER OR TEAM 23 | 31 | 32 | 33 | 34 | 35 | 36 | 37 | 38 | 39 | 40 |
| PLAYER OR TEAM 24 | 41 | 42 | 43 | 44 | 45 | 46 | 47 | 48 | 49 | 50 |
| PLAYER OR TEAM 25 | 51 | 52 | 53 | 54 | 55 | 56 | 57 | 58 | 59 | 60 |
| PLAYER OR TEAM 26 | 61 | 62 | 63 | 64 | 65 | 66 | 67 | 68 | 69 | 70 |
| PLAYER OR TEAM 27 | 71 | 72 | 73 | 74 | 75 | 76 | 77 | 78 | 79 | 80 |
| PLAYER OR TEAM 28 | 81 | 82 | 83 | 84 | 85 | 86 | 87 | 88 | 89 | 90 |
| PLAYER OR TEAM 29 | 91 | 92 | 93 | 94 | 95 | 96 | 97 | 98 | 99 | 100 |
| PLAYER OR TEAM 30 | | | | | | | | | | |
| PLAYER OR TEAM 31 | | | | | | | | | | |
| PLAYER OR TEAM 32 | | | | | | | | | | |
| PLAYER OR TEAM 33 | | | | | | | | | | |
| PLAYER OR TEAM 34 | | | | | | | | | | |
| PLAYER OR TEAM 35 | | | | | | | | | | |
| PLAYER OR TEAM 36 | | | | | | | | | | |
| PLAYER OR TEAM 37 | | | | | | | | | | |
| PLAYER OR TEAM 38 | | | | | | | | | | |
| PLAYER OR TEAM 39 | | | | | | | | | | |
| PLAYER OR TEAM 40 | | | | | | | | | | |

Fig. 13

| | PLAYER OR TEAM 1 | PLAYER OR TEAM 2 | PLAYER OR TEAM 3 | PLAYER OR TEAM 4 | PLAYER OR TEAM 5 | PLAYER OR TEAM 6 | PLAYER OR TEAM 7 | PLAYER OR TEAM 8 | PLAYER OR TEAM 9 | PLAYER OR TEAM 10 | |
|---|---|---|---|---|---|---|---|---|---|---|---|
| | 1 | 2 | 3 | 4 | 5 | 6 | 7 | 8 | 9 | 10 | PLAYER OR TEAM 11 |
| PLAYER OR TEAM 31 | 11 | 12 | 13 | 14 | 15 | 16 | 17 | 18 | 19 | 20 | PLAYER OR TEAM 12 |
| PLAYER OR TEAM 32 | 21 | 22 | 23 | 24 | 25 | 26 | 27 | 28 | 29 | 30 | PLAYER OR TEAM 13 |
| PLAYER OR TEAM 33 | 31 | 32 | 33 | 34 | 35 | 36 | 37 | 38 | 39 | 40 | PLAYER OR TEAM 14 |
| PLAYER OR TEAM 34 | 41 | 42 | 43 | 44 | 45 | 46 | 47 | 48 | 49 | 50 | PLAYER OR TEAM 15 |
| PLAYER OR TEAM 35 | 51 | 52 | 53 | 54 | 55 | 56 | 57 | 58 | 59 | 60 | PLAYER OR TEAM 16 |
| PLAYER OR TEAM 36 | 61 | 62 | 63 | 64 | 65 | 66 | 67 | 68 | 69 | 70 | PLAYER OR TEAM 17 |
| PLAYER OR TEAM 37 | 71 | 72 | 73 | 74 | 75 | 76 | 77 | 78 | 79 | 80 | PLAYER OR TEAM 18 |
| PLAYER OR TEAM 38 | 81 | 82 | 83 | 84 | 85 | 86 | 87 | 88 | 89 | 90 | PLAYER OR TEAM 19 |
| PLAYER OR TEAM 39 | 91 | 92 | 93 | 94 | 95 | 96 | 97 | 98 | 99 | 100 | PLAYER OR TEAM 20 |
| PLAYER OR TEAM 40 | PLAYER OR TEAM 21 | PLAYER OR TEAM 22 | PLAYER OR TEAM 23 | PLAYER OR TEAM 24 | PLAYER OR TEAM 25 | PLAYER OR TEAM 26 | PLAYER OR TEAM 27 | PLAYER OR TEAM 28 | PLAYER OR TEAM 29 | PLAYER OR TEAM 30 | |

Fig. 14

|  | PLAYER OR TEAM 1 | PLAYER OR TEAM 2 | PLAYER OR TEAM 3 | PLAYER OR TEAM 4 | PLAYER OR TEAM 5 | PLAYER OR TEAM 6 | PLAYER OR TEAM 7 | PLAYER OR TEAM 8 | PLAYER OR TEAM 9 | PLAYER OR TEAM 10 |
|---|---|---|---|---|---|---|---|---|---|---|
| PLAYER OR TEAM 11 | 1 | 2 | 3 | 4 | 5 | 6 | 7 | 8 | 9 | 10 |
| PLAYER OR TEAM 12 | 11 | 12 | 13 | 14 | 15 | 16 | 17 | 18 | 19 | 20 |
| PLAYER OR TEAM 13 | 21 | 22 | 23 | 24 | 25 | 26 | 27 | 28 | 29 | 30 |
| PLAYER OR TEAM 14 | 31 | 32 | 33 | 34 | 35 | 36 | 37 | 38 | 39 | 40 |
| PLAYER OR TEAM 15 | 41 | 42 | 43 | 44 | 45 | 46 | 47 | 48 | 49 | 50 |
| PLAYER OR TEAM 16 | 51 | 52 | 53 | 54 | 55 | 56 | 57 | 58 | 59 | 60 |
| PLAYER OR TEAM 17 | 61 | 62 | 63 | 64 | 65 | 66 | 67 | 68 | 69 | 70 |
| PLAYER OR TEAM 18 | 71 | 72 | 73 | 74 | 75 | 76 | 77 | 78 | 79 | 80 |
| PLAYER OR TEAM 19 | 81 | 82 | 83 | 84 | 85 | 86 | 87 | 88 | 89 | 90 |
| PLAYER OR TEAM 20 | 91 | 92 | 93 | 94 | 95 | 96 | 97 | 98 | 99 | 100 |

CHOOSE YOUR WILDCARD TEAM

| WILDCARD TEAM 1 | WILDCARD TEAM 2 | WILDCARD TEAM 3 |
|---|---|---|

Fig. 16

|  | PLAYER OR TEAM 1 | PLAYER OR TEAM 2 | PLAYER OR TEAM 3 | PLAYER OR TEAM 4 | PLAYER OR TEAM 5 | PLAYER OR TEAM 6 | PLAYER OR TEAM 7 | PLAYER OR TEAM 8 | PLAYER OR TEAM 9 | PLAYER OR TEAM 10 |
|---|---|---|---|---|---|---|---|---|---|---|
| PLAYER OR TEAM 11 | 1 | 2 | 3 | 4 | 5 | 6 | 7 | 8 | 9 | 10 |
| PLAYER OR TEAM 12 | 11 | 12 | 13 | 14 | 15 | 16 | 17 | 18 | 19 | 20 |
| PLAYER OR TEAM 13 | 21 | 22 | 23 | 24 | 25 | 26 | 27 | 28 | 29 | 30 |
| PLAYER OR TEAM 14 | 31 | 32 | 33 | 34 | 35 | 36 | 37 | 38 | 39 | 40 |
| PLAYER OR TEAM 15 | 41 | 42 | 43 | 44 | 45 | 46 | 47 | 48 | 49 | 50 |
| PLAYER OR TEAM 16 | 51 | 52 | 53 | 54 | 55 | 56 | 57 | 58 | 59 | 60 |
| PLAYER OR TEAM 17 | 61 | 62 | 63 | 64 | 65 | 66 | 67 | 68 | 69 | 70 |
| PLAYER OR TEAM 18 | 71 | 72 | 73 | 74 | 75 | 76 | 77 | 78 | 79 | 80 |
| PLAYER OR TEAM 19 | 81 | 82 | 83 | 84 | 85 | 86 | 87 | 88 | 89 | 90 |
| PLAYER OR TEAM 20 | 91 | 92 | 93 | 94 | 95 | 96 | 97 | 98 | 99 | 100 |

CHOOSE YOUR WILDCARD TEAM

| WILDCARD TEAM 1 | WILDCARD TEAM 2 | WILDCARD TEAM 3 |
|---|---|---|

Fig. 18

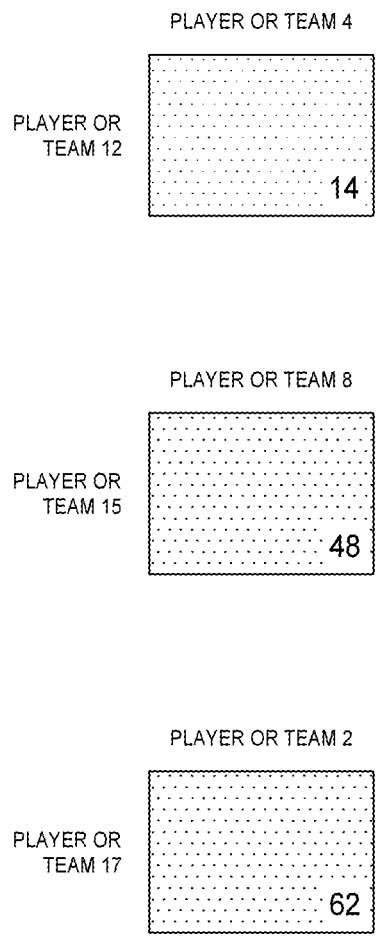
Fig. 19

|  | PLAYER OR TEAM 1 | PLAYER OR TEAM 2 | PLAYER OR TEAM 3 | PLAYER OR TEAM 4 | PLAYER OR TEAM 5 | PLAYER OR TEAM 6 | PLAYER OR TEAM 7 | PLAYER OR TEAM 8 | PLAYER OR TEAM 9 | PLAYER OR TEAM 10 |
|---|---|---|---|---|---|---|---|---|---|---|
| PLAYER OR TEAM 11 | 1 | 2 | 3 | 4 | 5 | 6 | 7 | 8 | 9 | 10 |
| PLAYER OR TEAM 12 | 11 | 12 | 13 | 14 | 15 | 16 | 17 | 18 | 19 | 20 |
| PLAYER OR TEAM 13 | 21 | 22 | 23 | 24 | 25 | 26 | 27 | 28 | 29 | 30 |
| PLAYER OR TEAM 14 | 31 | 32 | 33 | 34 | 35 | 36 | 37 | 38 | 39 | 40 |
| PLAYER OR TEAM 15 | 41 | 42 | 43 | 44 | 45 | 46 | 47 | 48 | 49 | 50 |
| PLAYER OR TEAM 16 | 51 | 52 | 53 | 54 | 55 | 56 | 57 | 58 | 59 | 60 |
| PLAYER OR TEAM 17 | 61 | 62 | 63 | 64 | 65 | 66 | 67 | 68 | 69 | 70 |
| PLAYER OR TEAM 18 | 71 | 72 | 73 | 74 | 75 | 76 | 77 | 78 | 79 | 80 |
| PLAYER OR TEAM 19 | 81 | 82 | 83 | 84 | 85 | 86 | 87 | 88 | 89 | 90 |
| PLAYER OR TEAM 20 | 91 | 92 | 93 | 94 | 95 | 96 | 97 | 98 | 99 | 100 |

CHOOSE YOUR WILDCARD TEAM

| WILDCARD TEAM 1 | WILDCARD TEAM 2 | WILDCARD TEAM 3 |
|---|---|---|

Fig. 22

DEVICES AND METHODS FOR CARRYING OUT A FANTASY SPORTS CONTEST HAVING MILESTONES

CROSS-REFERENCE TO RELATED APPLICATIONS

This application is a continuation-in-part of U.S. patent application Ser. No. 17/223,627 (filed Apr. 6, 2021), which is a continuation-in-part of and claims the benefit of U.S. patent application Ser. No. 16/924,330 (filed Jul. 9, 2020), which in turn claims the benefit of U.S. Provisional Patent Application No. 62/966,485 (filed Jan. 27, 2020), and the benefit of U.S. Provisional Patent Application No. 62/872,043 (filed Jul. 9, 2019), all of which are incorporated herein by reference.

BACKGROUND OF THE DISCLOSURE

For the purpose of illustrating and characterizing features of our invention, we describe a prior art method that is commonly used in conjunction with sports contests, such as the National Football League's Super Bowl. This pre-existing contest involves two teams playing in the Super Bowl, one team representing the NFC (Team 1 in FIG. 1A) and one team representing the AFC (Team 2 in FIG. 1A). The name of Team 1 is associated with a row of a grid, and the name of Team 2 is associated with a column of the grid. In this arrangement, each box is associated with a particular row and a particular column, and thus each box is associated with the Team names identified for the corresponding row and column. Each participant selects one or more of the available boxes in order to compete in this contest. FIG. 1A) displays the resulting grid. After all participants have selected boxes of the grid, a randomly-selected number from 0 to 9 is placed above each column of boxes, and a randomly-selected number from 0 to 9 is placed next to each row of boxes of the grid (i.e., one randomized number placed above each of the top most boxes and one randomized number placed vertically adjacent to the left most boxes). With this arrangement, each box now correlates with one number horizontally (representing the final score of Team 1) and one number vertically (representing the final score of Team 2). FIG. 1B displays the resulting grid. The second digit of the score achieved by Team 1, and the second digit of the score achieved by Team 2 will correlate to two of the numbers on the grid (one number horizontally and one number vertically). The participant, who previously selected the box that corresponds to those two numbers both horizontally (Team 1) and vertically (Team 2), is the winning participant of the contest. For example, with reference to FIG. 1C, if Team 1 had a score of 24 and Team 2 had a score of 21, then box number 22 would be the winning box for the contest because box 22 corresponds with the row having number "1" and the column having number "4". A problem existing with this previous method is that it is a game-of-chance, largely because the participant selects a box without knowledge of the numbers that ultimately will be placed on the grid prior to the game (e.g., the Super Bowl), both horizontally and vertically, to reflect the final scores of the two teams.

In some embodiments of the invention, one or more milestones may be established, and upon reaching a milestone, a participant in the fantasy sports contest may receive a benefit. For example, a milestone may be a preselected goal that may be achieved by the players or teams that are competing in a sports event. If that goal is achieved by the players or the teams, the benefit may be awarded to a contest participant.

For example, one or more of the milestones may focus on specific instances that occur when a player, players, team, and/or teams in a sports event achieve a designated score within a game, and if that designated score is achieved, then the contestant in the fantasy sports contest that is associated with that designated score is awarded a benefit, such as a preselected prize, or a predetermined number of points that may be used to determine a winner of the fantasy sports contest. Alternatively, or in addition, if a player, players, team, teams participating in the sports contest reaches a milestone, the fantasy sports contest may be ended, and a winner selected. Unlike some prior-art contests, the benefit may be awarded at the time the milestone is reached, rather than at a predetermined time during the sporting event. Alternatively, the invention may be carried out so that milestones are evaluated at predetermined times, and at those predetermined times the benefits for any milestones reached may be awarded.

As specific examples of milestones that may be used according to the present invention, a milestone may be established that awards a benefit when:
(a) a player or team achieves both a touchdown and a field goal in a football game; or
(b) a player or team hits a homerun, or a double in a baseball game; or
(c) a player or team steals a base in a baseball game; or
(d) a 3-point shot is made in a basketball gamey or
(e) a goal and an assist is achieved by the same player in a hockey game.

To be clear, it is entirely possible that one or more milestones may not be achieved during a sporting event.

SUMMARY OF THE DISCLOSURE

The invention may be embodied as an online fantasy sports contest. The invention allows participants to compete for prizes in a contest wherein the performance of real-world sports player(s) and/or team(s) ("P(s)aoT(s)") in, for example, professional or amateur sporting events may result in assigning fantasy points that are correlated to that performance. The contest may utilize a grid or multiple grids featuring initially blank boxes, which for ease of reference are numbered in the attached drawings. Participants in the contest can select one or more of these boxes. Each box correlates with a row (horizontally) and a column (vertically), each of which may be associated with one or more names ("Name") of P(s)aoT(s) so that each box corresponds to two players (a player's Name in the column and a player's Name the row), two teams (a team name in the column and a team name in the row), more than two players (multiple player Names in the column, and multiple player Names in the row, more than two teams (multiple team Names in the column, and multiple team names in the row), one player and one team (a player's Name in the column, and a team's Name in the row, or vice versa), or more than one player and more than one team (multiple player Names and/or team Names in the column, and multiple player Names and/or team Names in the row). The Names and their placement along two axes of the grid may be selected at random by a computer algorithm. For ease of reference, the embodiments of the invention may be described as though only one Name exists in a row or one Name exists in a column, and it should be understood that more than one Name may be associated with a row, and/or more than one Name may be associated with a column.

In some embodiments of the invention, the Names and the placement of those Names may be selected in a non-random manner. As the contest progresses, each Name featured on the grid may be assigned a number of fantasy points correlating to the performance of the associated P(s)aoT(s) in one or more real-world sports games. Correlating the fantasy points to the performance of the P(s)aoT(s) may be accomplished using a statistical formula based on a real-life statistical performance. Then, each box may be assigned the number of fantasy points that results from a mathematical combination (such as adding or multiplying) of the fantasy points assigned to the Name corresponding to the row that is associated with that box, and the fantasy points assigned to the Name corresponding to the column associated with that box. The winning box on a particular contest grid may be the box having the largest number of cumulative fantasy points. The participant who previously selected the box correlating with that P(s)aoT(s)(s) combination may then be deemed the winner of the contest.

Although there may be a single participant that is the winner of the contest, the contest may be carried out so that more than one participant wins a prize. For example, in an embodiment of the invention in which more than one participant wins, prizes (such as cash awards of a fixed and predetermined amount) may be allocated to those choosing boxes that have cumulative fantasy points exceeding a threshold number, or based on the cumulative fantasy point achieved. That is to say, the prizes given in a particular contest need not be equal in value. The prize having the largest value may be awarded to the participant that selected the box having the largest cumulative number of fantasy points, and the prize with the lowest value may be awarded to the participant that selected a winning box having the smallest cumulative number of fantasy points. The number of boxes that receive a prize may be determined by the operator of the contest, and this number of boxes and predetermined prize or prizes may be fixed and made known to all participants prior to each contest. In the case that more than one box accumulates an identical number of fantasy points and those boxes are within the number of boxes that are deemed to be worthy of a prize, the prize may be divided between the participants that selected boxes having the same number of fantasy points.

Fantasy points may be based on a predetermined scoring system developed by the contest organizer. For example (using example-instances that may occur in a real-world sports game), a predetermined number of fantasy points may be assigned to particular performance activities that may occur in a real-world sports game, such as (and not limited to): (a) in baseball: a homerun by a batter or a strikeout by a pitcher, or (b) in football: a touchdown or reception, or (c) in basketball: a basket or a rebound, or (d) in hockey: a goal, assist, or goalie save. Prior to the start of the contest, participants may be informed of how the fantasy points will be assigned, and in this manner the contest participants may use their knowledge of the P(s)aoT(s) to select the box they believe will ultimately have the highest number of cumulative fantasy points.

The invention may be carried out to incorporate milestones. The milestones may be, but are not limited to, particular in-game achievements made by one or more of the P(s)aoT(s) in real-world sporting events. A milestone may be assigned to a Name based on that P(s)aoT(s)'s performance during a real-world sports game such as (and not limited to) (a) in baseball: the first player to get 3 total bases, or (b) in football: the first quarterback to throw for 100 yards, or (c) in basketball: the first player to score a free throw, a 2-pointer, and/or a 3-pointer, or (d) in hockey: the first player to have one blocked shot and/or one shot on goal in a hockey game. Other types of milestones may be (a) in baseball: a homerun by a batter or a strikeout by a pitcher, or (b) in football: a touchdown or reception, or (c) in basketball: a basket or a rebound, or (d) in hockey: a goal, assist, or goalie save. When a milestone is reached by a P(s)aoT(s), the corresponding Name featured on the contest grid may be assigned fantasy points associated with that milestone. Those milestone points may be used to determine which of the participants should receive a prize for having selected a box with a cumulative milestone-point total that is the highest among all participants. Alternatively, or in addition, the milestone points may be added to the cumulative point total identified above.

In another embodiment of the invention that uses milestones, the contest may be carried out until a milestone is reached by a P(s)aoT(s) or combination of P(s)aoT(s), at which time the contest ends and the winner is determined by tallying the points achieved by the P(s)aoT(s).

Alternatively, when a milestone is reached, the contest may continue, but a prize may be awarded to the participant who selected the box corresponding to the P(s)aoT(s) (or combination of P(s)aoT(s)) that is (are) deemed to have achieved the milestone, or is (are) deemed to have achieved the milestone first.

Although the invention may be carried out by identifying a single milestone, and when that milestone is achieved the winning participant of the contest may be determined or a prize given while the contest continues, the contest may be carried out using multiple milestones. For example, in an embodiment of the invention in which contest participants win prizes while the contest continues, the prizes (such as cash awards) may be allocated to participants who selected boxes corresponding to P(s)aoT(s)-combinations (row and column) that achieve the milestones first. The different types and number of milestones available may be determined by the operator of the contest, and these types and number of milestones may be made known to all participants prior to each contest.

In some embodiments of the invention, the winning box from a particular contest-grid may be the box that features the P(s)aoT(s)-combination that completed the predetermined scoring milestones first during the fantasy contest. In such a contest, the participant who previously selected the box/boxes having a row and column correlating with that P(s)aoT(s)-combination may be deemed the winner of the contest.

In those embodiments of the invention in which a milestone is identified, the milestone may be a preselected goal that may be achieved by the real-world players or teams competing in a sports event. When the milestone is achieved by one of the players or teams, a benefit may be awarded to a contestant in the fantasy sports contest. The benefit may be conferred by one or more of the following activities:

(a) the processing apparatus may indicate at least one of the participants will receive a prize;
(b) at least one of the participants may receive milestone-points, and the milestone-points may be used to determine one or more winners from among the participants; and/or
(c) the contest may end.

BRIEF DESCRIPTION OF THE FIGURES

Figure 1A:
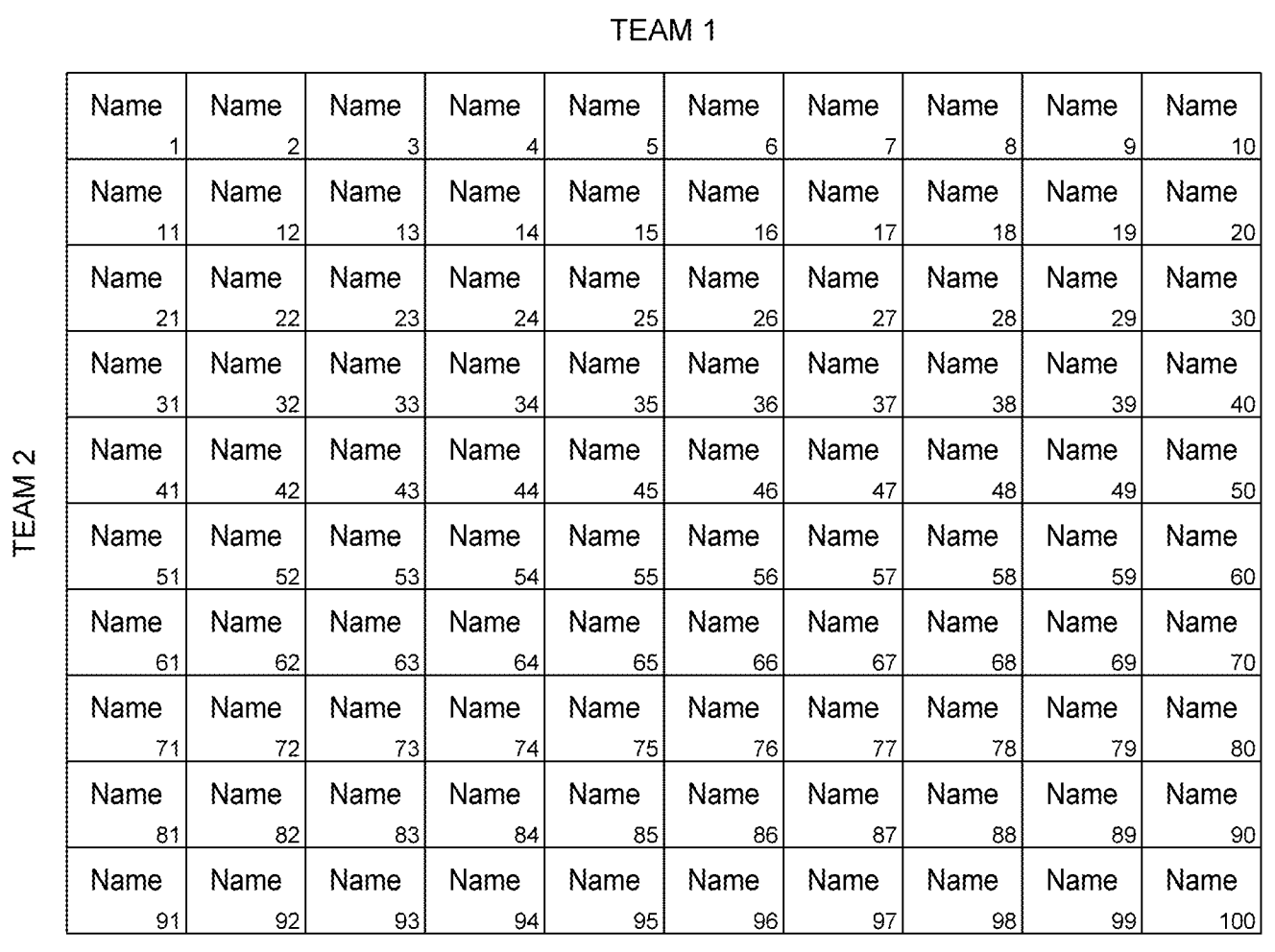

FIG. 1A depicts a pre-existing contest commonly used in conjunction with sport contests involving two teams.

FIG. 1B depicts a resulting grid in a pre-existing contest commonly used in conjunction with sport contests involving two teams.

FIG. 2A depicts a non-limiting example of a grid utilizing 100 blank boxes and Names that may be involved in a contest that is carried out according to the invention.

FIG. 2B depicts a non-limiting example of a grid utilizing 100 blank boxes with more than one player and/or more than one team represented per row and per column.

FIG. 2C depicts another non-limiting variation of a grid that is in keeping with the invention on which more than one player and/or more than one team is assigned to each row and each column.

FIG. 3 depicts a non-limiting example of 20 Names that may be involved in a contest that is carried out according to the invention, and adjacent to each Name is the number of fantasy points achieved.

FIG. 4 depicts the information provided in FIGS. 2A and 3.

FIGS. 6A, 6B, 6C, and 6D are a series of figures that depict (along with text below) how a contest that is in keeping with the invention may be conducted.

FIGS. 8A and 8B depict different sides of a cube that has a plurality of contest grids, and some of the Names are the same between grids.

FIG. 12 depicts a non-limiting example of a grid utilizing 100 P(s)aoT(s) boxes (numbered 1 through 100) and 20 Names (P(s)aoT(s) 1 through 20) that may be the subject of a fantasy sports contest that is carried out according to the invention. Ten of the P(s)aoT(s) Names are listed above the P(s)aoT(s) boxes, one each being associated with a different column, and ten of the P(s)aoT(s) Names are listed to the left of the P(s)aoT(s) boxes, one each being associated with a different row. The three cross-hatched P(s)aoT(s) boxes (Boxes 14, 48, and 62) on the grid identify P(s)aoT(s) boxes selected by a participant. In a fantasy sports game, the fantasy points that accumulate as a result of the P(s)aoT(s) performances for these cross-hatched P(s)aoT(s) boxes (Boxes 14, 48, and 62) may be added together and used as one cumulative score.

FIG. 13 depicts a non-limiting example of a grid that is in keeping with the invention on which more than one player and/or more than one team is assigned to each row and each column. In the example of FIG. 12 the grid utilizes 100 P(s)aoT(s) boxes (numbered 1-100), and more than one player and/or more than one team are represented per row and per column. In the example of FIG. 9, P(s)aoT(s) 6 and P(s)aoT(s) 16 have been assigned to a particular column, and P(s)aoT(s) 36 and P(s)aoT(s) 26 have been assigned to a particular row. Box 56 is the P(s)aoT(s) box that resides at the intersection of this row and this column. In this particular embodiment of the invention, the cumulative score for Box 56 may be the mathematical combination (e.g. adding or multiplying) the fantasy points arising from the performance of P(s)aoT(s) 6, 16, 26, and 36. The three cross-hatched P(s)aoT(s) boxes (Boxes 14, 48, and 62) on the grid identify P(s)aoT(s) boxes selected by a participant. The fantasy points that accumulate as a result of the P(s)aoT(s) performances for these cross-hatched P(s)aoT(s) boxes (Boxes 14, 48, and 62) may be added together and used as one cumulative score.

FIG. 14 depicts another non-limiting example of a grid that is in keeping with the invention on which more than one player and/or more than one team is assigned to each row and each column. In the example of FIG. 13, the grid utilizes 100 P(s)aoT(s) boxes (numbered 1-100), and more than one player and/or more than one team are represented per row and per column. In the example of FIG. 10, P(s)aoT(s) 5 and P(s)aoT(s) 25 have been assigned to a particular column, and P(s)aoT(s) 37 and P(s)aoT(s) 17 have been assigned to a particular row. Box 65 is the P(s)aoT(s) box that resides at the intersection of this row and this column. In this particular embodiment of the invention, the cumulative score for Box 65 will be the mathematical combination (e.g. adding or multiplying) the fantasy points arising from the performance of P(s)aoT(s) 5, 25, 17, and 37. The three cross-hatched P(s)aoT(s) boxes on the grid identify P(s)aoT(s) boxes selected by a participant. The fantasy points that accumulate as a result of the P(s)aoT(s) performances for these cross-hatched P(s)aoT(s) boxes may be added together and used as one cumulative score.

FIG. 16 depicts a non-limiting example of a grid according to the invention that displays a contest where a participant may select only one P(s)aoT(s) box and only one WcT in a given contest. In the example displayed in FIG. 15, the participant selected Box #44 and WcT #2.

FIG. 18 depicts a non-limiting example of a grid according to the invention that displays a contest where a participant may select more than one P(s)aoT(s) box in combination with one WcT in a given contest. In the example displayed in FIG. 14, the participant selected box combinations #14, #48, and #62 and WcT #2.

FIG. 19 is an enlarged view of a participant's selection of P(s)aoT(s) box combinations #14, #48, and #62 and WcT #2.

FIG. 22 depicts a non-limiting example of a grid that displays a contest where a participant may not select more than one P(s)aoT(s) box in a combination that are within the same row and/or column as other P(s)aoT(s) selected in that same combination. In the example given, the participant selected box combinations #14, #48, and #62 and WcT #2.

DETAILED DESCRIPTION OF THE DISCLOSURE

Figure 1C:
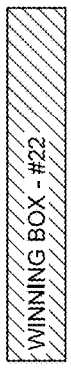
FIG. 1C depicts a resulting grid having a winning box in a pre-existing contest commonly used in conjunction with sport contests involving two teams.

In contrast with pre-existing contests, our newly-invented method is not a game-of-chance, but instead has a significant element of skill involved. Instead of the "randomized" numbers on the grid of the prior art contest, the Names of P(s)aoT(s) are assigned to each column and each row of boxes before contest participants select boxes. In our invention, the participant may be able to view the Names of the P(s)aoT(s) selected for placement on the contest grid, and the placement of these Names (horizontally and vertically) on the grid may be predetermined and known before a contest participant selects a box. This feature enables participants to utilize their skill and knowledge of P(s)aoT(s) to predict how the P(s)aoT(s) will perform in one or more real-world sports events. The knowledge and skill of each participant may enable each participant to select one or more boxes that correlate to the Names forming a particular row/column P(s)aoT(s) combination.

Registration

Participants may be required to pre-register in order to be granted access to a contest, which may be provided via an Internet website. Below is a non-limiting example of the type of registration information that may be required, along with an outline of the registration process.

I. Participants may be required to provide their full name.

II. Participants may be required to provide their email address.
   A. These email addresses may be the means by which the contest organizer communicates with a participant.
   B. A computer storage device such as a non-transitory computer-readable memory may store such email addresses for use in providing one or more participants with news occurring with regard to contests, and/or notifications, updates, and/or information about a participant account and/or contests.
   C. Newly provided emails may subjected to a verification procedure to assure each email is associated with a particular participant.

III. Each participant may be required to create a password and:
   A. The participant's email address and password may be required in order for a participant to login and participate in a contest.

IV. Participants may be required to provide a physical address (e.g., a street address) and/or a payment address (e.g., a bank account routing number or a payment account).
   A. Prizes a participant may win during a fantasy contest may be sent to the physical address or payment address provided.

V. Participants may be required to provide a telephone number.

VI. Participants may be required to provide their date of birth.
   A. An age verification page may be required and provided to the participant to ensure they are of legal age to enter contests in the jurisdiction where they are physically located while playing a contest.

VII. Participants may be required to enable location services
   A. Location services may be used to determine where a participant is physically located at the time they are playing a contest
   B. Location services may be used to restrict participants from entering into a particular fantasy contest. For example, participants may be allowed to participate in contests only where entering such contests is permissible by law.

VIII. Participants may be required to sign a Terms of Service agreement.

Below is an example (non-limiting) of the registration process when a participant accesses a website being used by the organizer to conduct a contest.

I. Participants may enter a web address (i.e., a uniform resource locator (URL), link, code, or the Internet protocol (IP) address) to gain access to our web-based contest.

II. A computer may be used to display a web page featuring a brief description of the web-based contest. Such a description may include rules, scoring methodology, how payouts are made.

III. Interested individuals may have the ability to review the website on an introductory basis in order to familiarize themselves with the contest, and ultimately decide whether they want to register as a participant.

IV. Those that have registered as a participant may access more of the organizer's web site by logging in to a webpage.

V. The organizer's computer system (which may include a server) may receive data for purposes of registering an individual desiring to become a participant. Note: Several informational steps may need to be completed in order for an individual to become a participant. For example, while signing up to become a participant, one or more web pages may be used to facilitate the collection of the individual's:
   A. Full name,
   B. Email address,
   C. Username/password,
   D. Addresses (physical and/or payment),
   E. Telephone numbers, and/or
   F. Date of Birth.

VI. The organizer's computer system may store the collected information and then display to the individual (now having been validated as a participant) a next informational page.
   A. It should be noted that if a participant has already completed the sign-up process during a previous session, that participant may be required only to provide an email address or username plus a password in order to gain access to the organizer's web site.
   B. It should be further noted that the organizer's computer system may have the ability to identify a participant's email address/username, existing contest data, banking information, and/or preferred settings when a returning participant enters login information.

VII. From time to time, participants may be asked to verify their age and/or other criteria to participate in the contest. Such information may be used to ensure participants are legally permitted to participate in the fantasy contests offered, in particular states where they are located.

VIII. From time to time, participants may be asked to provide bank account information, which may be used by the organizer to enable transfers/withdrawals.
   A. Note: Such information may be used to enable the transfer of money from a linked banking account or payment processor to pay a fee that may be required by a contest organizer in conjunction with completing a sign-up procedure or participating in a contest.
      1. See the section titled: Entry Fees and Payouts for details about entry fees and payouts.

IX. The organizer's computer system may receive and recognize when a participant selected a box during a fantasy contest.

X. The organizer's computer system may identify a winning row/column combination (i.e., a winning box), and the participant that previously selected that box. Once a winning box and participant has been identified, the organizer's computer system may credit an amount of winning prize money to the winning participant's contest-account, or deliver the prize money to an address provided by the participant.
  1. See the section titled: Entry Fees and Payouts.
XI. After sign up procedures are completed, or an already-existing participant logs in to the organizer's website, the organizer's computer system may provide access to particular web pages where participants may view/change account information, may view current contests that participants are involved in, or allow participants to select various fantasy contests to play.

Contest Procedures

The information below outlines a non-limiting example of how a contest may be conducted according to an embodiment of the invention.

I. Once logged in, participants may be brought to a particular page within the website, which we may refer to as the "Hub Page."
  A. From the Hub Page, participants may have the ability to access information about fantasy contests currently being offered, fantasy contests a participant is currently involved in, fantasy contests that may be offered in the future, current winnings, and other information that may be of interest to participants.
II. For example, from the Hub Page a participant may have the ability to choose an option that results in displaying a page providing information about fantasy sports contests that are currently available to that participant. If a participant desires to enter a particular contest, the participant may select a virtual button associated with that contest, and then the organizer's computer system may provide the participant with the corresponding contest grid.
III. Fantasy contests may be based on one or more real-world sporting events, such as, for example, professional or amateur sporting events.
  A. Non-limiting examples of professional sporting events may include:
    1. A professional basketball game (NBA), a professional football game (NFL), a professional hockey game (NHL), a professional baseball game (MLB).
      a. It should be noted that contests can be based on one particular real-world professional sports league or multiple real-world professional sports leagues.
      b. It should be further noted that real-world professional sports league's seasonal play and scheduling may determine the number and type of fantasy contests offered daily as well as the P(s)aoT(s) utilized in a particular fantasy contest.
IV. The P(s)aoT(s)' Names may be placed both horizontally and vertically on both axes of a contest grid.
V. The selection and placement of the P(s)aoT(s) along the axes of a contest grid may be at random.
  A. A computer algorithm referred to herein as the Random Player and/or Team Generator ("RPaoTG") may be utilized for both the selection of P(s)aoT(s) in each fantasy contest and the placement of Names along both axes of a contest grid prior to the start of a contest.
    1. The RPaoTG may use information gathered from team rosters and scheduled games of P(s)aoT(s) corresponding to upcoming real-world sports contests, and select from that information the Names that may appear on a particular contest grid.
    2. See the section titled: Brief Description of the Figures.
VI. The selection and placement of Names along the axes of a contest grid by the RPaoTG forms combinations of Names, each combination being associated with a box on the contest grid. In some embodiments of the invention a row or column may be associated with more than one Name, and in those situations, a cumulative number of fantasy points earned by those P(s)aoT(s) may be used as the fantasy points for that row and/or column, as the case may be. Or, in a different embodiment of the invention, the number of fantasy points for a row or column having more than one Name may be the fantasy points associated with the Name having the highest number of fantasy points, or an average of the fantasy points for those Names.
VII. A predetermined number of Names may be placed horizontally and/or vertically on the axes of the contest grid.
VIII. Each P(s)aoT(s) identified in a fantasy contest may be assigned fantasy points based on the P(s)aoT(s) performance in a real-world sports game. The fantasy points may be awarded based on a predetermined scoring system made available to all participants prior to the start of each fantasy contest.
IX. Each P(s)aoT(s) identified on a contest grid may be part of a P(s)aoT(s)-combination pertaining to a particular box on the contest grid. With regard to each P(s)aoT(s)-combination, fantasy points are assigned to each P(s)aoT(s), and those fantasy points are combined (e.g., mathematically) to produce a cumulative number of fantasy points for that P(s)aoT(s)-combination. Because the fantasy points assigned to each P(s)aoT(s) are based on the real-world performance of that P(s)aoT(s), the cumulative number of fantasy points for a P(s)aoT(s)-combination is also based on the real-world performances of P(s)aoT(s).
X. When the RPaoTG is finished selecting and placing P(s)aoT(s) along both axes of a contest grid, a fantasy contest may be finalized and made available for selection by participants.
XI. A participant may select a fantasy contest in which he/she desires to participate.
  A. A fantasy contest may be comprised of the Names of P(s)aoT(s) from a particular real-world sport (e.g., only baseball), or may be comprised of the Names of P(s) aoT(s) selected from multiple real-world sports (e.g., baseball and football).
  B. Participants may be required to select and complete the submission process for a fantasy contest by a specific time. For example, a particular contest may be closed to new participants once one of the real-world sporting events associated with that contest begins.
XII. Participants may be required to pay an entry fee for each fantasy contest in which they desire to participate.
XIII. A non-limiting example of how an entry fee might be carried out with regard to a particular fantasy contest is:
  A. Payment of an entry fee may grant the participant the ability to select one individual box on the grid of a fantasy contest.
    1. It should be noted that each box on a grid in a particular fantasy contest may directly reflect the cost of the entry fee for that particular fantasy contest. In some embodiments of the invention, boxes on a particular grid may have different entry fees.
  B. For a particular contest, participants may have the option to submit more than one entry fee, and in that case, such participants may be allowed to select more than one box within the grid of that fantasy contest.

C. A non-limiting example of how entry fees may be implemented is as follows:
1. A particular fantasy contest may have an entry fee of $5 per box.
2. A participant may submit one entry fee of $5, and then may be allowed to select one individual box within the grid of that particular fantasy contest.
3. If a participant desires to be associated with more than one box, that participant may submit more than one entry fee, and then would be permitted to select the appropriate number of boxes on the contest grid. For example, if a participant wants to select five boxes, then that participant may submit five entry fees, and then select five boxes. If the entry fee is $5 per box, then five boxes would cost $25.

XIV. Once a participant has entered a particular contest, he/she may be provided with access to the grid corresponding to that contest.

XV. A grid featuring boxes available for selection may be displayed for each fantasy contest.
A. See the section titled: Fantasy Contest Grid Description and 3-Dimensional Cube Description XVI. The grid may show the Names of P(s)aoT(s) and the placement of those Names along both axes of the grid.

XVII. Boxes on the grid that are available for selection may be indicated to the participants. For example, boxes available for selection may have no information in them, or may be a color (e.g., white) that indicates availability. Once a box is selected by a participant, the appearance of the box may be altered to indicate the box is no longer available for selection.

XVIII. Each box on the grid correlates with a row and a column of the grid. Each row is associated with one or more Names of P(s)aoT(s), and each column is associated with one or more Names of P(s)aoT(s).
1. In some embodiments of the invention, at least some of the Names associated with rows may also appear among the Names associated with columns. In an embodiment of the invention where (a) a Name appears in a column, and (b) the same Name appears in a row of a grid, and (c) if the contest organizer does not wish to have a box corresponding to merely one Name, then that box may be made unavailable for selection.
2. See the section titled: Brief Description of the Figures for details of how a contest grid may look.

XIX. Participants in a contest may use their knowledge of the P(s)aoT(s) to select a box (or boxes) they believe will win the fantasy contest.
A. See the section titled: Contest-play modes and Scoring for details about how different contests may be scored and different ways a participant may win.

XX. As a particular contest progresses, each Name featured on the grid may be assigned a number of fantasy points correlating to the performance of the associated P(s)aoT(s) in one or more real-world sports games. Then each box may be assigned the number of fantasy points correlating to the performance of the associated P(s)aoT(s)(s) (by row and column) in one or more real-world sports games, and those fantasy points (by row and column) corresponding to a particular box may be combined to provide a cumulative number of fantasy points for that box. The cumulative number of fantasy points that results from that combination (e.g., a mathematical combination, such as adding the row-points to the column-points, or multiplying the row-points by the column-points) may be displayed on the grid, for example, within the box. The winning box may be determined according to the contest rules, and the participant that previously selected that winning box may be identified by the contest organizer's computer.
A. Note: There may be more than one winning participant in each fantasy contest, depending on rules applicable to that contest.
1. See sections titled: Contest-play modes and Scoring for details about how a contest may be scored and different ways a participant may win.

XXI. See the section titled: Description of Drawings for details about the appearance of an exemplary grid.

The following text describes a non-limiting example of a contest that is in keeping with the invention.

I. Upon login to the contest-organizer's website, a microprocessor of the organizer's computer system may generate and provide a web page featuring fantasy contests that are being offered to participants for a particular time period (e.g., a particular day). Real-world sports leagues seasonal play and scheduling may determine the number and/or type of fantasy contests offered for a particular time period.

II. Fantasy contests may be shown via a particular web page of the organizer's website, and may show the entry fees and contest rules for each contest. The fees and/or rules need not be the same from contest to contest.
A. See the section titled: Contest-play modes and Scoring for details about how contests may be scored and ways in which a participant may win.

III. A participant may select a fantasy contest from a particular web page.
A. Fantasy contests may be selected up to a predetermined time.

IV. The participant may select an entry fee for a selected fantasy contest.
A. An entry fee selected by a participant may reflect the cost of one box for the selected fantasy contest.
1. See the section titled: Selecting Boxes for details about how participants may select boxes.

V. A microprocessor associated with the organizer's computer system may acknowledge receipt of the entry fee for a contest selected by the participant, and then display the grid for that contest, at least some of the boxes for which are available for selection.

VI. The organizer's computer system may receive an indication of the number of entry fees the participant selected and the participant may then be allowed to select the appropriate number of boxes on the grid for that particular fantasy contest.

Fantasy Contest Grid Description and 3-Dimensional Cube Description

Grid Description

I. Fantasy contests may feature grids comprised initially of boxes that are available for selection by participants.

II. A predetermined number of boxes may make up each grid in a fantasy contest.
A. Grids may feature a minimum of two boxes, but may include many more boxes.

In an embodiment of the invention having just two boxes, the grid may have two columns and one row, or one row and two columns.

III. Boxes, rows, and/or columns comprising a grid may be numbered in order to allow for easy reference.
A. See patent figures for details about how the grid may be displayed.

IV. Grids that are generated may be specific to both the fantasy contest and entry fee selected by participants.

A. Grids may be formatted to accommodate all or nearly all participants who selected the same fantasy contest with the same entry fee.
B. A non-limiting example of how grids may be formatted for all participants who selected the same fantasy contest with the same entry fee would be as follows:
   1. As an example, if a participant selects to enter a baseball fantasy contest with a $20 entry fee, the grid generated may indicate that participant as well as all other participants who selected that baseball fantasy contest.
      a. It should be noted that additional grids may be generated if the number of participants for a fantasy contest exceeds the space available for a particular grid.

V. The grid may feature spaces for Names of P(s)aoT(s) placed above each column and next to each row.
   A. See Patent figures.
VI. These P(s)aoT(s) may be selected by the RPaoTG and placed at the available spaces corresponding to each row and each column on the grid.
VII. Each box may correlate with a row and a column of the grid. Each row and each column is associated with one or more names ("Name") of P(s)aoT(s) so that each box may correspond to one or more players or one or more teams.
   A. See the section titled: Description of Drawings for details about how the grid may be displayed.
VIII. For a particular box, a P(s)aoT(s)-combination is comprised of the one or more Names of the row associated with that box, plus the one or more Names of the column associated with that box.
IX. All participants may have the ability to view all P(s)aoT(s) and their placement on the grid when deciding which boxes to select.
X. Participants may have the ability to select an available box that corresponds to a P(s)aoT(s) combination that he/she believes may win the fantasy contest.
   A. See sections titled: Contest-play modes and Scoring for details about how contests may be scored, and ways in which a participant may win.
XI. The grid may remain accessible until the first real-world sports game of a P(s)aoT(s) on the grid begins.
   A. See the section titled: Selecting Boxes for details about how participants may select boxes.

3-Dimensional Cube
I. In some embodiments of the invention, a plurality of contest grids may be displayed via a computer monitor as a rotatable object, such as a cube.
II. Contest grids may be displayed (e.g., via a computer monitor) on the 3-Dimensional object, for example, with one grid per side. So, for example, if the object is a cube (six sides), six contest grids may displayed, one grid per side.
III. The 3-Dimensional object, such as a cube, may be rotated virtually in order to display the various contest grids that appear on the sides of the 3-Dimensional object.
IV. P(s)aoT(s) may be selected and placed on the grid by the RPaoTG using a methodology that is the same as or similar to that described above.
   A. It should be noted that some contest grids displayed on adjoining sides of the 3D object may have a common axis of Names that is displayed as being shared by those two grids.
V. Some embodiments of the invention may require participants to select the winning box on each grid of the 3-Dimensional object in order to be designated eligible for a prize. In other embodiments of the invention, the winner of a contest may be the participant who selected boxes that collectively have the highest cumulative score.
   A. See sections titled: Contest-play modes and Scoring for details about how contests may be scored, and participants may win.

P(s)aoT(s) Competing in Fantasy Contests
I. An RPaoTG may identify P(s)aoT(s) from real-world sports games for use in particular fantasy contests.
   A. However, in some embodiments of the invention, the P(s)aoT(s) may be identified in a non-random manner.
II. The RPaoTG may select the P(s)aoT(s) from information provided by a sports data provider.
III. Fantasy contests may feature a predetermined number of P(s)aoT(s).
   A. There may be one or more lists of P(s)aoT(s) for each fantasy contest.
   B. A non-limiting example of such lists is as follows:
      1. A starting list identifies P(s)aoT(s) expected to play in a real-world sports game.
      2. A reserve list identifies P(s)aoT(s) that may be substituted for P(s)aoT(s) on the starting list if P(s)aoT(s) from the starting list are unable to play in the real-world sports game.
   C. A particular number of P(s)aoT(s) may be identified and assigned to each fantasy contest.
IV. The identified P(s)aoT(s) need not be from a single sports team or sports league. Instead, P(s)aoT(s) from different teams or different leagues may be identified for use in a particular contest.
V. A non-limiting example of a fantasy contest using P(s)aoT(s) from the same real-world sports league could be as follows:
   A. Example: In a professional baseball fantasy contest, the RPaoTG may select professional baseball players from different professional baseball teams.
      1. It should be noted that same example may apply to any professional sports league (e.g., football, hockey, or basketball).
VI. A non-limiting example of a fantasy contest using P(s)aoT(s) from different real-world professional sports leagues could be as follows:
   A. As an example, a fantasy contest that is not focused on one real-world sports league, P(s)aoT(s) from different real-world professional sports leagues may be identified by the RPaoTG to make up the Names used in that particular fantasy contest.
VII. Once identified by the RPaoTG, the Names of P(s)aoT(s) may be randomly (e.g., with use of a computer algorithm) placed on a grid for that particular fantasy contest.
   A. However, in some embodiments of the invention, Names of P(s)aoT(s) may be placed on the grid in a non-random manner.
VIII. Each Name or Names of P(s)aoT(s) may correlate with a row and/or column on the grid.
IX. Each box on the grid may correlate to a row and a column, and thus correlate with the Name(s) associated with that row and that column, thus forming a combination of P(s)aoT(s) Names that is associated with that box.
   A. It should be noted that participants may select boxes based on their knowledge, skill, and prediction of P(s)aoT(s) ability to perform in the real-world sports game in ways that earn fantasy points.
X. Identification and placement of Names on grids of fantasy contests may be done for real-world sports games that are in the future, and then such grids may be made available to participants via a web page of the organizer's website.

A non-limiting example of the process of how P(s)aoT(s) are selected from real-world professional sports game may be as follows:

I. The RPaoTG may access information about real-world professional sports games and roster information. Such information may be from a sports-data provider.

II. The RPaoTG may identify a predetermined number of P(s)aoT(s), whose names may be used for each particular fantasy contest.

III. The RPaoTG may identify P(s)aoT(s) for one fantasy contest before identifying P(s)aoT(s) for another fantasy contest.

IV. The RPaoTG may repeat the identification process until fantasy contests have a desired number of P(s)aoT(s) Names have been identified.

A. For example, if there are four different fantasy contests offered (baseball, football, hockey, and basketball), a microprocessor of the organizer's computer system may identify P(s)aoT(s) from information provided by a sports data provider for a particular real-world professional sport, identifying P(s)aoT(s) for-one particular fantasy contest first, before proceeding to the identification process for a next particular fantasy sports contest.

V. The organizer's computer system may decide between which respective real-world sports leagues P(s)aoT(s) may be selected from. For example, if the organizer desires to create a grid comprised only of baseball Names, then the RPaoTG may be asked to identify only baseball Names.

A. For example, in a particular fantasy contest focused on professional baseball, the RPaoTG will identify P(s)aoT(s) only from sports data information from professional baseball team rosters, and the Names of those identified P(s)aoT(s) will then be placed on a grid of a baseball-specific fantasy contest.

Fantasy Contests

I. Fantasy contests may be offered daily.

A. It should be noted that sports leagues seasonal play and scheduling may determine the number and type of fantasy contests offered daily.

II. Fantasy contests may feature Names of P(s)aoT(s) identified from within real-world sports leagues, such as professional or amateur leagues.

III. Participants may be permitted to select any number of fantasy contests offered.

IV. Participants may enter into a particular fantasy contest multiple times by submitting multiple entry fees for that particular fantasy contest. Participants in a particular fantasy contest may receive a notification when an identical grid is generated with the same entry fee or a different entry fee.

A. For example, a participant may enter a baseball fantasy contest by paying the $20 entry fee.

1. It should be noted that in this example the entry fee may reflect the cost of one box on the grid of that particular fantasy contest.

2. If a participant wishes to select more than one box, that participant will need to pay more than one entry fee for that fantasy contest.

3. For example, a participant that submits five entry fees of $20 each for a particular fantasy contest may be able to select five boxes on the grid of that particular fantasy contest.

a. It should be noted that if a grid has unsold boxes, the organizer may notify existing participants that boxes are available, and that they are permitted to purchase an additional box by paying an additional entry fee.

b. It should be noted that if there are fewer boxes remaining on the grid than the number selected by the participant, that participant may be required to select a lower number of entry fees reflecting the number of boxes remaining on the current grid within that particular fantasy contest.

4. In a situation where multiple entry fees may not be able to be submitted or where participants may wish to submit multiple entry fees on different grids for the same particular fantasy contest, a Participant can opt to be notified when a newly created grid is formed for that particular fantasy contest.

a. It should be noted that this notification feature may be designed for participants wanting to submit multiple entry fees on different grids for the same fantasy contest.

V. The RPaoTG may identify and place the Names of P(s)aoT(s) on grids of fantasy contests.

VI. Names of P(s)aoT(s) identified by the RPaoTG in a fantasy contest may be placed both horizontally and vertically along the axes of the grid to form different combinations of Names, each combination corresponding to a box on the grid.

A. See the section titled: P(s)aoT(s) competing in Fantasy Contests for details about selecting P(s)aoT(s), and placement of the corresponding Names on the grid.

VII. Fantasy points may be assigned to the Names on the grid according to how the corresponding P(s)aoT(s) perform in real-world sports games.

A. See the section titled: Contest-play modes and Scoring for details about how contests may be scored, and ways a participant may win.

VIII. The duration of a fantasy contest may vary in length depending on P(s)aoT(s) that are competing in the real-world sports games.

A. Example of why the duration of fantasy contests may vary in length

1. Fantasy contests may feature Names of P(s)aoT(s) from various real-world sports teams, and the real-world games in which those sports teams are competing may be played at different times.

2. Fantasy contests may feature Names of P(s)aoT(s) competing in different real-world sports games, and those sports games may occur at different times.

a. See the section titled: Duration of Fantasy Contests

IX. A fantasy contest may end when all P(s)aoT(s) identified on the grid have finished competing in the real-world sports games for that particular fantasy contest.

X. Each P(s)aoT(s) final fantasy score may be determined at the end of the fantasy contest and displayed above/underneath/adjacent to their Name on the grid.

XI. The winning P(s)aoT(s) combination (row and column) may be determined by the contest rules for that particular fantasy contest.

A. See the section titled: Contest-play modes and Scoring for details about scoring contests and ways a participant may win.

XII. The participant who previously selected the box on the grid that correlates to the winning P(s)aoT(s) combination may be declared the winning participant of that fantasy contest.

A non-limiting example of the process of how particular fantasy contests can be created may be as follows:

I. The organizer's computer system may complete steps as described in the section titled: P(s)aoT(s) competing in Fantasy Contests:

II. The organizer's computer system may generate and display a particular page that features fantasy contests currently being offered.
  A. See the section titled: Contest-play Modes and Scoring for details about scoring contests and ways a participant may win.
    1. Note: That page may be accessed when participants complete the sequential steps that may be required in order to select a particular fantasy contest.
III. Upon commencement of the fantasy contest:
  A. The RPaoTG may place at random the names of P(s)aoT(s) both horizontally and vertically along the axes of grid for that particular fantasy contest
    1. See the section titled: Fantasy Grid Description for details about how a grid may appear.
  B. The organizer may utilize information from a sports data provider to receive statistical categories that may be used to determine fantasy points P(s)aoT(s) may receive from their performance in real-world sports games
  C. The organizer's computer system may scan sports data information from box scores and lineups of various real-world sports games to determine P(s)aoT(s) that may have been selected to compete in particular fantasy contests.
  D. The organizer's computer system may input information describing a P(s)aoT(s) real-world performance in a sports game into a conversion algorithm to determine the number of fantasy points to be received.
    1. Note: This conversion process may feature a live scoring system that frequently updates as performances in real-world sports games.
  E. This process may continue until the fantasy contest is concluded.
    1. See sections titled: Duration of Fantasy Contests and Contest-play modes and Scoring for details about the length of fantasy contests, and how fantasy contests may be scored, and ways a participant may win.
IV. Once a fantasy contest is completed, the organizer's computer system may recognize the P(s)aoT(s) combination that has the winning combination (row and column) based on contest rules.
  A. See the section titled: Contest-play modes and Scoring
V. The organizer's computer system may determine which participant selected the box that corresponds to the winning P(s)aoT(s) combination on the grid. That participant would then be declared the winner of that particular fantasy contest.

Duration of Fantasy Contests
I. Fantasy contests may start at different times.
II. Fantasy contests may have varying start times due to:
  A. The game schedules of real-world sports leagues.
  B. Fantasy contests may feature Names of P(s)aoT(s) from various real-world sports teams
    1. Fantasy contests may feature Names of P(s)aoT(s) competing in different real-world sports games at different times.
III. Fantasy contests may be scheduled to start when the first P(s)aoT(s) featured in a fantasy contest begins playing in the first scheduled real-world sports game. For example, a fantasy contest focused on professional baseball may start with the first scheduled real-world professional baseball game to be played that day, if a P(s)aoT(s) in a particular fantasy contest is playing in that professional baseball game.
  A. For clarity, a professional baseball fantasy contest may not start with the first scheduled baseball game to be played that day, if P(s)aoT(s) in a particular fantasy contest are not playing in that professional baseball game.
IV. Fantasy contests may be posted on a particular page on the website and may be made available for selection by participants in advance of the time that the fantasy contest is scheduled to start.
V. Participants may be required to submit entry fees for fantasy contests before the scheduled start time of the fantasy contest.
  A. See the section titled: Selecting Boxes
VI. A fantasy contest may be completed when all P(s)aoT(s) on the grid of a fantasy contest have finished competing in the real-world sports games that correspond to that fantasy contest.

A non-limiting example of factors that may determine the duration of a particular fantasy contest:
I. RPaoTG may select and place on the grid the minimum required number of P(s)aoT(s) Names that may be needed to start each particular fantasy contest.
  A. See the section titled: Ports competing in Fantasy Contests
II. Once the Names are selected and placed on the axes of each grid for a particular fantasy contest, the organizer's computer system will make the grid available to prospective participants.
  A. It should be noted that contest grids may be displayed on a particular page on the organizer's website.
III. The organizer's computer system may determine which P(s)aoT(s) will be competing in the first real-world sports game for that day. Such a determination may be used to identify a time by which a particular fantasy contest will be scheduled to start.
IV. The organizer's computer system may determine when the last real-world sports game for a particular grid has concluded, and then determine which box on the grid has the winning combination (row and column).

Entry Fees and Payouts
Entry Fees
I. Participants may be given entry fee options for each particular fantasy contest.
II. Participants may select and pay an entry fee for fantasy contests they wish to enter.
III. Payment of entry fees may entitle the participant to select one or more boxes from a grid or multiple grids corresponding to one or more fantasy sports contests.
  A. It should be noted that an entry fee for a particular fantasy contest may reflect the cost of selecting one box on the grid.
  B. In some embodiments of the invention, boxes on a particular grid may have different entry fees.
  C. It should be noted that in this example, the entry fee may reflect the cost of one box on the grid of that particular fantasy contest.
IV. Participants may be permitted to submit multiple entry fees in a particular fantasy contest.
V. Entry fee may be directly reflective of the number of boxes a participant wishes to select
  A. When an entry fee reflects the cost of selecting one box and where boxes on a grid within a particular fantasy contest cost the same to select, the following non-limiting example:
    1. A participant enters a fantasy contest with an entry fee of $20 per box.
    2. If the participant wants to select five boxes in that particular fantasy contest then the participant may submit payment of $100 (5 boxes times 20 $/box equals $100), and then be allowed to select five boxes of the grid corresponding to that fantasy contest.
3. Alternatively, the participant may submit five separate entry fees for that particular fantasy contest.
   a. $20 entry fee=1 box selection
   b. $20 entry fee=1 box selection
   c. $20 entry fee=1 box selection
   d. $20 entry fee=1 box selection
   e. $20 entry fee=1 box selection Payouts I. Cash Payouts
  A. Participants that selected a winning box may receive a predetermined prize as a result of participating in a particular fantasy contest
  B. There may be more than one winning participants for a particular fantasy contest.
    1. See the section titled: Contest-play modes and Scoring for details about scoring contests and ways a participant may win.
    2. A predetermined prize and the number of winning row/column combinations may be determined and made accessible to all participants prior to each fantasy contest.
  C. A non-limiting example that may feature a predetermined prize or prizes with a predetermined number of winning participants may be as follows:
    1. A predetermined grand prize of $XXX may be awarded to the sole participant who selected the box with the highest number of fantasy points accumulated by a P(s)aoT(s) combination.
      a. It should be noted that in the case that more than one P(s)aoT(s) combination achieves the same fantasy score and that cumulative fantasy score is determined to place a box among those that should result in a prize, the prize may be divided among the participants who selected those winning boxes.
    2. A predetermined prize may be awarded to the top 20 participants who selected boxes having the 20 highest cumulative fantasy scores.
      a. It should be noted that in the case that more than one P(s)aoT(s) combination achieves the same fantasy score and that cumulative fantasy score is determined to place a box among those that should result in a prize, the prize may be divided among the participants who selected those winning boxes
    3. The prizes may be grouped such that some winning boxes will fall within a range within which the prize is equal in value. For example, in an embodiment of the invention, there may be 20 predetermined prizes allocated as follows:
      a. $1^{st}$ place—$500
      b. $2^{nd}$ place—$300
      c. $3^{rd}$ place—$100
      d. $4^{th}$ place—$75
      e. $5^{th}$ place—$50
      f. $6^{th}$-$10^{th}$ place— $35 each
      g. $11^{th}$-$15^{th}$ place—$30 each
      h. $16^{th}$-$20^{th}$ place— $15 each
II. Prizes
  A. Prizes may be money or other valuable items.
  B. For examples, non-money prizes may be:
    1. Automobiles, electronic devices, jewelry, travel vouchers, entertainment, etc.
  C. Participants may view prize categories for a particular fantasy contest.
  D. Participants may be required to select the prize they want to win.
  E. Prizes may be formulated from businesses that may wish to sponsor a particular fantasy contest.
III. Cash Prize Payout:
  In some embodiments of the invention having cash prizes, the prizes may be paid as follows:
    A. Organizer's computer system may recognize that a cash prize is owed to a particular participant for having selected a winning box.
    B. Organizer's computer system may transfer the cash prize electronically to that participant's account, which may be a bank account previously identified by the participant.
    C. Organizer's computer system may credit an account maintained by the organizer. Such an account may be available to the participant to pay contest entry fees, purchase goods or services, and/or direct that the accumulated amount in such an account be transferred to a bank account.
    D. A participant who elects to transfer funds into a bank account may be required to identify the bank account, which may occur at the time the participant registers.
    E. The organizer's computer system may recognize which particular fantasy contest, payout type (cash, goods, services), and contest-play mode participants selected and transfer prize money (if money was selected as the payout type to the participant's linked banking account.
  A non-limiting example of how of the functionality of a prize payout process may be as follows:
    A. Organizer's computer system may recognize that a fantasy contest has concluded, and that one or more prizes need to be allocated.
    B. Organizer's computer system may identify which box won the contest.
    C. Organizer's computer system may identify the participant who selected the winning box.
    D. Organizer's computer system may recognize which prize-type was selected by the winning participant.
    E. Organizer's computer system may access the winning participant's account.
    F. Organizer's computer system may take appropriate steps to determine the best method to provide the winning participant with the prize.

Contest-Play Modes and Scoring

I. Participants may be provided with contest rules (play-modes), entry fees, and payout options prior to agreeing to enter in a particular contest.
II. A contest-play mode may limit the number of winning participants and may have predetermined prizes.
  A. See the section titled: Entry Fees and Payouts for details about entry fees and payouts.
  B. It should be noted that a predetermined prize and number of winning P(s)aoT(s)-combinations may be determined and made accessible to all participants prior to each fantasy contest.
III. Contest-play modes may state how fantasy points are calculated based on possible performance by a P(s)aoT(s) in real-world sports game.
  A. It should be noted that fantasy points may be based on predetermined scoring systems developed by the contest organizer.
IV. Non-limiting examples of contest-play modes may be as follows:
  A. Highest Cumulative Fantasy Score
    1. A predetermined number of fantasy points may be assigned to possible performance in a real-world sports game. For example, (a) in baseball: a homerun by a batter or a strikeout by a pitcher may be correlated with WW fantasy points, or (b) in football: a touchdown or reception may be correlated with XX fantasy points, or (c) in basketball: a basket or a rebound may be correlated with YY fantasy points, or (d) in hockey: a goal, assist, or goalie save may be correlated with ZZ fantasy points.
2. Prior to the start of the contest, participants may be informed of how the fantasy points may be assigned, and in this manner the participants may use their knowledge of the P(s)aoT(s) to select the box corresponding to the P(s)aoT(s) combination the participant believes will ultimately have the highest number of cumulative fantasy points.
   a. It should be noted that a P(s)aoT(s)-combination may consist of the one or more Names in a particular row and the one or more Names of a particular column.
B. The participant who selected the box that corresponds both vertically and horizontally to the row/column combination with the highest cumulative score may be the winning participant in the contest.

V. Scoring Milestones
A. Specific in-game scoring achievements made in real-world sporting event may result in fantasy points being achieved.
B. The Names on a grid may be associated with one or more milestones based on the performance of the corresponding P(s)aoT(s) during a real-world sports game. For example, (a) in baseball: the first player to get 3 total bases may result in fantasy points being awarded, (b) in football: the first quarterback to throw for 100 yards may result in fantasy points being awarded, (c) in basketball: the first player to score a free throw, a 2-pointer, and/or a 3-pointer may result in fantasy points being awarded, or (d) in hockey: the first player to have one blocked shot and/or one shot on goal may result in fantasy points being awarded.
C. When a milestone is reached, the corresponding Name featured on the grid may be assigned fantasy points correlating to that milestone.
D. These fantasy points may be used to determine which of the participants should receive a prize for having selected a box that corresponds to the row/column combination that had a cumulative scoring milestone-point total that is the highest among all participants.
   1. It should be noted that in another embodiment of the invention that uses milestones, the contest may be carried out until a milestone is reached by a P(s)aoT(s) or combination of P(s)aoT(s), at which time the contest ends and the winner may be determined by tallying the points assigned to each box on a grid.
   2. Alternatively, when a milestone is reached, the contest may continue, but a prize may be awarded to the participant who selected the box corresponding to the milestone, or is deemed to have achieved the milestone first.
   3. Alternatively, or in addition, the points awarded in conjunction with a P(s)aoT(s) achieving a milestone may be added to the cumulative point total awarded under other rules of the contest.
   4. In some embodiments of the invention, the contest may be carried out using multiple milestones.
      a. Example:
         (1) In an embodiment of the invention in which participants win prizes while the contest continues, the prizes (such as cash awards) may be allocated to participants as the P(s)aoT(s)-combinations complete the milestones first.
   5. The participant who selected the box that corresponds to a P(s)aoT(s) combination which completed the predetermined scoring milestones first during the fantasy contest may be deemed the winner of the contest.
      a. Note: The different types and number of milestones available may be determined by the contest organizer, and these types and numbers of milestones may be made known to all participants prior to each contest.

VI. A fantasy contest may be scored throughout the day and may be finalized when the last P(s)aoT(s) featured on the contest grid is finished earning fantasy points for their performance in a real-world sports game
   A. See the section titled: Duration of Fantasy Contests for details about the length of a fantasy contest.

A non-limiting example of the process of contest-play modes and scoring may be as follows:
I. Organizer's computer system may display different contest-play modes on a particular page on the website.
II. The organizer's computer system may scan information from a sports data provider to determine which real-world sports games are being played.
III. The organizer's computer system may determine which real-world sports games have P(s)aoT(s) that are identified in fantasy contests.
IV. The organizer's computer system may frequently determine the fantasy points correlated with the real-world sports games, and assign those points to the corresponding boxes on grids. This process may continue until all P(s)aoT(s) are finished competing in real-world sports games.
   A. It should be noted that a predetermined number of fantasy points may be assigned to particular performance activities that may occur in a real-world sports game, such as (and not limited to): (a) in baseball: a homerun by a batter or a strikeout by a pitcher, or (b) in football: a touchdown or reception, or (c) in basketball: a basket or a rebound, or (d) in hockey: a goal, assist, or goalie save. And these performance activities and the fantasy points they may be assigned may be made available to participants prior to each contest.
   B. Live updates on the grid may show which box and is currently winning each particular fantasy contest.
V. The box corresponding to the winning row/column in a particular fantasy contest may be displayed on the grid.
VI. The organizer's computer system may determine which participant's box corresponds to the winning row/column.

Selecting Boxes
I. A contest board structured like a grid featuring initially blank boxes may be generated for particular fantasy contests.
   A. It should be noted that contest grids may be specific to each entry fee for a particular fantasy contest.
   B. It should be noted that contest grids may feature boxes that have different entry fees than other boxes on the grid.
   C. It should be noted that if demand for a particular fantasy is high, additional grids may be offered, and in that case there may be one winner for each of the additional grids.
II. A box on the grid may correspond horizontally and vertically to two or more Names of P(s)aoT(s) forming a P(s)aoT(s) combination.

A. It should be noted that the Names of P(s)aoT(s) may vary depending on the real-world sports leagues that are the foci of the various fantasy contests.

III. When a participant selects a box on the grid of a particular fantasy contest, the image of the selected box may be modified to indicate the box is no longer available for selection.

A. It should be noted that available boxes on the grid may be blank.

IV. Participants may have a certain amount of time to enter a fantasy contest and to make box selections on the grid before that particular fantasy contest starts.

V. For example, to indicate how much time remains before a particular fantasy contest closes, two clocks may be displayed by the organizer's computer system.

A. A first one of the time clocks may be displayed after a participant has entered into a particular fantasy contest to show participants when they may begin selecting boxes on the grid for that particular fantasy contest.

B. A second one of the time clocks may be displayed to show participants when box selection must be finalized for that particular fantasy contest.

1. Note: This second time clock may also signify when the particular fantasy contest is set to begin.

2. Note: Participants may have the ability to change boxes or add boxes (if permitted by the contest) in a particular fantasy contest until this second time clock expires.

VI. When a fantasy contest starts, if a participant has entered into a particular fantasy contest and has not made box selections reflecting the paid entry fee, the organizer's computer system may select boxes at random from remaining unclaimed boxes on the grid and assigned to that participant.

VII. When a fantasy contest starts, unpurchased boxes may be blocked out and eliminated from the particular contest, or the unpurchased boxes may be deemed to belong to the contest organizer.

The following figures represent the invention as the highest cumulative fantasy score contest-play mode.

FIG. 2A shows a grid that is in keeping with the invention. It should be noted the invention may be carried out using one grid, or multiple grids, for example as depicted in FIGS. 2B and 2C. It should also be noted that in some embodiments of the invention, a row (or rows) may have more than one Name assigned to it, and/or a column (or columns) may have more than one Name assigned to it. This particular example grid begins with 100 blank boxes (numbered 1 to 100) which can be selected by participants in the contest. In this example, ten Names are placed along a horizontal axis of the grid (P(s)aoT(s) 1 through 10), and ten Names are placed along the vertical axis of the grid (Players or Teams 11 through 20). The Names associated with the horizontal axis may be different from the names associated with the vertical axis, but these two groups of Names need not be entirely different. As such, each box on the grid correlates with a particular combination of players/teams—one from the horizontal axis and one from the vertical axis.

FIG. 3 shows a non-limiting example of the 20 names of P(s)aoT(s) identified in FIG. 2A. Adjacent to each of these 20 Names is a number. This number represents the fantasy points that resulted from the performance of each P(s)aoT(s) in one or more real-world sports games. In this example, the two highlighted names, Player/Team #4 with 14 points and Player/Team #15 with 18 points, are the P(s)aoT(s) forming a P(s)aoT(s)-combination with the highest cumulative number of fantasy points achieved for their real-world sports performance. Therefore, the participant who selected the box having the highest cumulative number of fantasy points is the winner of the contest. The cumulative number of fantasy points corresponding to a particular box may be a mathematical combination (such as adding or multiplying) of the fantasy points assigned to the Names corresponding to that box.

FIG. 4 displays in one view the images of FIGS. 2 and 3. The right side image in FIG. 4 reflects the grid with 100 boxes. That grid and its function is seen and explained in FIG. 2A. The left side image in FIG. 4 reflects the names of the 20 P(s)aoT(s) and the fantasy points achieved for their performances in a real-world sports event. From the left side image of FIG. 4, it will be seen that the performance of P(s)aoT(s) #4 resulted in 14 fantasy points (the highest of the Names of horizontally listed P(s)aoT(s)) and the performance of P(s)aoT(s) #15 resulted in 18 fantasy points (the highest of the vertically listed P(s)aoT(s)). The box corresponding to P(s)aoT(s) #4 and P(s)aoT(s) #15 (the winning P(s)aoT(s) combination) is the box with the highest cumulative number of fantasy points achieved amongst all eligible P(s)aoT(s)-combinations represented on the grid. By viewing the right side image of FIG. 4, it will be seen that the winning P(s)aoT(s)-combination correlates to the box numbered 44 because box #44 has the highest cumulative number of fantasy points.

Figure 5:
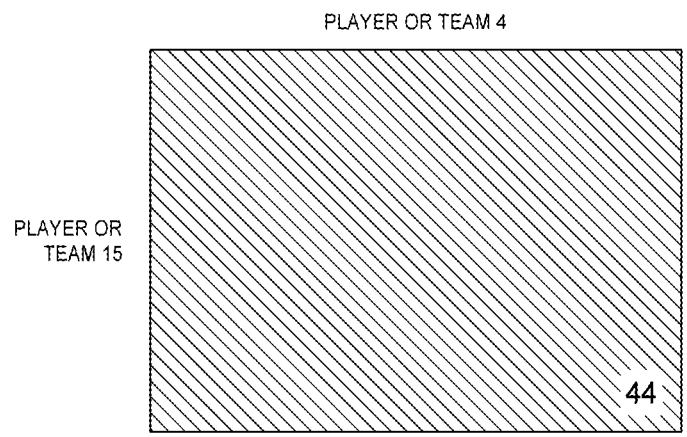
FIG. 5 depicts a particular box (numbered 44 of the grid), which in this example is the winning box for the contest.

FIG. 5 is an enlarged view of Box #44 (which in this example is the winning box of the contest) within the grid. Box #44 is a simple example of a box that correlates to the P(s)aoT(s)-combination having the highest cumulative number of fantasy points. In this example, the P(s)aoT(s)-combination that has the highest cumulative number of fantasy points consists of P(s)aoT(s) #4 and P(s)aoT(s) #15.

Of the horizontally-listed Names, the column corresponding to P(s)aoT(s) #4 is the winning column within the grid, and of the vertically-listed Names, the row corresponding to P(s)aoT(s) #15 is the winning row within the grid. Within the grid, Box #44 is the winning box in this example because it is both (a) in the same row as P(s)aoT(s) #15, and (b) in the same column as P(s)aoT(s) #4.

Figure 6B:
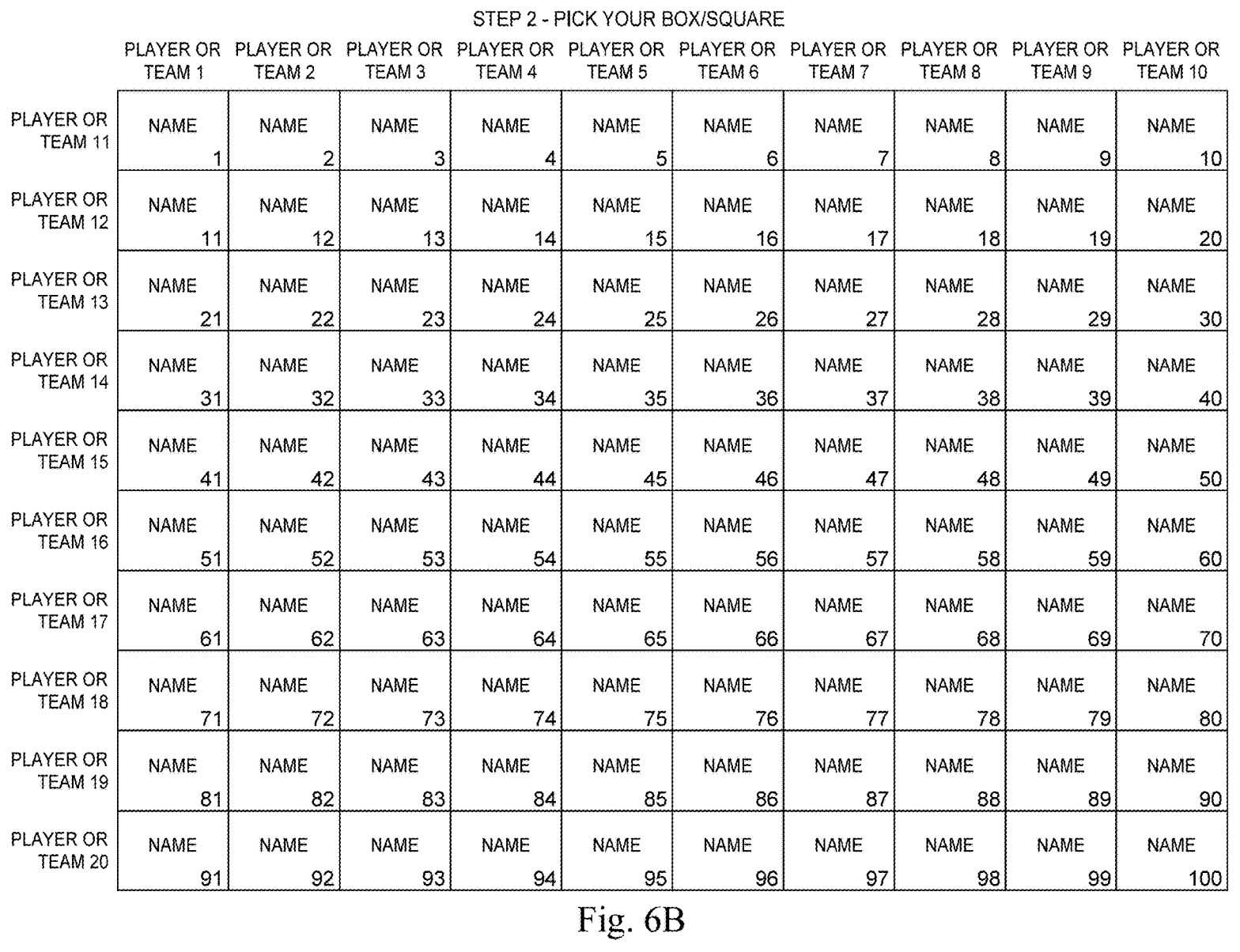
Figure 6D:
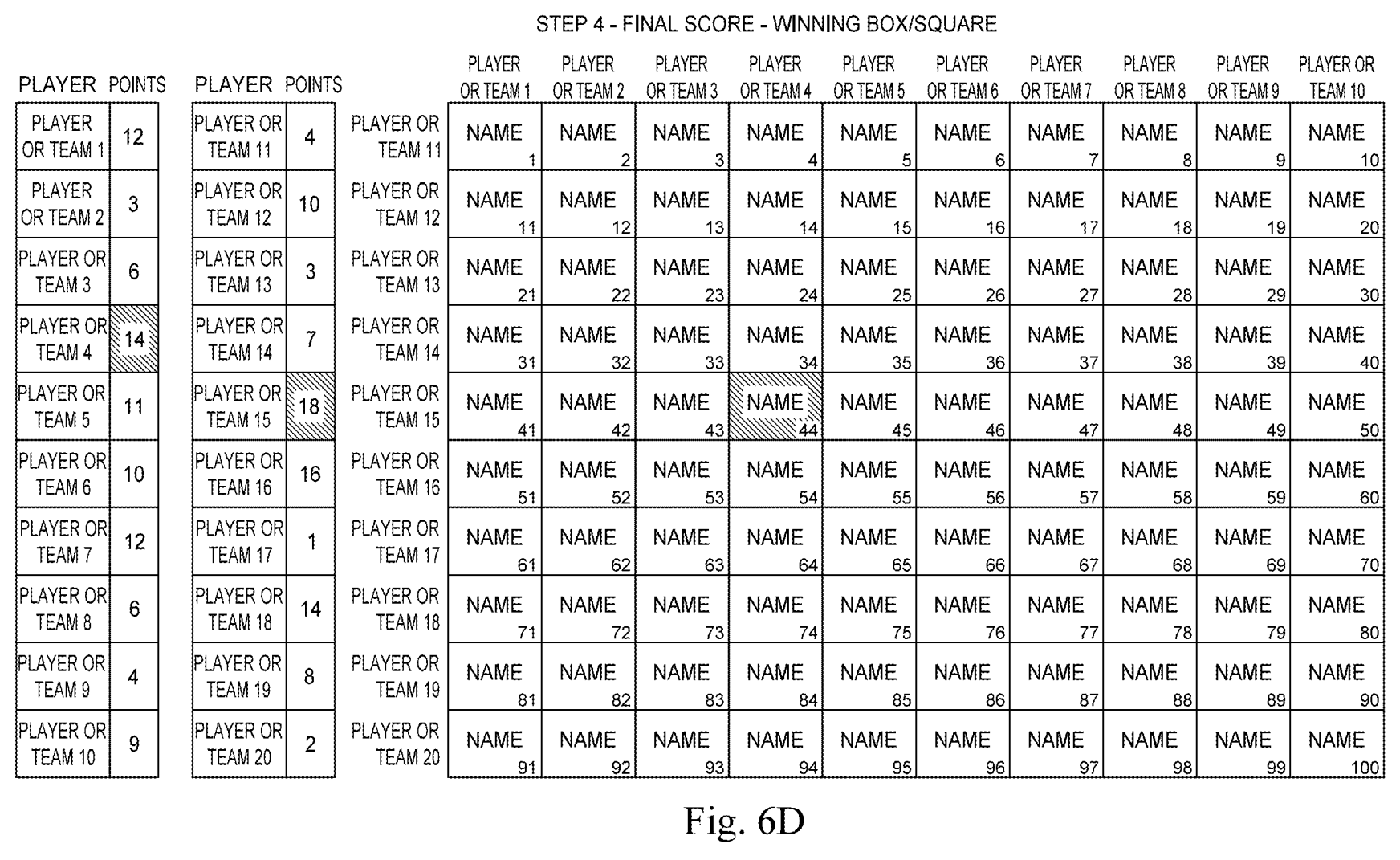

FIG. 6 is a series of figures depicting how the contest may be conducted in stages, from beginning to end. FIG. 6 flows sequentially starting with the top left illustration, continuing to the bottom left illustration, then to the top right illustration, and ending with the bottom right illustration. Initially, all P(s)aoT(s)-combinations of Names that are available for participants to be selected are assigned to columns and rows of the grid. Step 2 shows the names of participants in the boxes on the grid. Step 3 shows the progression of the contest with live updates of the cumulative fantasy points achieved by each of the combinations. Step 4 shows information at the conclusion of the contest.

In this example, the participant who previously selected box #44 is the winner of the contest, because box #44 correlates both horizontally and vertically to the winning P(s)aoT(s)-combination that received the highest cumulative fantasy score. Box #44 is highlighted.

Figure 7:
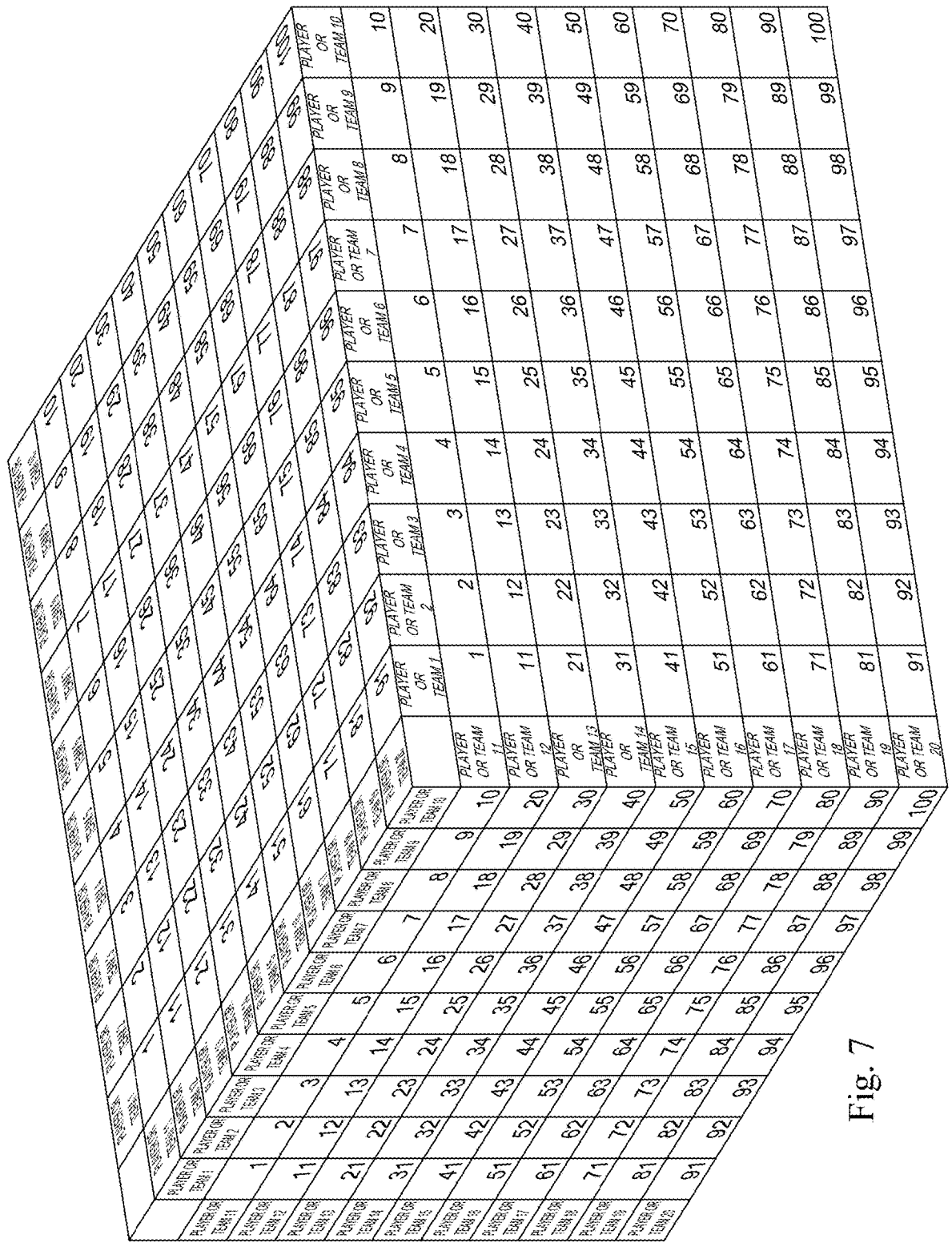
FIG. 7 depicts a plurality of contest grids displayed on a 3-dimensional object, in this case a cube.

FIG. 7 depicts a manner in which a plurality of contest grids may be displayed. The contest grids may be displayed (e.g., on a computer monitor) as a three-dimensional object with individual contest grids arranged to appear on different faces of the three-dimensional object. The three-dimensional object, such as a cube, may be rotated in order to display the various contest grids that appear on the faces of the three-dimensional object. A three-dimensional object is not limited to a particular geometric shape, but rather may be virtually any geometrical shape.

In some instances, the contest grids on each face of the 3D object may feature horizontally and vertically placed Names specific to each contest grid. In other instances, some contest grids on faces of the 3D object may feature some horizontally and/or vertically placed Names that are the same. That is to say that in a contest having multiple grids, the Names on the grids may be listed only once across all grids, or some Names may be repeated (i.e. appear on more than one grid).

Figure 8A:
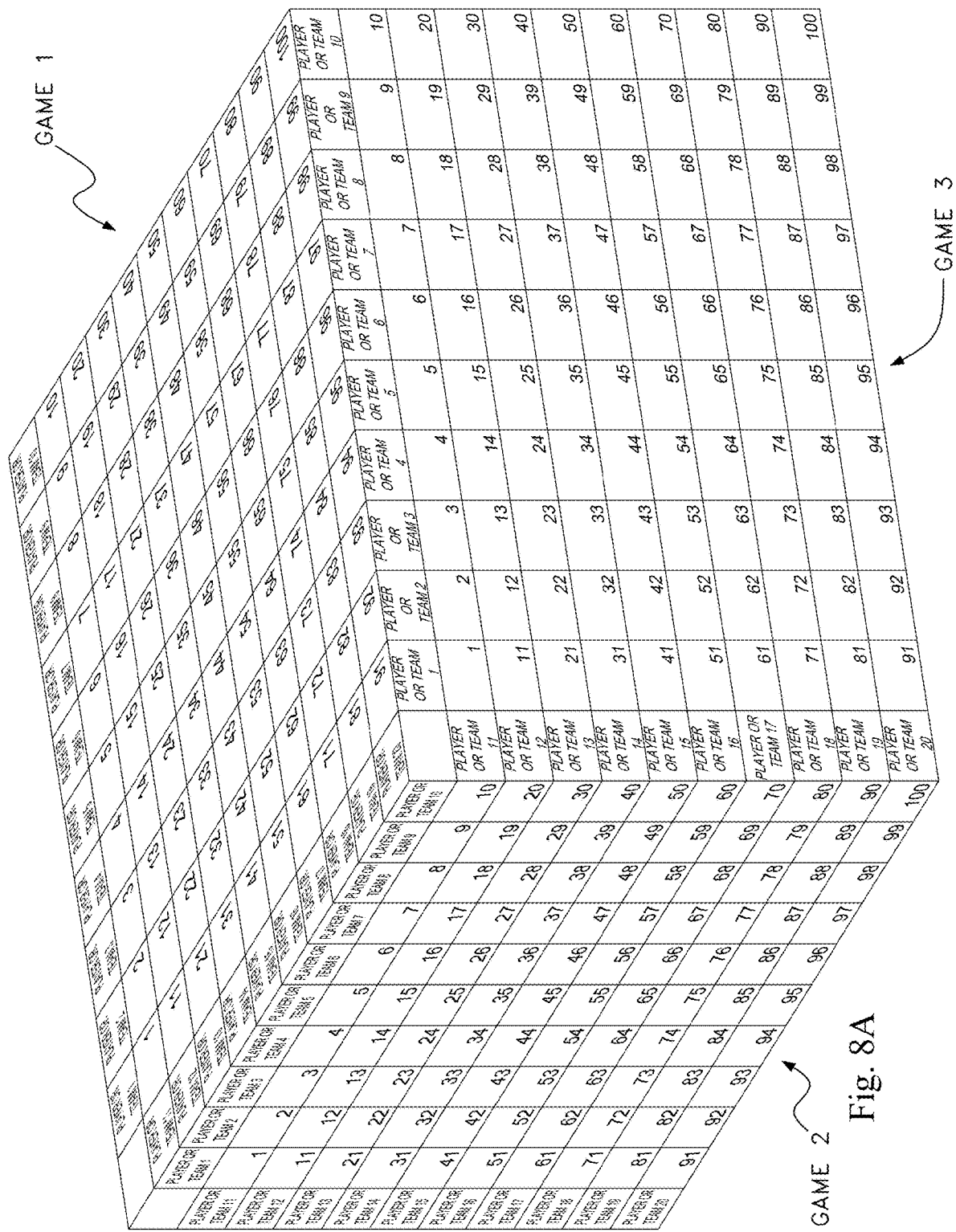
Figure 8B:
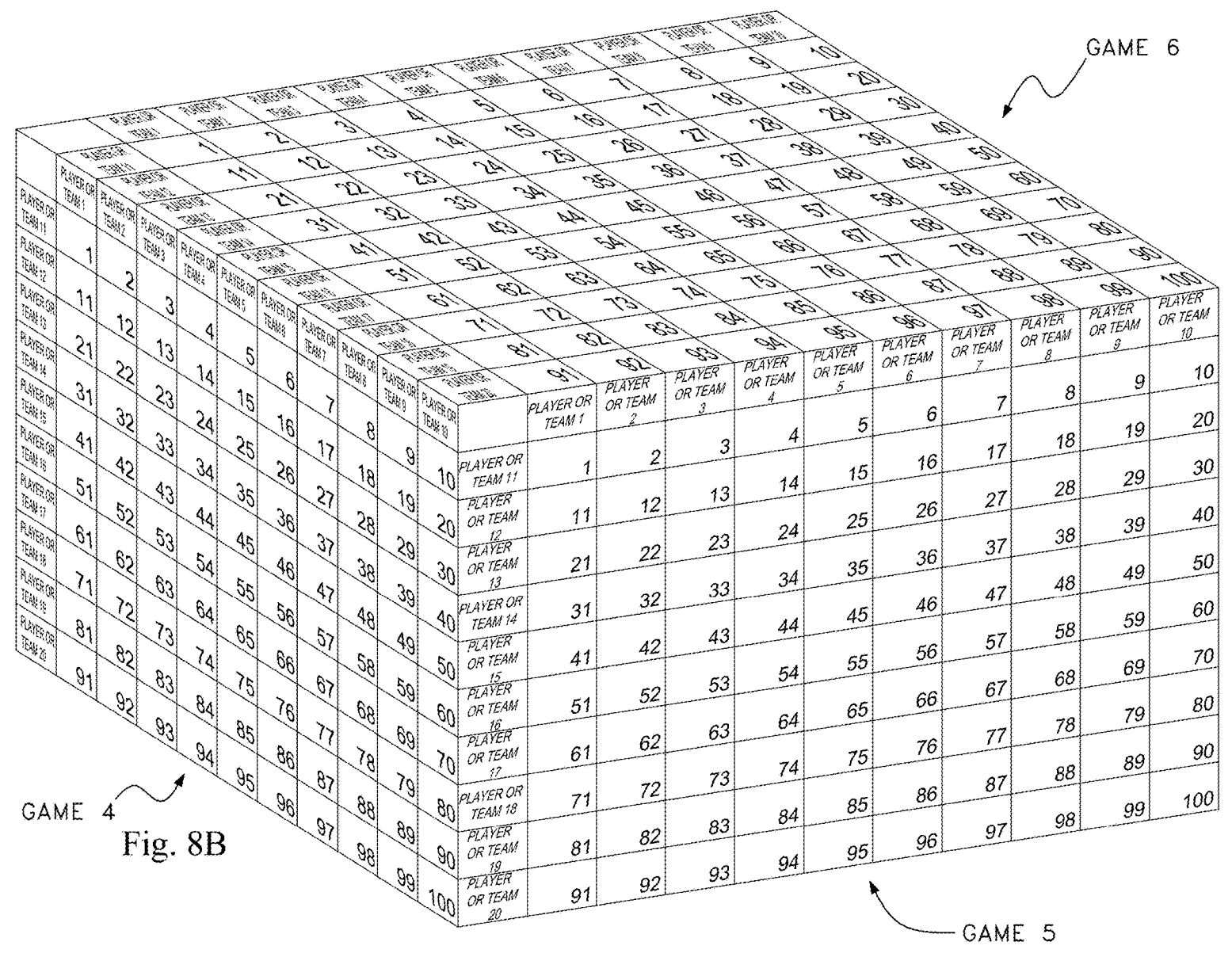

FIGS. 8A and 8B depict a manner in which the contest grids on each face may feature some horizontally and/or vertically placed Names that are the same. In FIGS. 8A and 8B, at the edges of the cube, some adjacent boxes are gray: These gray boxes have the same Name. Also in FIGS. 8A and 8B, at the edges of the cube where Names are placed, the adjacent white boxes do not have the same Name. Specific to this example, the following contest grids will feature some horizontally and/or vertically placed Names that are the same: Game 1 intersects with contests 2 & 3; Game 2 intersects with contests 1 & 4; Game 3 overlaps with contests 1 & 5; Game 4 overlaps with contests 2 & 6; Game 5 overlaps with contests 3 & 6; Game 6 overlaps with contests 4 & 5.

Figure 9:
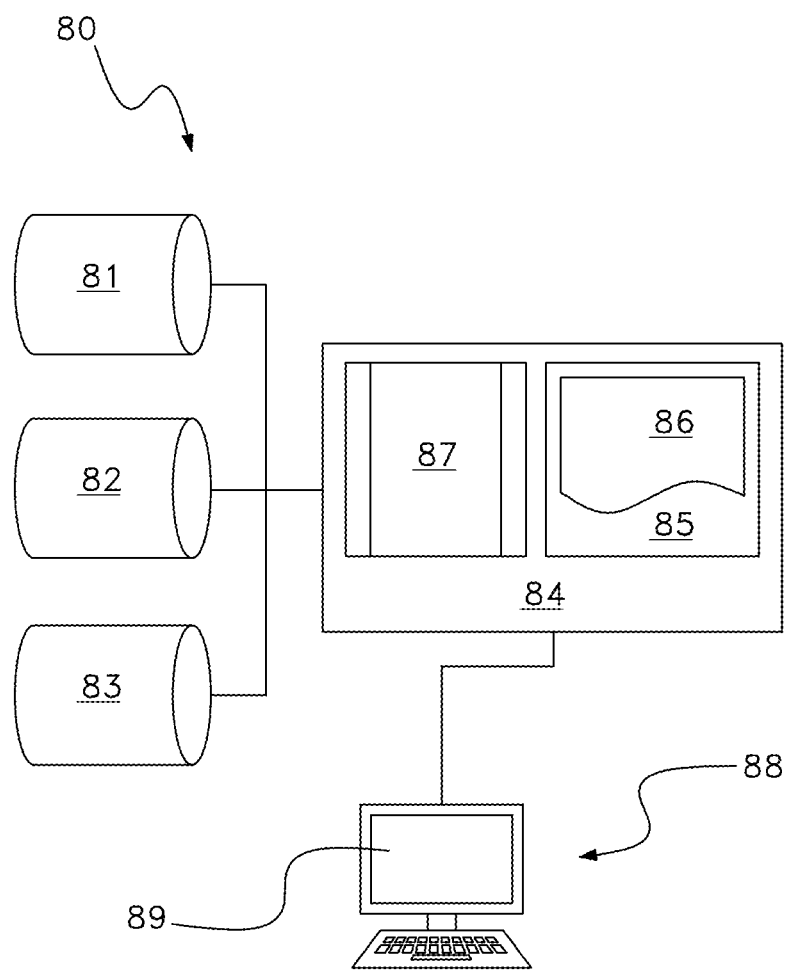
FIG. 9 depicts a contest management system that is in keeping with the invention.

FIG. 9 depicts a contest management system 80 that is in keeping with the invention. Contest management system 80 may comprise a contest definition database 81 for storing contest-definition information, a participant information database 82 for storing participant information, a contest information database 83 for storing contest information, and a processing apparatus 84 comprising at least one non-transitory memory 85 having computer-executable program code 86 stored thereon, and at least one processor 87 capable of executing the program code. The processor 87, the at least one non-transitory memory 85, and the program code 86 may be configured to cause the processing apparatus 84 to enable contest participants to interact with the contest management system via a graphical user interface (GUI) 89 of a participant device 88, the GUI being configured by a contest organizer to provide contest configuration information to contest participants, and enable contest participants to participate in the contest via the participant device 88; receive configuration information provided by the contest organizer via a device associated with the contest organizer; and store the configuration information in the contest definition database. It should be noted that, in some embodiments, participant device 88 may comprise all or a portion of processing apparatus 84.

The configuration information may be provided via the GUI 89 to contest participants in the form of a grid having rows and columns, each intersection of one or the rows with one of the columns forming a box, wherein participants are able to select one or more of the boxes in order to participate in the contest, and wherein each column is associated with a Name of a real-world sports player or sports team, and each row is associated with a Name of a real-world sports player or sports team, and wherein each Name is associated prior to boxes being selected by participants. Although the figures show the Names outside the boxes, the Names may be placed inside the boxes.

Figure 10:
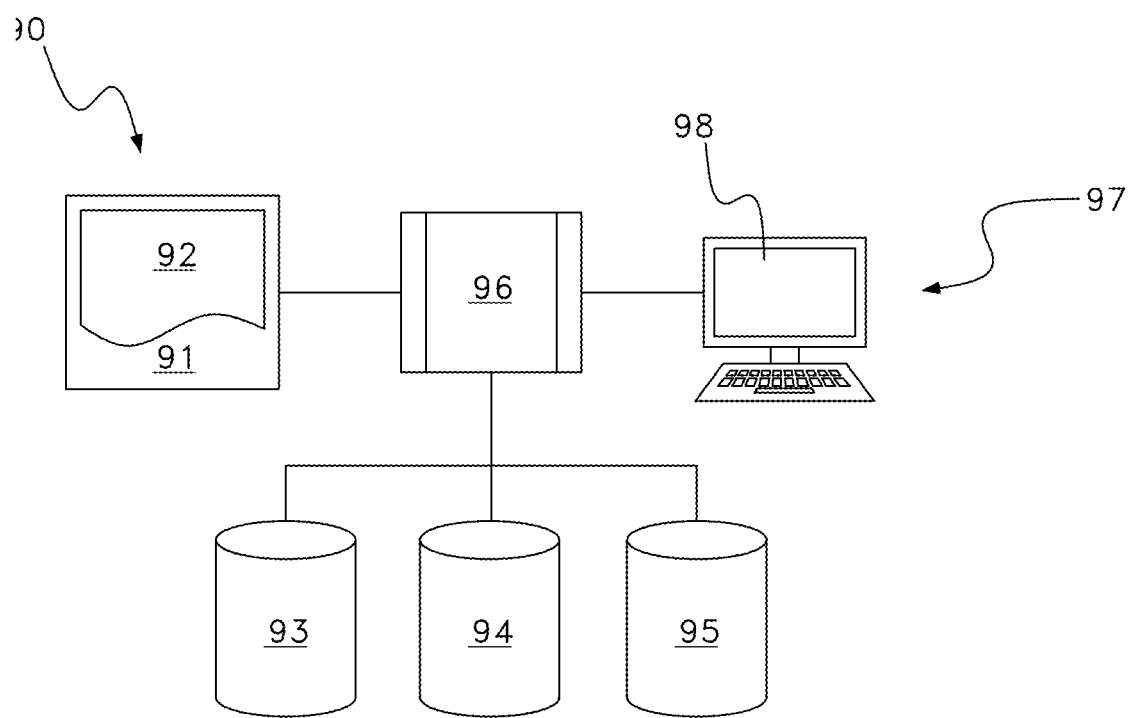
FIG. 10 depicts a contest management computer program product that is in keeping with the invention.

FIG. 10 depicts a contest management computer program product 90 that is in keeping with the invention. The computer program product 90 may comprise at least one non-transitory computer-readable storage medium 91 having computer-executable program code 92 stored therein. The computer-executable program code 92 may comprise instructions comprising program code instructions for accessing a contest definition database 93 for storing contest-definition information, accessing a participant information database 94 for storing participant information, accessing a contest information database 95 for storing contest information, and causing a processing apparatus 96 having at least one processor capable of executing the program code 92 to: enable contest participants to interact with a contest management system via a graphical user interface 98 (the "GUI") of a participant device 97, the GUI 98 being configured by a contest organizer to provide contest configuration information to contest participants, and enable contest participants to participate in the contest via a participant device 97; receive configuration information provided by the contest organizer via a device associated with the contest organizer; and store the configuration information in the contest definition database. It should be noted that, in some embodiments, participant device 97 may comprise all or a portion of processing apparatus 96.

The configuration information may be provided via the GUI 98 to contest participants in the form of a grid having rows and columns, each intersection of one or the rows with one of the columns forming a box, wherein participants are able to select one or more of the boxes in order to participate in the contest, and wherein each column is associated with a Name of a real-world sports player or sports team, and each row is associated with a Name of a real-world sports player or sports team, and wherein each Name is associated prior to boxes being selected by participants.

Figure 11:
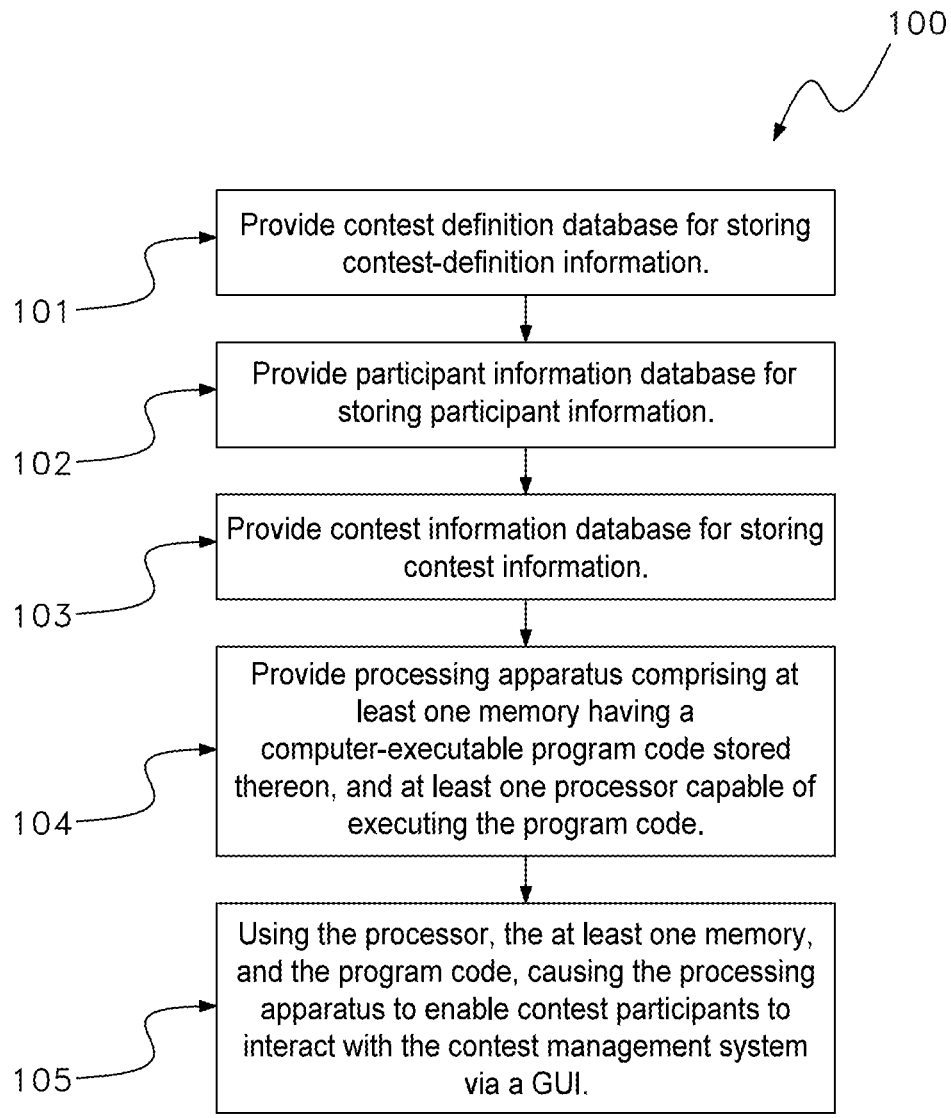
FIG. 11 is a flow chart depicting a method that is in keeping with the invention.

FIG. 11 is a flow chart depicting a method 100 that is in keeping with the invention. Method 100 may comprise, at 101, providing a contest definition database for storing contest-definition information. At 102, the method 100 may comprise providing a participant information database for storing participant information. At 103, the method 100 may comprise providing a contest information database for storing contest information. At 104, the method 100 may comprise providing a processing apparatus comprising at least one memory having computer-executable program code stored thereon, and at least one processor capable of executing the program code. At 105, the method 100 may comprise using the processor, the at least one memory, and the program code, causing the processing apparatus to enable contest participants to interact with the contest management system via a graphical user interface (GUI), the GUI being configured by a contest organizer to provide contest configuration information to contest participants, and enable contest participants to participate in the contest via a participant device; receive configuration information provided by the contest organizer via a device associated with the contest organizer; and store the configuration information in the contest definition database. The configuration information may be provided to contest participants via the GUI in the form of a grid having rows and columns, each intersection of one of the rows with one of the columns forming a box, wherein participants are able to select one or more of the boxes in order to participate in the contest, and wherein each column is associated with a Name of a real-world sports player or sports team, and each row is associated with a Name of a real-world sports player or sports team, and wherein each Name is associated prior to boxes being selected by participants.

FIG. 12 shows a grid that is in keeping with the invention when multiple P(s)aoT(s) box selections by a participant function as a combination to account for a total cumulative score of all P(s)aoT(s) boxes selected. It should be noted the invention may be carried out using one grid, or multiple grids. It should also be noted that in some embodiments of the invention, a row (or rows) may have more than one Name assigned to it, and/or a column (or columns) may have more than one Name assigned to it. FIGS. 12 and 13 show examples of this. These particular examples each have a grid with 100 P(s)aoT(s) boxes (numbered 1 to 100), which can be selected by participants in the contest. In these examples, ten Names have been placed along a horizontal axis of the grid (P(s)aoT(s) (numbered 1 through 10), and ten Names are placed along a vertical axis of the grid (P(s)aoT(s) (numbered 11 through 20). The Names associated with the horizontal axis may be different from the Names associated with the vertical axis, but these two groups of Names need not be entirely different. As such, each P(s)aoT(s) box on the grid correlates with a particular combination of players/teams—one combination from the horizontal axis and one combination from the vertical axis. In the examples depicted in FIG. 13 and FIG. 14, a participant may be required to select three P(s)aoT(s) boxes in order to identify three combinations. The cross-hatched P(s)aoT(s) boxes on FIG. 13 identify the three combinations of P(s)aoT(s) boxes (14, 48, 62) selected by a participant, and the points that are ultimately associated with these three P(s)aoT(s) boxes may be mathematically combined (such as by adding or multiplying) together to produce one cumulative fantasy score for the participant that selected these three P(s)aoT(s) boxes. Similarly, for the grid depicted in FIG. 14, the cross-hatched P(s)aoT(s) boxes on FIG. 14 identify the three combinations of P(s)aoT(s) boxes (14, 48, 62) selected by a participant, and the points that are ultimately associated with these three P(s)aoT(s) boxes will be mathematically combined (such as by adding or multiplying) together to produce one cumulative fantasy score for the participant that selected these three P(s)aoT(s) boxes.

Figure 15:
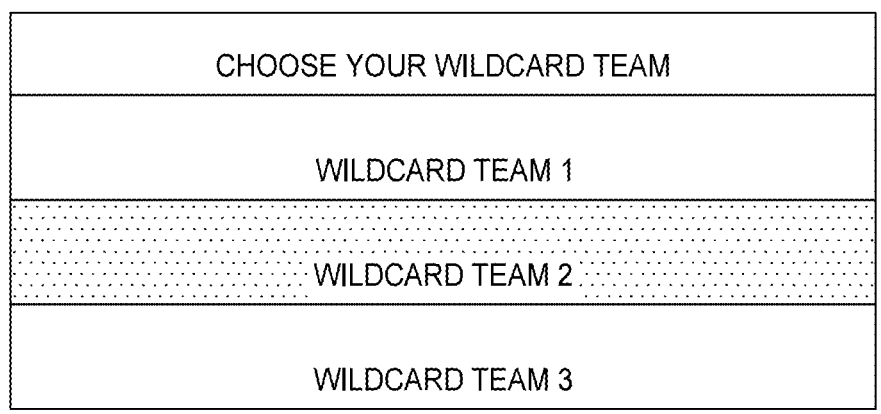
FIG. 15 depicts a list of the Wildcard Team ("WcT") options a participant may select in a particular contest.

FIG. 15 shows a list of WcT options a participant may select in a given contest. In this particular example, the participant may select one of the three available Wildcard Teams to supplement their P(s)aoT(s) box selection(s) in a given contest.

Figure 17:
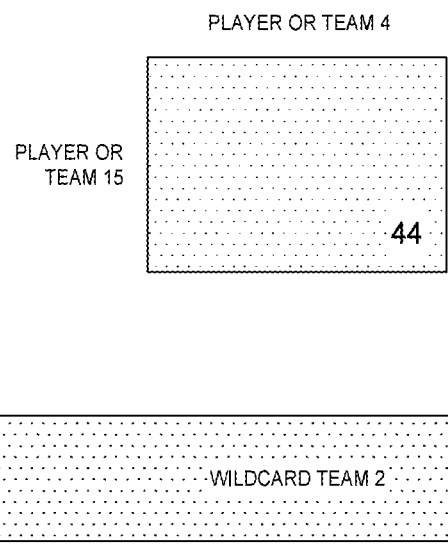
FIG. 17 is an enlarged view of a participant's selection of P(s)aoT(s) Box #44 and WcT #2 in a given contest.

FIG. 16 shows a grid according to the invention in which a participant selected P(s)aoT(s) Box #44 and WcT #2. In this example of the invention, the points attributed to P(s)aoT(s) Box #44 and the points attributed to WcT #2 are combined to produce the cumulative total fantasy points for the participant that selected P(s)aoT(s) Box 44 and WcT #2. The participant who previously selected the P(s)aoT(s) Box #44 and WcT #2 may be the winner of the contest if his/her cumulative point total is the highest of all participants. FIG. 17 is an enlarged view of a participant's selected P(s)aoT(s) Box #44 and WcT #2. The fantasy score for P(s)aoT(s) Box #44 and the fantasy score for WcT #2 may be mathematically combined (such as by adding or multiplying) together to provide one cumulative fantasy score, which is then compared to other cumulative fantasy scores to determine which participant won the contest.

FIG. 18 shows a grid in which a participant selected three P(s)aoT(s) boxes (Boxes #14, #48, #62) and one WcT (WcT #2). In this implementation of the invention, the mathematical combination (e.g. adding or multiplying) the scores for the three selected P(s)aoT(s) boxes with the score for the selected WcT will be the cumulative fantasy score for that participant. The participant having the highest cumulative fantasy score may be deemed the winner of the contest. FIG. 19 is an enlarged view of a participant's selected P(s)aoT(s) box combination #14, #48, #62 and WcT #2. The cumulative fantasy score of the P(s)aoT(s) box combination #14, #48, #62 and WcT #2 will be combined to provide one total cumulative fantasy score for the participant.

Figure 20:
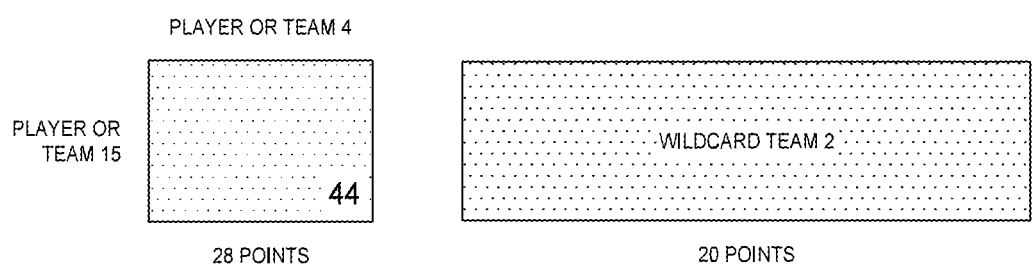
FIG. 20 is an enlarged view of the winning selection of P(s)aoT(s) Box #44 and WcT #2 in a particular contest.

FIG. 20 is an enlarged view of an example winning selection of P(s)aoT(s) box #44 and WcT #2 in a given contest. In this example, Box #44 received 28 fantasy points and WcT #2 received 20 fantasy points for a total cumulative fantasy score of 48 points. In this particular contest, this cumulative fantasy score (48 points) was the highest total cumulative fantasy score among all other participants in that contest. The participant who selected Box #44 and WcT #2 may be deemed the winner of the contest.

Figure 21:
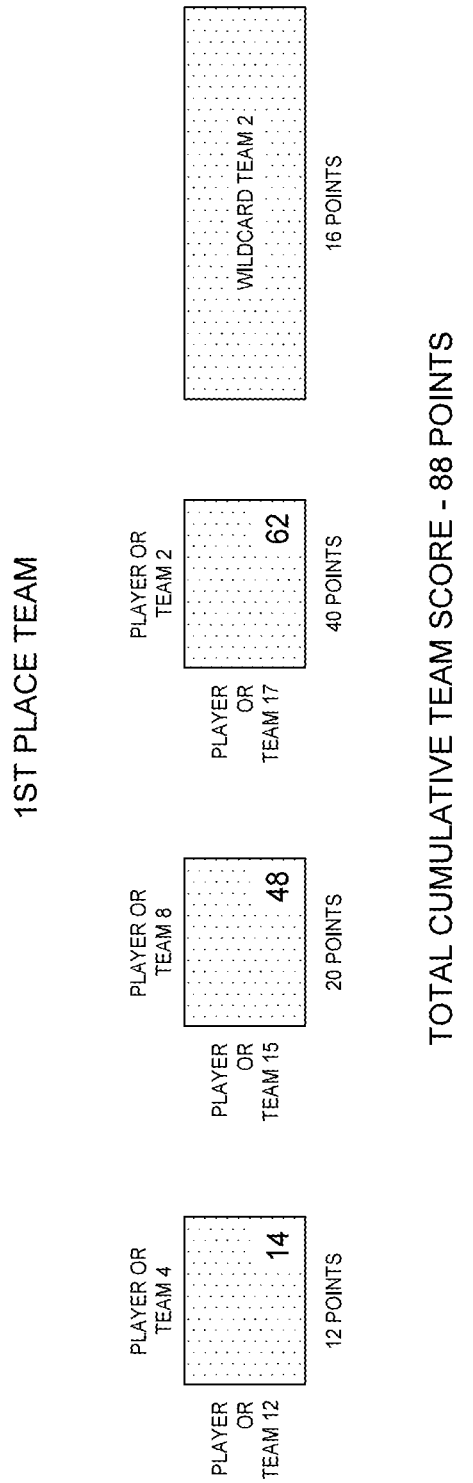
FIG. 21 is an enlarged view of the winning selection of P(s)aoT(s) box combinations #14, #48, and #62 and WcT #2.

FIG. 21 is an enlarged view of an example winning selection of P(s)aoT(s) box #44 and WcT #2 in a given contest. In this example, Box #44 received 28 fantasy points and WcT #2 received 20 fantasy points for a total cumulative fantasy score of 48 points. In this particular contest, this cumulative fantasy score (48 points) was the highest total cumulative fantasy score among all other participants in that contest. The participant who selected Box #44 and WcT #2 may be deemed the winner of the contest.

FIG. 22 shows a contest grid according to the invention in which a participant selected a combination of P(s)aoT(s) Boxes #14, #48, #62 and WcT #2. In this variation of the contest, the fantasy points for the P(s)aoT(s) boxes selected by a participant along with the participant's selected WcT are mathematically combined (such as by adding or multiplying) together to provide a cumulative fantasy score for that participant. The participant who has the highest cumulative fantasy score may be deemed the winner of the contest. In this particular example of a contest, each participant may not select boxes from within the same row and/or within the same column. Each selected box must not share a row or column associated with another selected box.

Further Discussion of the Wildcard Teams

In some embodiments of the invention, in addition to selecting a P(s)aoT(s) box or boxes displayed on a grid, participants in a fantasy sports contest carried out according to the invention may select a box identified as being associated with a Wildcard Team ("WcT"). Selection of a WcT can be a part of contests that are in keeping with the invention in which a participant selects one P(s)aoT(s) box from a grid or more than one P(s)aoT(s) box from the grid, regardless of whether the scores of the boxes are combined or not. A list of WcTs may be generated randomly by a computer algorithm, and then displayed to participants for selection prior to the start of each contest. For example, a list of three WcT names may be presented to all participants, and the participants may be invited to pick from that list. The name of each WcT may be displayed below the P(s)aoT(s) grid. In some embodiments of the invention, participants may select one of the displayed WcT names, but in other embodiments of the invention more than one WcT name may be selected.

When a participant in a fantasy sports contest selects a P(s)aoT(s) box, one or more WcT names may be presented to the participant for selection via a graphical user interface. In some embodiments of the invention, the same list of WcT names may be presented to each participant regardless of which P(s)aoT(s) box is selected, and thus two or more participants may ultimately select the same combination of P(s)aoT(s) box(es) and WcT name(s).

However, multiple lists of WcTs may be used so that selection of one particular P(s)aoT(s) box results in a different list of WcT names being presented relative to selection of another P(s)aoT(s) box, and this embodiment of the invention may be carried out so as to allow or prevent two or more participants to ultimately select the same combination of P(s)aoT(s) box(es) and/WcT names. In one example of this embodiment of the invention, more than one participant can select a particular P(s)aoT(s) box, but those selecting the same P(s)aoT(s) box would be presented with a different list of WcT names. Alternatively, the invention may be carried out so that no two participants can select the same P(s)aoT(s) box, and the list of WcT names presented to each participant would be entirely different or the same: Or, the WcT name list could include one or more WcT names that are the same and one or more WcT names that are different from those presented to other participants.

For example, in some embodiments of the invention, only one participant may be permitted to select a specific P(s)aoT(s) box and then that participant can select any WcT name from the list. Put differently, a fantasy contest according to the invention may be carried out so that only one participant is permitted to select a particular P(s)aoT(s) box, and then that participant may be allowed to select from the list of WcT names that are presented to all participants. In such a contest, no two participants will have the same combination of selections, even though some participants may have selected the same WcT name.

In other embodiments of the invention, more than one participant can select the same P(s)aoT(s) box and the same WcT name. In such a contest, participants may have the same combination of selections.

And, in yet another variation of the invention, more than one participant can select the same P(s)aoT(s) box, but those that do select the same P(s)aoT(s) box would be required to select a different WcT name. Put differently, within the same contest a P(s)aoT(s) box may be selected by multiple participants, and each participant selecting that particular P(s)aoT(s) box would be required to select a different WcT option. In such a contest, no two participants will have the same combination of selections.

In another variation of the invention, a contest may be carried out so that each P(s)aoT(s) box has a predetermined WcT name assigned to it. Such coupling of a P(s)aoT(s) box with a predetermined WcT name may be carried out so that some participants have the same WcT and a different P(s)aoT(s) so that no other participant has the same pairing. Alternatively, the contest may be carried out so the more than one participant can select a particular P(s)aoT(s) box and the predetermined WcT name.

Further, some embodiments of the invention may predetermine WcT names for a specific P(s)aoT(s) box, and when a participant selects that P(s)aoT(s) box, the predetermined WcT names will be presented to that participant for selection. Some of those embodiments may allow only one participant to select that P(s)aoT(s) box. Alternatively, some of those embodiments may allow more than one participant to select that P(s)aoT(s) box, and then require each participant that selects that P(s)aoT(s) box to select a different WcT name from the predetermined list. Or, some embodiments of the invention may permit multiple participants to select the same P(s)aoT(s) box and WcT name.

As an example, each WcT may be comprised of multiple sports players from the same sports team. Examples of such a WcT include the following: a football team's defensive players or team defense, a hockey team's goalies or team goalies, a baseball team's pitchers or team pitching staff, a basketball team's non-starting players or team bench players. The fantasy points assigned to a particular WcT may be the cumulative real-world performance of all of the players who make up that WcT team. Fantasy points assigned to a WcT may be determined using a predetermined scoring system developed by the contest organizer. For example (using example-instances that may occur in a real-world sports game), a predetermined number of fantasy points may be assigned to particular performance activities that may occur in a real-world sports game, such as (and not limited to):

(a) in baseball, innings pitched or strike-outs from a WcT's pitcher; or
(b) in football, interceptions or sacks from a WcT's defensive players; or
(c) in basketball, a baskets or assists by a WcT's non-starting players; or
(d) in hockey, saves by a WcT's goalie.

In some embodiments of the invention, a participant may select a P(s)aoT(s) box from the grid and additionally may select a WcT name from the available list. In other embodiments of the invention, a participant may select one (or more) WcT name(s) for each P(s)aoT(s) box selected by a participant in a contest. For a particular participant, the cumulative fantasy score from the selected P(s)aoT(s) box or boxes may be a mathematical combination (e.g. adding or multiplying) with the cumulative score of the selected WcT(s). The participant that ultimately has the highest number of cumulative fantasy points may then be deemed the winner of the contest.

Combo Pick

In another embodiment of the invention, participants in a fantasy sports contest may select a combination of P(s)aoT(s) boxes displayed to them via a grid, and count as one total cumulative score the mathematical combination (e.g. adding or multiplying) of the points awarded to each of those selected P(s)aoT(s) boxes. For example, a participant may select two or more P(s)aoT(s) boxes with from the grid. The number of P(s)aoT(s) boxes a participant can select that will function as that participant's combination of P(s)aoT(s) boxes may be determined and made known to the participant prior to the start of the contest. The winning combination of P(s)aoT(s) boxes for a particular contest grid may be that combination of P(s)aoT(s) boxes having the largest number of cumulative fantasy points. The participant who previously selected the combination of P(s)aoT(s) boxes correlating with the P(s)aoT(s) combination having the largest number of cumulative fantasy points may then be deemed the winner of the contest. In some embodiments of the invention participants may be barred from selecting more than one P(s)aoT(s) box from the same row and/or the same column. However, in other embodiments of the invention participants may be permitted to select P(s)aoT(s) boxes from the same row and/or the same column. In some embodiments of the invention, within the same contest participants may be permitted to select more than one combination of P(s)aoT(s) boxes, or entries of combinations. Further, in some embodiments of the invention:

(a) each participant in a particular contest may be required to select P(s)aoT(s) box combinations that are different from other participants; or
(b) participants in a particular contest may be permitted to select a combination of P(s)aoT(s) boxes that is the same as a combination selected by another participant.

Figure 23:
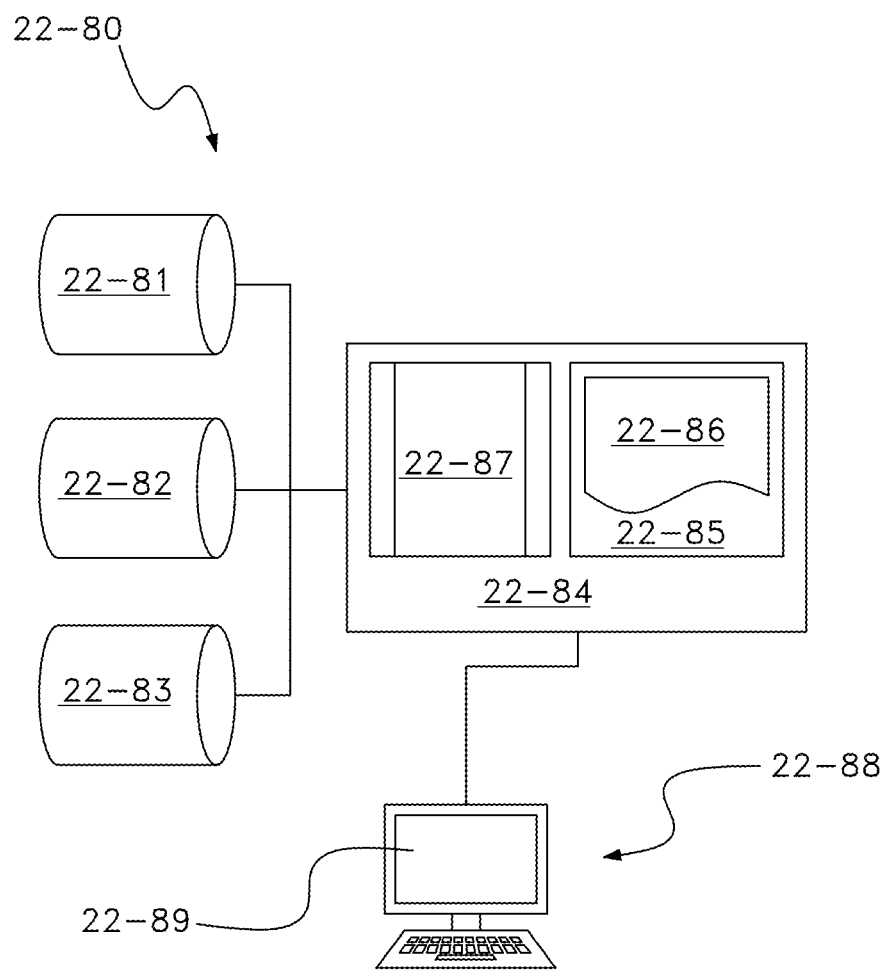
FIG. 23 depicts a contest management system that is in keeping with the invention.

FIG. 23 depicts a contest management system 22-80 that is in keeping with the invention. Contest management system 22-80 may comprise a contest definition database 22-81 for storing contest-definition information, a participant information database 22-82 for storing participant information, a contest information database 22-83 for storing contest information, and a processing apparatus 22-84 comprising at least one non-transitory memory 22-85 having computer-executable program code 22-86 stored thereon, and at least one processor 22-87 capable of executing the program code. The processor 22-87, the at least one non-transitory memory 22-85, and the program code 22-86 may be configured to cause the processing apparatus 22-84 to enable contest participants to interact with the contest management system via a graphical user interface (GUI) 22-89 of a participant device 22-88 (such as a cell phone or computer controlled by a participant), the GUI being configured by a contest organizer to provide contest configuration information to contest participants, and enable contest participants to participate in the contest via the participant device 22-88; receive configuration information provided by the contest organizer via a device associated with the contest organizer (such as a computer controlled by the organizer); and store the configuration information in the contest definition database. It should be noted that, in some embodiments, participant device 88 may comprise all or a portion of processing apparatus 84.

The configuration information may be provided via the GUI 22-89 to contest participants in the form of a grid having rows and columns, each intersection of one or the rows with one of the columns forming a box, wherein participants are able to select one or more of the boxes in order to participate in the contest, and wherein each column is associated with a Name of a real-world sports player or sports team, and each row is associated with a Name of a real-world sports player or sports team, and wherein each Name is associated prior to boxes being selected by participants. Although the figures show the Names outside the boxes, the Names may be placed inside the boxes.

The configuration information, which may be provided to contest participants via the GUI 22-89, may include one or more wildcards not displayed via the grid, and which may be selected by a participant that has selected a box from the grid, or a wildcard may be assigned to a particular box. Each of the wildcard options may correspond to a real-world sports player or group of real-world sports players that is not among the Names associated with the rows or columns of the grid, and contest participants are able to select or are assigned at least one of the one or more wildcard options as part of participating in the contest.

Figure 24:
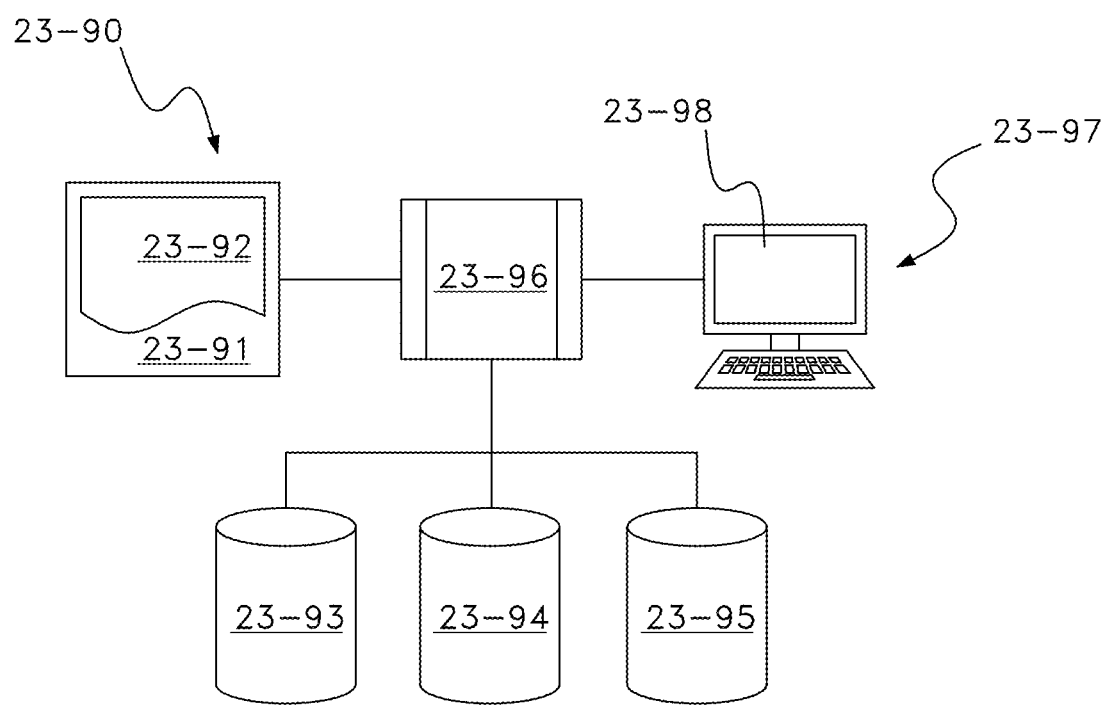
FIG. 24 depicts a contest management computer program product that is in keeping with the invention.

FIG. 24 depicts a contest management computer program product 23-90 that is in keeping with the invention. The computer program product 23-90 may comprise at least one non-transitory computer-readable storage medium 23-91 having computer-executable program code 23-92 stored therein. The computer-executable program code 23-92 may comprise instructions comprising program code instructions for accessing a contest definition database 23-93 for storing contest-definition information, accessing a participant information database 23-94 for storing participant information, accessing a contest information database 23-95 for storing contest information, and causing a processing apparatus 23-96 having at least one processor capable of executing the program code 23-92 to: enable contest participants to interact with a contest management system via a graphical user interface 23-98 (the "GUI") of a participant device 23-97 (such as a cell phone or computer controlled by a participant), the GUI 23-98 being configured by a contest organizer to provide contest configuration information to contest participants, and enable contest participants to participate in the contest via a participant device 23-97; receive configuration information provided by the contest organizer via a device associated with the contest organizer (such as a computer controlled by the organizer); and store the configuration information in the contest definition database. It should be noted that, in some embodiments, participant device 23-97 may comprise all or a portion of processing apparatus 23-96.

The configuration information may be provided to contest participants via the GUI 23-98 in the form of a grid having rows and columns, each intersection of one or the rows with one of the columns forming a box, wherein participants are able to select one or more of the boxes in order to participate in the contest, and wherein each column is associated with a Name of a real-world sports player or sports team, and each row is associated with a Name of a real-world sports player or sports team, and wherein each Name is associated prior to boxes being selected by participants.

The configuration information, which may be provided to contest participants via the GUI 22-89, may include one or more wildcards not displayed via the grid, and which may be selected by a participant that has selected a box from the grid, or a wildcard may be assigned to a particular box. Each of the wildcard options may correspond to a real-world sports player or group of real-world sports players that is not among the Names associated with the rows or columns of the grid, and contest participants are able to select or are assigned at least one of the one or more wildcard options as part of participating in the contest.

Figure 25:
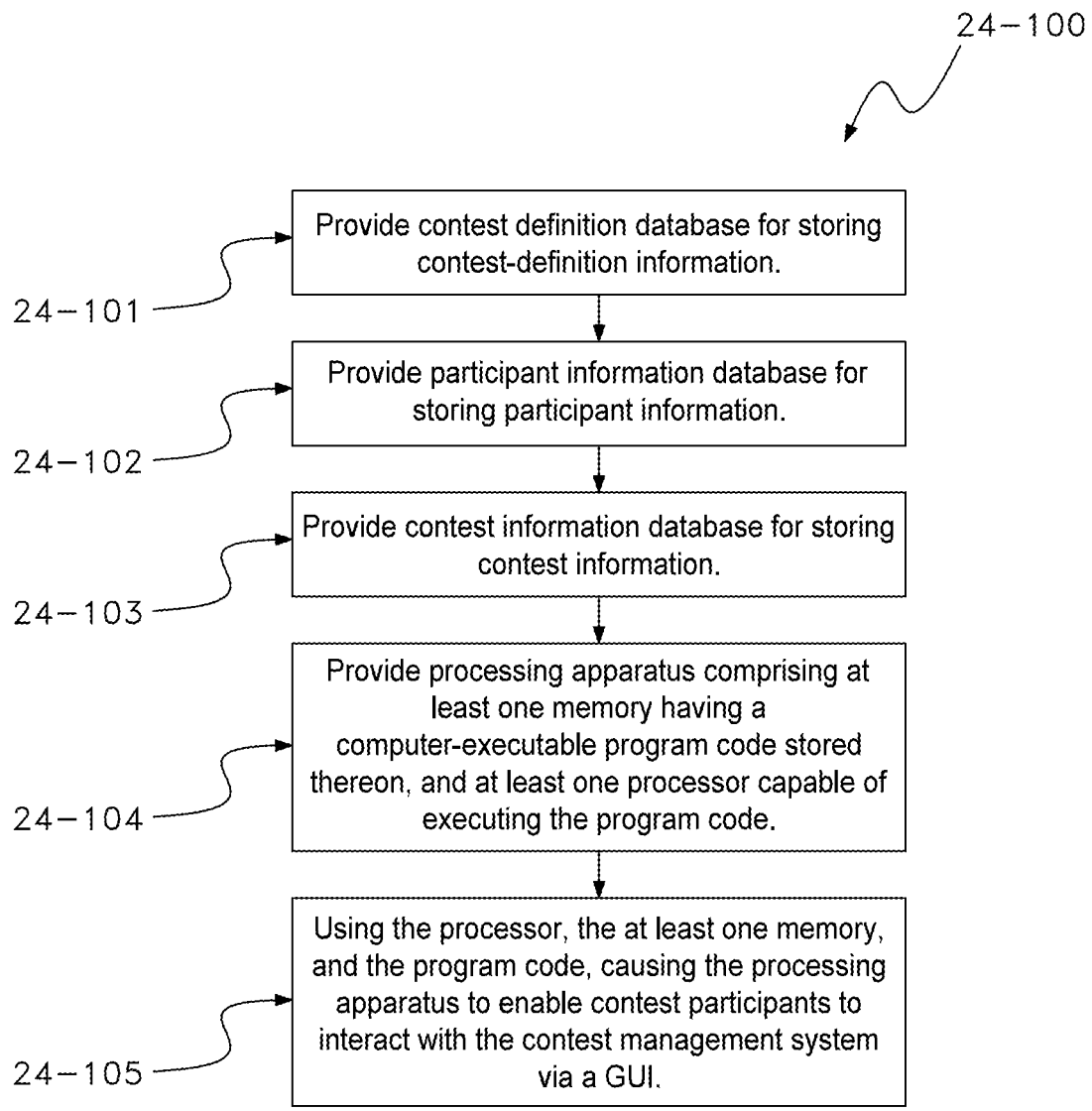
FIG. 25 is a flow chart depicting a method that is in keeping with the invention.

FIG. 25 is a flow chart depicting a method 24-100 that is in keeping with the invention. Method 24-100 may comprise providing 24-101 a contest definition database for storing contest-definition information. The method 24-100 may comprise providing 24-101 a participant information database for storing participant information. The method 24-100 may comprise providing 24-102 a contest information database for storing contest information. The method 24-100 may comprise providing 24-104 a processing apparatus comprising at least one memory having computer-executable program code stored thereon, and at least one processor capable of executing the program code. The method 24-100 may comprise using 24-105 the processor, the at least one memory, and the program code, causing the processing apparatus to enable contest participants to interact with the contest management system via a graphical user interface (GUI), the GUI being configured by a contest organizer to provide contest configuration information to contest participants, and enable contest participants to participate in the contest via a participant device (such as a cell phone or computer controlled by a participant); receive configuration information provided by the contest organizer via a device (such as a computer controlled by the organizer) associated with the contest organizer; and store the configuration information in the contest definition database. The configuration information may be provided to contest participants via the GUI in the form of a grid having rows and columns, each intersection of one of the rows with one of the columns forming a box, wherein participants are able to select one or more of the boxes in order to participate in the contest, and wherein each column is associated with a Name of a real-world sports player or sports team, and each row is associated with a Name of a real-world sports player or sports team, and wherein each Name is associated prior to boxes being selected by participants.

As part of executing the method 24-100, the configuration information, which may be provided to contest participants via the GUI, may include one or more wildcards not displayed via the grid, and which may be selected by a participant that has selected a box from the grid, or a wildcard may be assigned to a particular box. Each of the wildcard options may correspond to a real-world sports player or group of real-world sports players that is not among the Names associated with the rows or columns of the grid, and contest participants are able to select or are assigned at least one of the one or more wildcard options as part of participating in the contest.

Having provided details of the invention, the following statements may be viewed as summarizing some of the aspects of the invention described above.

Statement A1 ("SA1"). A fantasy sports contest comprising a grid having rows and columns, each intersection of one or the rows with one of the columns forming a box, wherein participants are able to select one or more of the boxes in order to participate in the contest, and wherein each column is associated with a Name of a real-world sports player or sports team, and each row is associated with a Name of a real-world sports player or sports team, and wherein each Name is associated prior to boxes being selected by participants.

Statement A2 ("SA2"). The fantasy sports contest according to SA1, further comprising a scoring system which correlates performances of the sports players or sports teams to fantasy points, the scoring system being used to determine how many fantasy points should be assigned to each row (the "row fantasy points") and how many fantasy points should be assigned to each column (the "column fantasy points") of the grid.

Statement A3 ("SA3"). The fantasy sports contest according to SA2, further comprising determining a cumulative number of fantasy points for each box by mathematically combining the row fantasy points with the column fantasy points.

Statement A4 ("SA4"). The fantasy sports contest according to S3, wherein the cumulative number is determined by adding or multiplying the row fantasy points for a particular one of the boxes to the column fantasy points for that particular one of the boxes.

Statement A5 ("SA5"). The fantasy sports contest according to any of SA1 through SA4, wherein at least one milestone is identified, the milestone being a preselected goal that may be achieved by the players or teams, and when a milestone is achieved by one of the players or teams, at least one of the participants receives a prize.

Statement SA6 ("SA6"). The fantasy sports contest according to any of SA1 through SA4, wherein at least one milestone is identified, the milestone being a preselected goal that may be achieved by the players or teams, and when a milestone is achieved by one of the players or teams, at least one of the participants receives milestone-points, and the milestone-points are used to determine one or more winners from among the participants.

Statement A7 ("SA7"). The fantasy sports contest according to any of SA1 through SA4, wherein at least one milestone is identified, the milestone being a preselected goal that may be achieved by the players or teams, and when a milestone is achieved by one of the players or teams, the contest ends.

Statement A8 ("SA8"). The fantasy sports contest according to any of SA1 through SA7 wherein:
at least three Names are associated with the grid;
a first one of the Names is associated with a first of the rows; and
a second one of the Names is associated with a first of the columns.

Statement A9 ("SA9"). The fantasy sports contest according to any of SA1 through SA7, wherein the boxes are square.

Statement A10 ("SA10"). The fantasy sports contest according to any of SA1 through SA7, wherein the boxes are not square.

Statement A11 ("SA11"). The fantasy sports contest according to any of SA1 through SA10, wherein there are a plurality of grids, each grid corresponding to a particular fantasy sports contest, and each grid is displayed to resemble a different side of a three dimensional object.

Statement A12 ("SA12"). The fantasy sports contest according to SA11, wherein a first one of the grids has columns that correspond to rows of a second one of the grids so that at least some of the Names of the corresponding columns and rows are the same.

With reference to FIG. 9, the following "B" statements describe a contest management system that is in keeping with the invention.

Statement B1 ("SB1"). A contest management system, for determining and managing contests that are available to participants, the contest management system comprising:
a contest definition database for storing contest-definition information;
a participant information database for storing participant information;
a contest information database for storing contest information; and
a processing apparatus comprising at least one non-transitory memory having computer-executable program code stored thereon, and at least one processor capable of executing the program code, wherein the processor, the at least one non-transitory memory, and the program code are configured to cause the apparatus to:
enable contest participants to interact with the contest management system via a graphical user interface (GUI), the GUI being configured by a contest organizer to provide contest configuration information to contest participants, and enable contest participants to participate in the contest via a participant device;
receive configuration information provided by the contest organizer via a device associated with the contest organizer;
store the configuration information in the contest definition database;
wherein the configuration information is provided to contest participants via the GUI in the form of a grid having rows and columns, each intersection of one or the rows with one of the columns forming a box, wherein participants are able to select one or more of the boxes in order to participate in the contest, and wherein each column is associated with a Name of a real-world sports player or sports team, and each row is associated with a Name of a real-world sports player or sports team, and wherein each Name is associated prior to boxes being selected by participants.

Statement B2 ("SB2"). The contest management system of SB1, wherein:
the contest information includes a scoring system which correlates performances of the sports players or sports teams to fantasy points, the scoring system being used to determine how many fantasy points should be assigned to each row (the "row fantasy points") and how many fantasy points should be assigned to each column (the "column fantasy points") of the grid; and the computer-executable program code causes the processing apparatus to determine:
  the row fantasy points and the column fantasy points according to the scoring system; and
  a cumulative number of fantasy points for each box by mathematically combining the row fantasy points with the column fantasy points for each box.

Statement B3 ("SB3"). The contest management system of SB2, wherein for each box the cumulative number is determined by adding or multiplying the row fantasy points for the box to the column fantasy points for the box.

Statement B4 ("SB4"). The contest management system of any one of SB1 through SB3, wherein at least one milestone is identified, the milestone being a preselected goal that may be achieved by the players or teams, and when the milestone is achieved by one of the players or teams, the processing apparatus indicates at least one of the participants will receive a prize.

Statement B5 ("SB5"). The contest management system of any one of SB1 through SB3, wherein at least one milestone is identified, the milestone being a preselected goal that may be achieved by the players or teams, and when the milestone is achieved by one of the players or teams, at least one of the participants receives milestone-points, and the milestone-points are used to determine one or more winners from among the participants.

Statement B6 ("SB6"). The contest management system of any one of SB1 through SB3, wherein at least one milestone is identified, the milestone being a preselected goal that may be achieved by the players or teams, and when the milestone is achieved by one of the players or teams, the contest ends.

Statement B7 ("SB7"). The contest management system of any one of SB1 through SB6 wherein the grid has two or more columns and one row, or two or more rows and one column. In one example of such a system, three Names are associated with the grid;
  a first one of the Names is associated with a row;
  a second one of the Names is associated with a column; and
  a third one of the Names is associated with a different row or different column, as the case may be.

Statement B8 ("SB8"). The contest management system of any one of SB1 through SB7, wherein the boxes are square.

Statement B9 ("SB9"). The contest management system of any one of SB1 through SB9, wherein the boxes are not square.

Statement B10 ("SB10"). The contest management system of any one of SB1 through SB9, wherein there are a plurality of grids, each grid corresponding to a particular fantasy sports contest, and each grid is displayed via the GUI to resemble a different side of a three dimensional object.

Statement B11 ("SB11"). The contest management system of SB10, wherein a first one of the grids has columns that correspond to rows of a second one of the grids so that at least some of the Names of the corresponding columns and rows are the same.

With reference to FIG. 10, the following "C" statements describe a contest management computer program product that is in keeping with the invention.

Statement C1 ("SC1"). A contest management computer program product for determining and managing contests that are available to participants, the computer program product comprising at least one non-transitory computer-readable storage medium having computer-executable program code instructions stored therein, the computer-executable program code instructions comprising program code instructions for:
  accessing a contest definition database for storing contest-definition information;
  accessing a participant information database for storing participant information;
  accessing a contest information database for storing contest information; and
  causing a processing apparatus having at least one processor capable of executing the program code to:
    enable contest participants to interact with a contest management system via a graphical user interface (the "GUI"), the GUI being configured by a contest organizer to provide contest configuration information to contest participants, and enable contest participants to participate in the contest via a participant device;
    receive configuration information provided by the contest organizer via a device associated with the contest organizer;
    store the configuration information in the contest definition database;
  wherein the configuration information is provided to contest participants via the GUI in the form of a grid having rows and columns, each intersection of one or the rows with one of the columns forming a box, wherein participants are able to select one or more of the boxes in order to participate in the contest, and wherein each column is associated with a Name of a real-world sports player or sports team, and each row is associated with a Name of a real-world sports player or sports team, and wherein each Name is associated prior to boxes being selected by participants.

Statement C2 ("SC2"). The contest management computer program product of SC1, wherein:
  the contest information includes a scoring system which correlates performances of the sports players or sports teams to fantasy points, the scoring system being used to determine how many fantasy points should be assigned to each row (the "row fantasy points") and how many fantasy points should be assigned to each column (the "column fantasy points") of the grid; and
  the program code causes the processing apparatus to determine:
    the row fantasy points and the column fantasy points according to the scoring system; and
    a cumulative number of fantasy points for each box by mathematically combining the row fantasy points with the column fantasy points for each box.

Statement C3 ("SC3"). The contest management computer program product of SC2, wherein for each box the cumulative number is determined by adding or multiplying the row fantasy points for the box to the column fantasy points for the box.

Statement C4 ("SC4"). The contest management computer program product of any one of SC1 through SC3, wherein the program code causes the processing apparatus to allow the contest organizer to identify at least one milestone, the milestone being a preselected goal that may be achieved by the players or teams, and when the milestone is achieved by one of the players or teams, the program code causes the processing apparatus to indicate at least one of the participants will receive a prize.

Statement C5 ("SC5"). The contest management computer program product of any one of SC1 through SC3, wherein the program code causes the processing apparatus to allow the contest organizer to identify at least one milestone, the milestone being a preselected goal that may be achieved by the players or teams, and when the milestone is achieved by one of the players or teams, the program code causes the processing apparatus to allocate milestone-points to at least one of the participants, and use the milestone-points to determine one or more winners from among the participants.

Statement C6 ("SC6"). The contest management computer product of any one of SC1 through SC3, wherein the program code causes the processing apparatus to allow the contest organizer to identify at least one milestone, the milestone being a preselected goal that may be achieved by the players or teams, and when the milestone is achieved by one of the players or teams, the program code causes the processing apparatus to end the contest.

Statement C7 ("SC7"). The contest management computer product of any one of SC1 through SC6 wherein the grid has two or more columns and one row, or two or more rows and one column. In one example of such a product, three Names are associated with the grid;
a first one of the Names is associated with a row;
a second one of the Names is associated with a column; and
a third one of the Names is associated with a different row or different column, as the case may be.

Statement C8 ("SC8"). The contest management computer product of any one of SC1 through SC7, wherein the boxes are square.

Statement C9 ("SC9"). The contest management computer product of any one of SC1 through SC7, wherein the boxes are not square.

Statement C10 ("SC10"). The contest management computer product of any one of SC1 through SC9, wherein the configuration information is provided in the form of a plurality of grids, each grid corresponding to a particular fantasy sports contest, and each grid is provided via the GUI to resemble a different side of a three dimensional object.

Statement C11 ("SC11"). The contest management computer product of SC10, wherein a first one of the grids has columns that correspond to rows of a second one of the grids so that at least some of the Names of the corresponding columns and rows are the same.

With reference to FIG. 11, the following "D" statements describe a method that is in keeping with the invention.

Statement D1 ("SD1"). A computer-implemented method to carry out a contest, the method comprising:
providing a contest definition database for storing contest-definition information;
providing a participant information database for storing participant information;
providing a contest information database for storing contest information;
providing a processing apparatus comprising at least one non-transitory memory having computer-executable program code stored thereon, and at least one processor capable of executing the program code;
using the processor, the at least one non-transitory memory, and the program code, causing the processing apparatus to:
enable contest participants to interact with the contest management system via a graphical user interface (GUI), the GUI being configured by a contest organizer to provide contest configuration information to contest participants, and enable contest participants to participate in the contest via a participant device;
receive configuration information provided by the contest organizer via a device associated with the contest organizer;
store the configuration information in the contest definition database;
wherein the configuration information is provided to contest participants via the GUI in the form of a grid having rows and columns, each intersection of one or the rows with one of the columns forming a box, wherein participants are able to select one or more of the boxes in order to participate in the contest, and wherein each column is associated with a Name of a real-world sports player or sports team, and each row is associated with a Name of a real-world sports player or sports team, and wherein each Name is associated prior to boxes being selected by participants.

Statement D2 ("SD2"). The method of SD1, wherein:
the contest information includes a scoring system which correlates performances of the sports players or sports teams to fantasy points, the scoring system being used to determine how many fantasy points should be assigned to each row (the "row fantasy points") and how many fantasy points should be assigned to each column (the "column fantasy points") of the grid; and
the program code causes the processing apparatus to determine:
the row fantasy points and the column fantasy points according to the scoring system; and
a cumulative number of fantasy points for each box by mathematically combining the row fantasy points with the column fantasy points for each box.

Statement D3 ("SD3"). The method of SD2, wherein for each box the cumulative number is determined by adding or multiplying the row fantasy points for the box to the column fantasy points for the box.

Statement D4 ("SD4"). The method of any one of SD1 through SD3, wherein the program code causes the processing apparatus to allow the contest organizer to identify at least one milestone, the milestone being a preselected goal that may be achieved by the players or teams, and when the milestone is achieved by one of the players or teams, the program code causes the processing apparatus to indicate at least one of the participants will receive a prize.

Statement D5 ("SD5"). The method of any one of SD1 through SD3, wherein the program code causes the processing apparatus to allow the contest organizer to identify at least one milestone, the milestone being a preselected goal that may be achieved by the players or teams, and when the milestone is achieved by one of the players or teams, the program code causes the processing apparatus to allocate milestone-points to at least one of the participants, and use the milestone-points to determine one or more winners from among the participants.

Statement D6 ("SD6"). The method of any one of SD1 through SD3, wherein the program code causes the processing apparatus to allow the contest organizer to identify at least one milestone, the milestone being a preselected goal that may be achieved by the players or teams, and when the milestone is achieved by one of the players or teams, the program code causes the processing apparatus to end the contest.

Statement D7 ("SD7"). The method of any one of SC1 through SC6 wherein the grid has two or more columns and one row, or two or more rows and one column. In one example of such a method, three Names are associated with the grid;
a first one of the Names is associated with a row;
a second one of the Names is associated with a column; and
a third one of the Names is associated with a different row or different column, as the case may be.

Statement D8 ("SD8"). The method of any one of SD1 through SD7, wherein the boxes are square.

Statement D9 ("SD9"). The method of any one of SD1 through SD7, wherein the boxes are not square.

Statement D10 ("SD10"). The method of any one of SD1 through SD9, wherein the configuration information is provided in the form of a plurality of grids, each grid corresponding to a particular fantasy sports contest, and each grid is provided via the GUI to resemble a different side of a three dimensional object.

Statement D1 ("SD11"). The method of SD10, wherein a first one of the grids has columns that correspond to rows of a second one of the grids so that at least some of the Names of the corresponding columns and rows are the same.

With reference to FIG. 23, the following "E" statements describe a contest management system that is in keeping with the invention.

Statement E1 ("SE1"). A contest management system for determining and managing contests that are available to one or more participants, the contest management system comprising:
a non-transitory memory storing contest-definition information and providing a contest definition database;
a non-transitory memory storing participant information and providing a participant information database; and
a processing apparatus comprising at least one non-transitory memory having computer-executable program code stored thereon, and at least one processor capable of executing the program code, wherein the processor, the at least one non-transitory memory, and the program code are configured to cause the processing apparatus to:
enable contest participants to interact with the contest management system via a graphical user interface (GUI), the GUI being configured by a contest organizer to provide contest configuration information to contest participants, and enable contest participants to participate in the contest via a participant device;
receive the contest configuration information; and
store the contest configuration information in the contest definition database;
wherein the contest configuration information is provided via the GUI to contest participants identified in the participant information database, and the GUI displays;
(a) a grid having rows and columns, each intersection of one of the rows with one of the columns forming a box, wherein contest participants are able to select one or more of the boxes in order to participate in the contest, and wherein each column is associated with a Name of a real-world sports player or sports team, and each row is associated with a Name of a real-world sports player or sports team, and wherein each Name is associated prior to boxes being selected by the contest participants; and
(b) one or more wildcard options not displayed via the grid, each of the wildcard options corresponding to a real-world sports player or group of real-world sports players that is not among the Names associated with the rows or columns of the grid, and contest participants are able to select or are assigned at least one of the one or more wildcard options as part of participating in the contest.

Statement E2 ("SE2"). The contest management system of SE1, wherein:
the contest-definition information includes a scoring system which correlates performances of the sports players or sports teams to fantasy points, the scoring system being used to determine how many fantasy points should be assigned to each row (the "row fantasy points") and how many fantasy points should be assigned to each column (the "column fantasy points") of the grid, and how many fantasy points should be assigned to the one or more wildcard options; and
the computer-executable program code causes the processing apparatus to:
determine the row fantasy points, the column fantasy points, and the wildcard fantasy points according to the scoring system; and
determine a cumulative number of fantasy points for each box by mathematically combining the row fantasy points with the column fantasy points for each box; and
determine a cumulative number of fantasy points for a participant by mathematically combining the cumulative number of fantasy points for a box selected by one of the participants with the wildcard fantasy points for the wildcard option selected by the one of the participants; and
store contest-results information in a non-transitory memory, the contest-results information comprising the cumulative number of fantasy points for each participant.

Statement E3 ("SE3"). The contest management system of SE2, wherein for each box the cumulative number is determined by adding or multiplying the row fantasy points for the box to the column fantasy points for the box, and the cumulative number of fantasy points for a participant is determined by adding or multiplying the cumulative number of fantasy points for a box selected by the one of the participants with the wildcard fantasy points for the wild card option selected by the one of the participants.

Statement E4 ("SE4"). The contest management system of SE1, wherein wildcard options displayed in response to selecting a particular box are different from wildcard options displayed in response to selecting another of the boxes.

Statement E5 ("SE5"). The contest management system of SE1, wherein each box has a wildcard option assigned to it, and the participant selecting a box has no independent choice of the wildcard separate and apart from the box.

Statement E6 ("SE6"). The contest management system of SE1, wherein the program code causes the processing apparatus to allow only one of the participants to select a particular P(s)aoT(s) box.

Statement E7 ("SE7"). The contest management system of SE1, wherein the program code causes the processing apparatus to allow more than one of the participants to select a particular P(s)aoT(s) box.

Statement E8 ("SE8"). The contest management system of SE7, wherein the program code causes the processing apparatus to identify participants that selected a particular P(s)aoT(s) box, and then require those participants to select different wildcard options.

Statement E9 ("SE9"). The contest management system of SE7, wherein the program code causes the processing apparatus to allow participants that selected a particular P(s)aoT(s) box, and allow those participants to select the same wildcard option.

Statement E10 ("SE10"). The contest management system of SE1 wherein the grid has:
two or more columns and one row; or
two or more rows and one column.

Statement E11 ("SE11"). The contest management system of SE1, wherein each participant is permitted to select more than one P(s)aoT(s) box and at least one wildcard option, and a cumulative number of fantasy points are determined for the participant by mathematically combining the cumulative number of fantasy points of the selected combination of P(s)aoT(s) boxes and the selected wildcard options.

Statement E12 ("SE12"). The contest management system of SE11, wherein each box has a wildcard option assigned to it, and the participant selecting a box has no independent choice of the wildcard separate and apart from the box.

Statement E13 ("SE13"). The contest management system of SE11, wherein participants in a contest are permitted to select the same P(s)aoT(s) boxes, but those participants must select different wild card option(s).

Statement E14 ("SE14"). The contest management system of SE11, wherein participants in a contest are permitted to select the same P(s)aoT(s) boxes, and those participants selecting the same P(s)aoT(s) boxes are permitted to select the same wild card option(s).

Statement E15 ("SE15"). The contest management system of SE11, wherein no two participants in a contest are permitted to select the same combination of P(s)aoT(s) boxes, and wildcard options for at least two of the P(s)aoT(s) boxes are the same.

Statement E16 ("SE16"). The contest management system of SE11, wherein no two participants in a contest are permitted to select the same combination of P(s)aoT(s) boxes, and wildcard options for at least two of the P(s)aoT(s) boxes are not the same.

Statement E17 ("SE17"). The contest management system of SE11, wherein a participant may select more than one P(s)aoT(s) box provided that no two of the selected P(s)aoT(s) boxes are from the same row of the grid.

Statement E18 ("SE18"). The contest management system of SE11, wherein a participant may select more than one P(s)aoT(s) box provided that no two of the selected P(s)aoT(s) boxes are from the same column of the grid.

Statement E19 ("SE19"). The contest management system of SE11, wherein a participant may select more than one P(s)aoT(s) box, and the selected P(s)aoT(s) boxes may be from the same column of the grid.

Statement E20 ("S20"). The contest management system of SE11, wherein a participant may select more than one P(s)aoT(s) box, and the selected P(s)aoT(s) boxes may be from the same row of the grid.

Statement E21 ("SE21"). The contest management system of SE11, wherein P(s)aoT(s) boxes selected by a particular participant are from a particular row of the grid.

Statement E22 ("S22"). The contest management system of SE11, wherein P(s)aoT(s) boxes selected by a particular participant are from a particular column of the grid.

Statement E23 ("SE23"). The contest management system of SE11, wherein P(s)aoT(s) boxes selected by a particular participant must be from different rows of the grid.

Statement E24 ("SE24"). The contest management system of SE11, wherein P(s)aoT(s) boxes selected by a particular participant must be from different columns of the grid.

Statement E25 ("S25"). The contest management system of SE1, wherein each participant is permitted to select a P(s)aoT(s) box and a wildcard option.

Statement E26 ("S26"). The contest management system of SE25, wherein participants in a contest are not permitted to select a combination of P(s)aoT(s) box and wildcard option that is the same combination selected by another participant.

Statement E27 ("S27"). The contest management system of SE1, wherein a plurality of grids are provided, each grid corresponding to a particular fantasy sports contest, and each grid is displayed via the GUI to resemble a different side of a three dimensional object.

Statement E28 ("SE28"). The contest management system of SE27, wherein a first one of the grids has columns that correspond to rows of a second one of the grids so that at least some of the Names of the corresponding columns and rows are the same.

With reference to FIG. 24, the following "F" statements describe a contest management computer program product that is in keeping with the invention.

Statement F29 ("SF29"). A contest management computer program product for determining and managing contests that are available to participants, the computer program product comprising at least one non-transitory computer-readable storage medium having computer-executable program code instructions stored therein, the computer-executable program code instructions comprising program code instructions for:
accessing a non-transitory memory contest definition database that stores contest-definition information;
accessing a non-transitory memory participant information database that stores participant information; and
causing a processing apparatus having at least one processor capable of executing the program code to:
enable contest participants to interact with a contest management system via a graphical user interface (the "GUI"), the GUI being configured by a contest organizer to provide contest configuration information to contest participants, and enable contest participants to participate in the contest via a participant device;

receive configuration information provided by the contest organizer via a device associated with the contest organizer; and store the configuration information in the contest definition database;

wherein the configuration information is provided via the GUI to contest participants identified in the participant information database, and the GUI displays;

(a) a grid having rows and columns, each intersection of one of the rows with one of the columns forming a box, wherein contest participants are able to select one or more of the boxes in order to participate in the contest, and wherein each column is associated with a Name of a real-world sports player or sports team, and each row is associated with a Name of a real-world sports player or sports team, and wherein each Name is associated prior to boxes being selected by contest participants; and (b) one or more wildcard options not displayed via the grid, each of the wildcard options corresponding to a real-world sports player or group of real-world sports players that is not among the Names associated with the rows or columns of the grid, and contest participants are able to select or are assigned at least one of the one or more wildcard options as part of participating in the contest.

Statement F30 ("SF30"). The contest management computer program product of SF29, wherein:

the contest-definition information includes a scoring system which correlates performances of the sports players or sports teams to fantasy points, the scoring system being used to determine how many fantasy points should be assigned to each row (the "row fantasy points") and how many fantasy points should be assigned to each column (the "column fantasy points") of the grid, and how many fantasy points should be assigned to the one or more wildcard options; and the program code causes the processing apparatus to:

determine the row fantasy points, the column fantasy points, and the wildcard fantasy points according to the scoring system; and determine a cumulative number of fantasy points for each box by mathematically combining the row fantasy points with the column fantasy points for each box; and determine a cumulative number of fantasy points for a participant by mathematically combining the cumulative number of fantasy points for a box selected by one of the participants with the wildcard fantasy points for the wildcard option selected by the one of the participants; and store contest-results information in a non-transitory memory, the contest-results information comprising the cumulative number of fantasy points for each participant.

Statement F31 ("SF31"). The contest management computer program product of SF30, wherein for each box the cumulative number is determined by adding or multiplying the row fantasy points for the box to the column fantasy points for the box, and the cumulative number of fantasy points for a participant is determined by adding or multiplying the cumulative number of fantasy points for a box selected by the one of the participants with the wildcard fantasy points for the wild card option selected by the one of the participants.

Statement F32 ("SF32"). The contest management computer program product of SF29, wherein the program code causes the processing apparatus to display wildcard options in response to selecting a particular box that are different from wildcard options displayed in response to selecting another of the boxes.

Statement F33 ("SF33"). The contest management computer program product of SF29, wherein each box has a wildcard option assigned to it, and the participant selecting a box has no independent choice of the wildcard separate and apart from the box.

Statement F34 ("SF34"). The contest management computer program product of SF29, wherein the program code causes the processing apparatus to allow only one of the participants to select a particular P(s)aoT(s) box.

Statement F35 ("SF35"). The contest management computer program product of SF29, wherein the program code causes the processing apparatus to allow more than one of the participants to select a particular P(s)aoT(s) box.

Statement F36 ("SF36"). The contest management computer program product of SF35, wherein the program code causes the processing apparatus to identify participants that selected a particular P(s)aoT(s) box, and then require those participants to select different wildcard options.

Statement F37 ("SF37"). The contest management computer program product of SF35, wherein the program code causes the processing apparatus to allow participants that selected a particular P(s)aoT(s) box, and allow those participants to select the same wildcard option.

Statement F38 ("SF38"). The contest management program product of SF29, wherein the grid has:
two or more columns and one row; or
two or more rows and one column.

Statement F39 ("SF39"). The contest management computer program product of SF29, wherein each participant is permitted to select more than one P(s)aoT(s) box and at least one wildcard option, and a cumulative number of fantasy points are determined for the participant by mathematically combining the cumulative number of fantasy points of the selected combination of P(s)aoT(s) boxes and the selected wildcard options.

Statement F40 ("SF40"). The contest management computer program product of SF39, wherein each box has a wildcard option assigned to it, and the participant selecting a box has no independent choice of the wildcard separate and apart from the box.

Statement F41 ("SF41"). The contest management computer program product of SF39, wherein participants in a contest are permitted to select the same P(s)aoT(s) boxes, but those participants must select different wild card option(s).

Statement F42 ("SF42"). The contest management computer program product of SF39, wherein participants in a contest are permitted to select the same P(s)aoT(s) boxes, and those participants selecting the same P(s)aoT(s) boxes are permitted to select the same wild card option(s).

Statement F43 ("SF43"). The contest management computer program product of SF39, wherein no two participants in a contest are permitted to select the same combination of P(s)aoT(s) boxes, and wildcard options for at least two of the P(s)aoT(s) boxes are the same.

Statement F44 ("SF44"). The contest management computer program product of SF39, wherein no two participants in a contest are permitted to select the same combination of P(s)aoT(s) boxes, and wildcard options for at least two of the P(s)aoT(s) boxes are not the same.

Statement F45 ("SF45"). The contest management computer program product of SF39, wherein a participant may select more than one P(s)aoT(s) box provided that no two of the selected P(s)aoT(s) boxes are from the same row of the grid.

Statement F46 ("SF46"). The contest management computer program product of SF39, wherein a participant may select more than one P(s)aoT(s) box provided that no two of the selected P(s)aoT(s) boxes are from the same column of the grid.

Statement F47 ("SF47"). The contest management computer program product of SF39, wherein a participant may select more than one P(s)aoT(s) box, and the selected P(s)aoT(s) boxes may be from the same column of the grid.

Statement F48 ("SF48"). The contest management computer program product of SF39, wherein a participant may select more than one P(s)aoT(s) box, and the selected P(s)aoT(s) boxes may be from the same row of the grid.

Statement F49 ("SF49"). The contest management computer program product of SF39, wherein P(s)aoT(s) boxes selected by a particular participant are from a particular row of the grid.

Statement F50 ("SF50"). The contest management computer program product of SF39, wherein P(s)aoT(s) boxes selected by a particular participant are from a particular column of the grid.

Statement F51 ("SF51"). The contest management computer program product of SF39, wherein P(s)aoT(s) boxes selected by a particular participant must be from different rows of the grid.

Statement F52 ("SF52"). The contest management computer program product of SF39, wherein P(s)aoT(s) boxes selected by a particular participant must be from different columns of the grid.

Statement F53 ("SF53"). The contest management computer program product of SF29, wherein each participant is permitted to select a P(s)aoT(s) box and a wildcard option.

Statement F54 ("SF54"). The contest management computer program product of SF53, wherein participants in a contest are not permitted to select a combination of P(s)aoT(s) box and wildcard option that is the same combination selected by another participant.

Statement F55 ("SF55"). The contest management computer program product of SF29, wherein a plurality of grids are provided, each grid corresponding to a particular fantasy sports contest, and each grid is displayed via the GUI to resemble a different side of a three dimensional object.

Statement F56 ("SF56"). The contest management computer program product of SF55, wherein a first one of the grids has columns that correspond to rows of a second one of the grids so that at least some of the Names of the corresponding columns and rows are the same.

With reference to FIG. 25, the following "G" statements describe a method that is in keeping with the invention.

Statement G57 ("SG57"). A computer-implemented method to carry out a contest, the method comprising:
providing a non-transitory memory storing contest-definition information and providing a contest definition database;
providing a non-transitory memory storing participant information and providing a participant information database; and
providing a processing apparatus comprising at least one non-transitory memory having computer-executable program code stored thereon, and at least one processor capable of executing the program code;
using the processor, the at least one non-transitory memory, and the program code, causing the processing apparatus to:
enable contest participants to interact with the contest management system via a graphical user interface (GUI), the GUI being configured by a contest organizer to provide contest configuration information to contest participants, and enable contest participants to participate in the contest via a participant device;
receive contest configuration information provided by the contest organizer;
store the contest configuration information in the contest definition database;
provide the configuration information via the GUI to contest participants identified in the participant information database, and the GUI displays:
(a) a grid having rows and columns, each intersection of one or the rows with one of the columns forming a box, wherein contest participants are able to select one or more of the boxes in order to participate in the contest, and wherein each column is associated with a Name of a real-world sports player or sports team, and each row is associated with a Name of a real-world sports player or sports team, and wherein each Name is associated prior to boxes being selected by the contest participants; and
(b) one or more wildcard options not displayed via the grid, each of the wildcard options corresponding to a real-world sports player or group of real-world sports players that is not among the Names associated with the rows or columns of the grid, and contest participants are able to select at least one of the one or more wildcard options as part of participating in the contest.

Statement G58 ("SG58"). The method of SG57, wherein:
the contest-definition information includes a scoring system which correlates performances of the sports players or sports teams to fantasy points, the scoring system being used to determine how many fantasy points should be assigned to each row (the "row fantasy points") and how many fantasy points should be assigned to each column (the "column fantasy points") of the grid, and how many fantasy points should be assigned to the one or more wildcard options; and
the computer-executable program code causes the processing apparatus to:

determine the row fantasy points, the column fantasy points, and the wildcard fantasy points according to the scoring system; and determine a cumulative number of fantasy points for each box by mathematically combining the row fantasy points with the column fantasy points for each box; and determine a cumulative number of fantasy points for a participant by mathematically combining the cumulative number of fantasy points for a box selected by one of the participants with the wildcard fantasy points for the wildcard option selected by that one of the participants;

store contest-results information in a non-transitory memory, the contest-results information comprising the cumulative number of fantasy points for each participant.

Statement G59 ("SG59"). The method of SG58, wherein for each box program code causes the processing apparatus to:
(a) determine the cumulative number by adding or multiplying the row fantasy points for the box to the column fantasy points for the box, and
(b) determine the cumulative number of fantasy points for a participant by adding or multiplying the cumulative number of fantasy points for a box selected by the one of the participants with the wildcard fantasy points for the wild card option selected by that one of the participants.

Statement G60 ("SG60"). The method of SG57, wherein wildcard options are displayed in response to selecting a particular box, and the displayed wildcard options are different from wildcard options displayed in response to selecting another of the boxes.

Statement G61 ("SG61"). The method of SG57, wherein each box has a wildcard option assigned to it, and the participant selecting a box has no independent choice of the wildcard separate and apart from the box.

Statement G62 ("SG62"). The method of SG57, wherein the program code causes the processing apparatus to allow only one of the participants to select a particular P(s)aoT(s) box.

Statement G63 ("SG63"). The method of SG57, wherein the program code causes the processing apparatus to allow more than one of the participants to select a particular P(s)aoT(s) box.

Statement G64 ("SG64"). The method of SG63, wherein the program code causes the processing apparatus to identify participants that selected a particular P(s)aoT(s) box, and then require those participants to select different wildcard options.

Statement G65 ("SG65"). The method of SG63, wherein the program code causes the processing apparatus to allow participants that selected a particular P(s)aoT(s) box, and allow those participants to select the same wildcard option.

Statement G66 ("SG66"). The method of SG57, wherein the program code causes the processing apparatus to provide the grid to have:
two or more columns and one row; or
two or more rows and one column.

Statement G67 ("SG67"). The method of SG57, wherein each participant is permitted to select more than one P(s)aoT(s) box and at least one wildcard option, and a cumulative number of fantasy points are determined for the participant by mathematically combining the cumulative number of fantasy points of the selected combination of P(s)aoT(s) boxes and the selected wildcard options.

Statement G68 ("SG68"). The method of SG67, wherein each box has a wildcard option assigned to it, and the participant selecting a box has no independent choice of the wildcard separate and apart from the box.

Statement G69 ("SG69"). The method of SG67, wherein participants in a contest are permitted to select the same P(s)aoT(s) boxes, but those participants must select different wild card option(s).

Statement G70 ("SG70"). The method of SG67, wherein participants in a contest are permitted to select the same P(s)aoT(s) boxes, and those participants selecting the same P(s)aoT(s) boxes are permitted to select the same wild card option(s).

Statement G71 ("SG71"). The method of SG67, wherein no two participants in a contest are permitted to select the same combination of P(s)aoT(s) boxes, and wildcard options for at least two of the P(s)aoT(s) boxes are the same.

Statement G72 ("SG72"). The method of SG67, wherein no two participants in a contest are permitted to select the same combination of P(s)aoT(s) boxes, and wildcard options for at least two of the P(s)aoT(s) boxes are not the same.

Statement G73 ("SG73"). The method of SG67, wherein a participant may select more than one P(s)aoT(s) box provided that no two of the selected P(s)aoT(s) boxes are from the same row of the grid.

Statement G74 ("SG74"). The method of SG67, wherein a participant may select more than one P(s)aoT(s) box provided that no two of the selected P(s)aoT(s) boxes are from the same column of the grid.

Statement G75 ("SG75"). The method of SG67, wherein a participant may select more than one P(s)aoT(s) box, and the selected P(s)aoT(s) boxes may be from the same column of the grid.

Statement G76 ("SG76"). The method of SG67, wherein a participant may select more than one P(s)aoT(s) box, and the selected P(s)aoT(s) boxes may be from the same row of the grid.

Statement G77 ("SG77"). The method of SG67, wherein P(s)aoT(s) boxes selected by a particular participant are from a particular row of the grid.

Statement G78 ("SG78"). The method of SG67, wherein P(s)aoT(s) boxes selected by a particular participant are from a particular column of the grid.

Statement G79 ("SG79"). The method of SG67, wherein P(s)aoT(s) boxes selected by a particular participant must be from different rows of the grid.

Statement G80 ("SG80"). The method of SG67, wherein P(s)aoT(s) boxes selected by a particular participant must be from different columns of the grid.

Statement G81 ("SG81"). The method of SG67, wherein each participant is permitted to select a P(s)aoT(s) box and a wildcard option.

Statement G82 ("SG82"). The method of SG81, wherein participants in a contest are not permitted to select a combination of P(s)aoT(s) box and wildcard option that is the same combination selected by another participant.

Statement G83 ("SG83"). The method of SG77, wherein a plurality of grids are provided, each grid corresponding to a particular fantasy sports contest, and each grid is displayed via the GUI to resemble a different side of a three dimensional object.

49

Statement G84 ("SG84"). The method of SG83, wherein a first one of the grids has columns that correspond to rows of a second one of the grids so that at least some of the Names of the corresponding columns and rows are the same.

Figure 26:
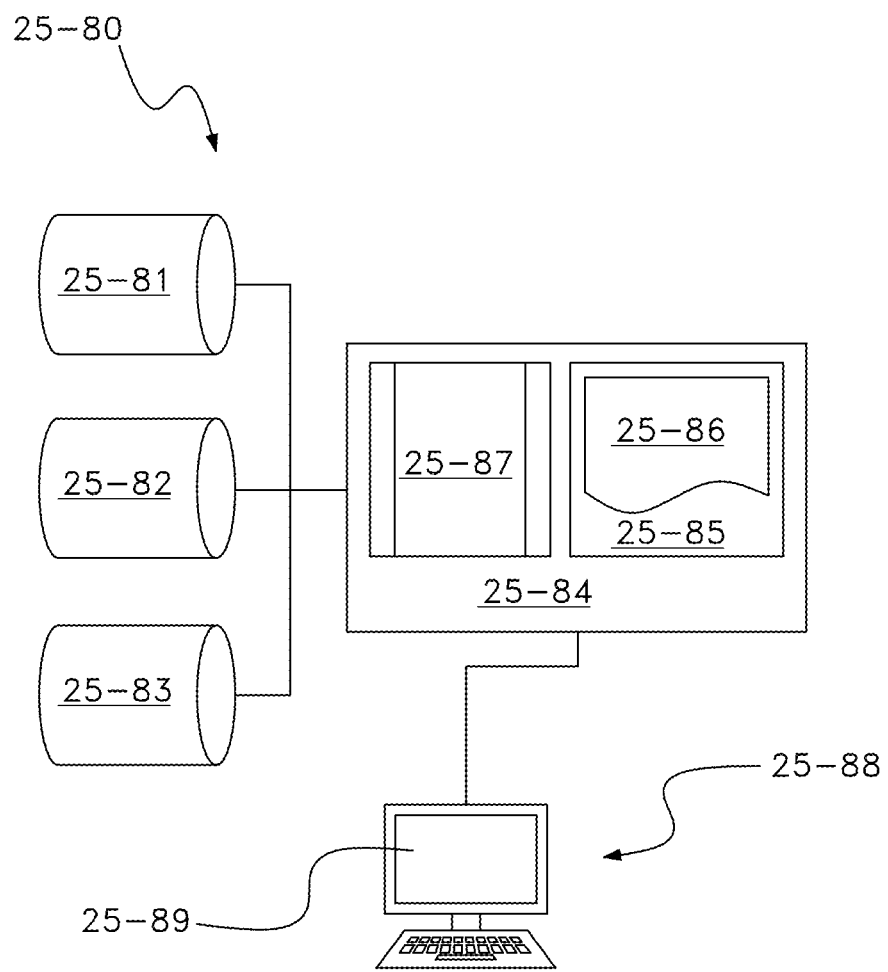
FIG. 26 depicts a contest management system that is in keeping with the invention.

With reference to FIG. 26, the following "H" statements describe a contest management system that is in keeping with the invention.

Statement H85 ("SH85"). A contest management system for determining and managing contests that are available to one or more participants, the contest management system comprising:
- a non-transitory memory storing contest-definition information and providing a contest definition database;
- a non-transitory memory storing participant information and providing a participant information database; and
- a processing apparatus comprising at least one non-transitory memory having computer-executable program code stored thereon, and at least one processor capable of executing the program code, wherein the processor, the at least one non-transitory memory, and the program code are configured to cause the processing apparatus to:
  - enable contest participants to interact with the contest management system via a graphical user interface (GUI), the GUI being configured by a contest organizer to provide contest configuration information to contest participants, and enable contest participants to participate in the contest via a participant device;
  - receive the contest configuration information; and
  - store the contest configuration information in the contest definition database;
  - wherein the contest configuration information is provided via the GUI to contest participants identified in the participant information database, and the GUI displays a grid having rows and columns, each intersection of one of the rows with one of the columns forming a box, wherein contest participants are able to select or are assigned one or more of the boxes in order to participate in the contest, and wherein each column is associated with a Name of a real-world sports player or sports team, and each row is associated with a Name of a real-world sports player or sports team, and wherein each Name is associated prior to boxes being selected by the contest participants.

Statement H86 ("SH86"). The contest management system of SH85, wherein more than one participant is permitted to select a particular box.

Statement H87 ("SH87"). The contest management system of SH85, wherein participants are required to select different boxes.

Statement H88 ("SH88"). The contest management system of SH85, wherein each participant is permitted to select more than one P(s)aoT(s) box, and a cumulative number of fantasy points are determined for the participant by mathematically combining the cumulative number of fantasy points of the selected combination of P(s)aoT(s) boxes.

Statement H89 ("SH89"). The contest management system of SH88, wherein the P(s)aoT(s) boxes selected by a particular participant are from a particular row of the grid.

50

Statement H90 ("SH90"). The contest management system of SH88, wherein the P(s)aoT(s) boxes selected by a particular participant are from a particular column of the grid.

Statement H91 ("SH91"). The contest management system of SH88, wherein the P(s)aoT(s) boxes selected by a particular participant must be from different rows of the grid.

Statement H92 ("SH92"). The contest management system of SH88, wherein the P(s)aoT(s) boxes selected by a particular participant must be from different columns of the grid.

With reference to FIG. 9, the following "I" statements describe a contest management system that is in keeping with the invention.

Statement I1 ("SI1"). A contest management system for determining and managing contests that are available to one or more participants, the contest management system comprising:
- a contest definition database for storing contest-definition information;
- a participant information database for storing participant information;
- a contest information database for storing contest information; and
- a processing apparatus comprising at least one non-transitory memory having computer-executable program code stored thereon, and at least one processor capable of executing the program code, wherein the processor, the at least one non-transitory memory, and the program code are configured to cause the processing apparatus to:
  - enable contest participants to interact with the contest management system via a graphical user interface (GUI), the GUI being configured by a contest organizer to provide contest configuration information to contest participants, and enable contest participants to participate in the contest via a participant device;
  - receive configuration information provided by the contest organizer via a device associated with the contest organizer; and
  - store the configuration information in the contest definition database;
  - wherein the configuration information is provided to contest participants via the GUI in the form of a grid having rows and columns, each intersection of one or the rows with one of the columns forming a box, wherein participants are able to select one or more of the boxes in order to participate in the contest, and wherein each column is associated with a Name of a real-world sports player or sports team, and each row is associated with a Name of a real-world sports player or sports team, and wherein each Name is associated prior to boxes being selected by participants; and
  - wherein at least one milestone is identified, the milestone being a preselected goal that may be achieved by the players or teams, and when the milestone is achieved by one of the players or teams, one or more of the following occur:
    - (a) the processing apparatus indicates at least one of the participants will receive a prize;

(b) at least one of the participants receives milestone-points, and the milestone-points are used to determine one or more winners from among the participants;

(c) the contest ends.

Statement I2 ("SI2"). The contest management system of SI1, wherein:

the contest information includes a scoring system which correlates performances of the sports players or sports teams to fantasy points, the scoring system being used to determine how many fantasy points should be assigned to each row (the "row fantasy points") and how many fantasy points should be assigned to each column (the "column fantasy points") of the grid; and the processing apparatus determines:

the row fantasy points and the column fantasy points according to the scoring system; and a cumulative number of fantasy points for each box by mathematically combining the row fantasy points with the column fantasy points for each box.

Statement I3 ("SI3"). The contest management system of SI2, wherein for each box the cumulative number is determined by adding or multiplying the row fantasy points for the box to the column fantasy points for the box.

Statement I4 ("SI4"). The contest management system of SI1, wherein the grid has:

two or more columns and one row; or two or more rows and one column.

Statement I5 ("SI5"). The contest management system of SI1, wherein the boxes are square.

Statement I6 ("SI6"). The contest management system of SI1, wherein the boxes are not square.

Statement I7 ("SI7"). The contest management system of SI1, wherein there are a plurality of grids, each grid corresponding to a particular fantasy sports contest, and each grid is displayed via the GUI to resemble a different side of a three dimensional object.

Statement I8 ("SI8"). The contest management system of SI7, wherein a first one of the grids has columns that correspond to rows of a second one of the grids so that at least some of the Names of the corresponding columns and rows are the same.

With reference to FIG. 10, the following "J" statements describe a contest management computer program product that is in keeping with the invention.

Statement J9 ("SJ9"). A contest management computer program product for determining and managing contests that are available to participants, the computer program product comprising at least one non-transitory computer-readable storage medium having computer-executable program code instructions stored therein, the computer-executable program code instructions comprising program code instructions for:

accessing a contest definition database for storing contest-definition information;

accessing a participant information database for storing participant information;

accessing a contest information database for storing contest information; and causing a processing apparatus having at least one processor capable of executing the program code to:

enable contest participants to interact with a contest management system via a graphical user interface (the "GUI"), the GUI being configured by a contest organizer to provide contest configuration information to contest participants, and enable contest participants to participate in the contest via a participant device;

receive configuration information provided by the contest organizer via a device associated with the contest organizer; and store the configuration information in the contest definition database;

wherein the configuration information is provided to contest participants via the GUI in the form of a grid having rows and columns, each intersection of one or the rows with one of the columns forming a box, wherein participants are able to select one or more of the boxes in order to participate in the contest, and wherein each column is associated with a Name of a real-world sports player or sports team, and each row is associated with a Name of a real-world sports player or sports team, and wherein each Name is associated prior to boxes being selected by participants; and wherein at least one milestone is identified, the milestone being a preselected goal that may be achieved by the players or teams, and when the milestone is achieved by one of the players or teams, one or more of the following occur:

(a) the processing apparatus indicates at least one of the participants will receive a prize;

(b) at least one of the participants receives milestone-points, and the milestone-points are used to determine one or more winners from among the participants;

(c) the contest ends.

Statement J10 ("SJ10"). The contest management computer program product of SJ9, wherein:

the contest information includes a scoring system which correlates performances of the sports players or sports teams to fantasy points, the scoring system being used to determine how many fantasy points should be assigned to each row (the "row fantasy points") and how many fantasy points should be assigned to each column (the "column fantasy points") of the grid; and the program code causes the processing apparatus to determine:

the row fantasy points and the column fantasy points according to the scoring system; and a cumulative number of fantasy points for each box by mathematically combining the row fantasy points with the column fantasy points for each box.

Statement J11 ("SJ11"). The contest management computer program product of SJ10, wherein for each box the cumulative number is determined by adding or multiplying the row fantasy points for the box to the column fantasy points for the box.

Statement J12 ("SJ12"). The contest management computer product of SJ9, wherein the grid has:

two or more columns and one row; or two or more rows and one column.

Statement J13 ("SJ13"). The contest management computer product of SJ9, wherein the boxes are square.

Statement J14 ("SJ14"). The contest management computer product of SJ9, wherein the boxes are not square.

Statement J15 ("SJ15"). The contest management computer product of SJ9, wherein the configuration information is provided in the form of a plurality of grids, each grid corresponding to a particular fantasy sports contest, and each grid is provided via the GUI to resemble a different side of a three-dimensional object.

Statement J16 ("SJ16"). The contest management computer product of SJ15, wherein a first one of the grids has columns that correspond to rows of a second one of the grids so that at least some of the Names of the corresponding columns and rows are the same.

Figure 27A:
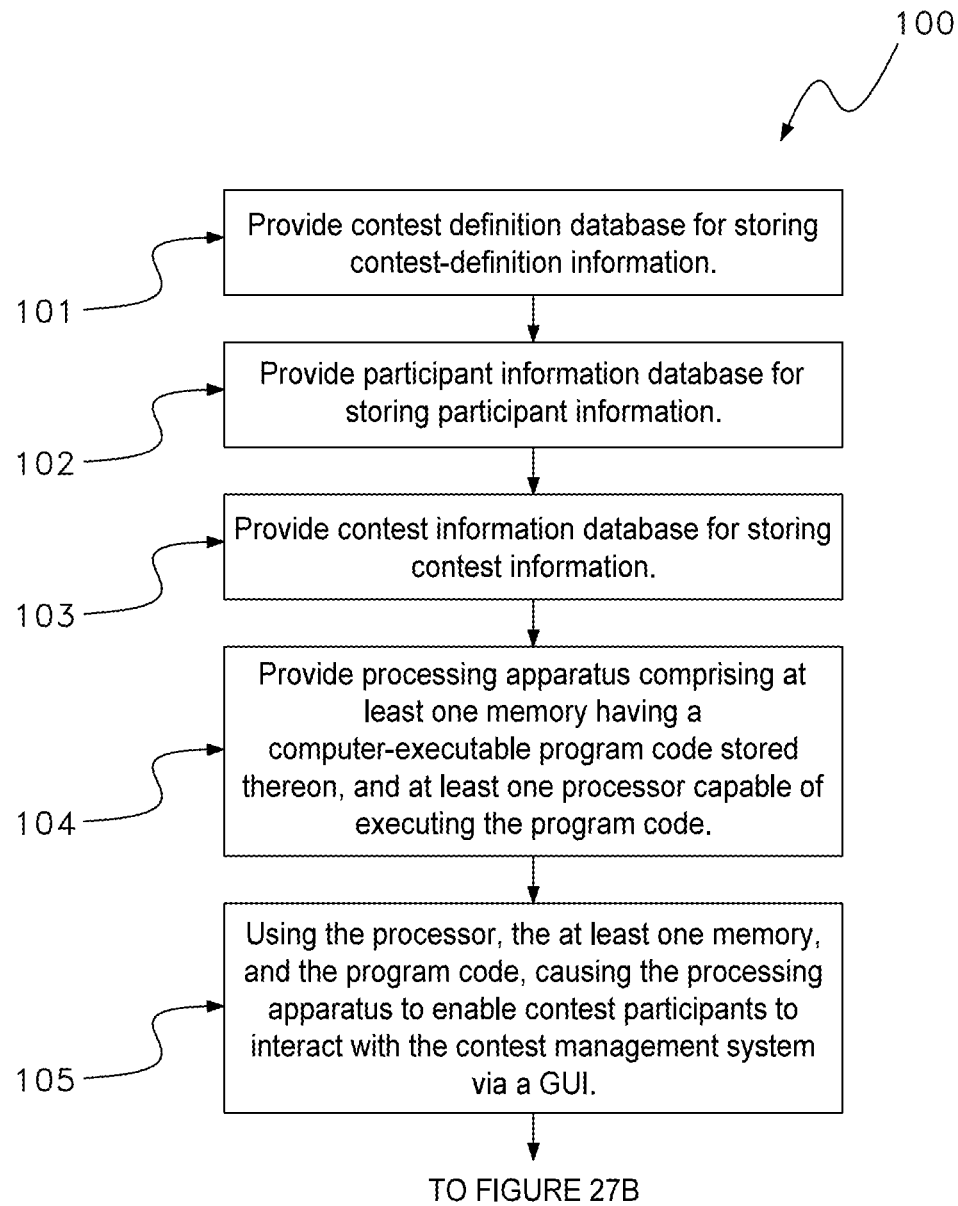
FIGS. 27A and 27B are a flow chart depicting a method that is in keeping with the invention.
Figure 27B:
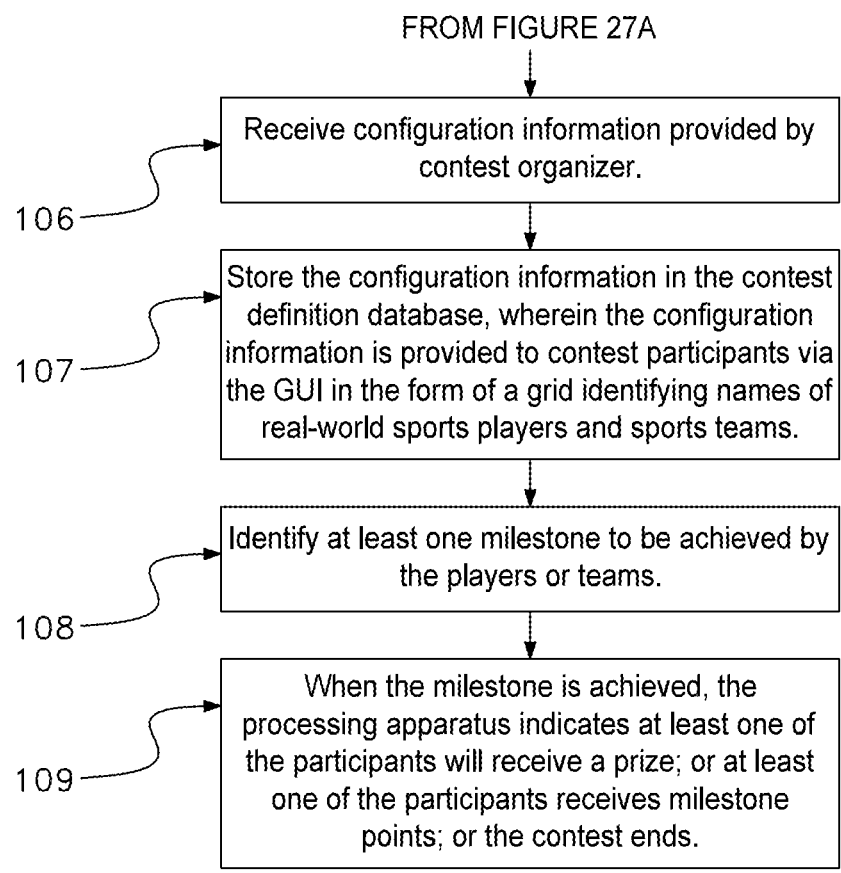

With reference to FIGS. 27A and 27B, the following "K" statements describe a computer-implemented method to carry out a contest that is in keeping with the invention.

Statement K17 ("SK17"). A computer-implemented method to carry out a contest, the method comprising:
providing a contest definition database for storing contest-definition information;
providing a participant information database for storing participant information;
providing a contest information database for storing contest information;
providing a processing apparatus comprising at least one non-transitory memory having computer-executable program code stored thereon, and at least one processor capable of executing the program code;
using the processor, at least one non-transitory memory, and the program code, causing the processing apparatus to:
enable contest participants to interact with the contest management system via a graphical user interface (GUI), the GUI being configured by a contest organizer to provide contest configuration information to contest participants, and enable contest participants to participate in the contest via a participant device;
receive configuration information provided by the contest organizer via a device associated with the contest organizer;
store the configuration information in the contest definition database;
wherein the configuration information is provided to contest participants via the GUI in the form of a grid having rows and columns, each intersection of one of the rows with one of the columns forming a box, wherein participants are able to select one or more of the boxes in order to participate in the contest, and wherein each column is associated with a Name of a real-world sports player or sports team, and each row is associated with a Name of a real-world sports player or sports team, and wherein each Name is associated prior to boxes being selected by participants; and
identifying at least one milestone, the milestone being a preselected goal that may be achieved by the players or teams, and when the milestone is achieved by one of the players or teams, one or more of the following occur:
(a) the processing apparatus indicates at least one of the participants will receive a prize;
(b) at least one of the participants receives milestone-points, and the milestone-points are used to determine one or more winners from among the participants;
(c) the contest ends.

Statement K18 ("SK18"). The method of SK17, wherein:
the contest information includes a scoring system which correlates performances of the sports players or sports teams to fantasy points, the scoring system being used to determine how many fantasy points should be assigned to each row (the "row fantasy points") and how many fantasy points should be assigned to each column (the "column fantasy points") of the grid; and
the program code causes the processing apparatus to determine:
the row fantasy points and the column fantasy points according to the scoring system; and
a cumulative number of fantasy points for each box by mathematically combining the row fantasy points with the column fantasy points for each box.

Statement K19 ("SK19"). The method of SK18, wherein for each box the cumulative number is determined by adding or multiplying the row fantasy points for the box to the column fantasy points for the box.

Statement K20 ("SK20"). The method of SK17, wherein the grid has:
two or more columns and one row; or
two or more rows and one column.

Statement K21 ("SK21"). The method of SK17, wherein the boxes are square.

Statement K22 ("SK22"). The method of SK17, wherein the boxes are not square.

Statement K23 ("SK23"). The method of SK17, wherein the configuration information is provided in the form of a plurality of grids, each grid corresponding to a particular fantasy sports contest, and each grid is provided via the GUI to resemble a different side of a three-dimensional object.

Statement K24 ("SK24"). The method of SK23, wherein a first one of the grids has columns that correspond to rows of a second one of the grids so that at least some of the Names of the corresponding columns and rows are the same.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof

What is claimed is:

1. A contest management system for determining and managing contests that are available to one or more participants, the contest management system comprising:
a contest definition database for storing contest-definition information;
a participant information database for storing participant information;
a contest information database for storing contest information; and
a processing apparatus comprising at least one non-transitory memory having computer-executable program code stored thereon, and at least one processor capable of executing the program code, wherein the processor, the at least one non-transitory memory, and the program code are configured to cause the processing apparatus to:
enable contest participants to interact with the contest management system via a graphical user interface (GUI), the GUI being configured by a contest organizer to provide contest configuration information to contest participants, and enable contest participants to participate in the contest via a participant device;

receive configuration information provided by the contest organizer via a device associated with the contest organizer; and store the configuration information in the contest definition database;

wherein the configuration information is provided to contest participants via the GUI in the form of a grid having rows and columns, each intersection of one or the rows with one of the columns forming a box, wherein participants are able to select one or more of the boxes in order to participate in the contest, and wherein each column is associated with a Name of a real-world sports player or sports team, and each row is associated with a Name of a real-world sports player or sports team, and wherein each Name is associated prior to boxes being selected by participants;

wherein at least one milestone is identified, the milestone being a preselected goal that may be achieved by the players or teams, and when the milestone is achieved by one of the players or teams, one or more of the following occur:

(a) the processing apparatus indicates at least one of the participants will receive a prize;

(b) at least one of the participants receives milestone-points, and the milestone-points are used to determine one or more winners from among the participants;

(c) the contest ends; and wherein the contest information includes a scoring system which correlates performances of the sports players or sports teams to fantasy points, the scoring system being used to determine how many fantasy points should be assigned to each row (the "row fantasy points") and how many fantasy points should be assigned to each column (the "column fantasy points") of the grid; and the processing apparatus determines:
the row fantasy points and the column fantasy points according to the scoring system; and
a cumulative number of fantasy points for each box by mathematically combining the row fantasy points with the column fantasy points for each box.

2. The contest management system of claim 1, wherein for each box the cumulative number is determined by adding or multiplying the row fantasy points for the box to the column fantasy points for the box.

3. The contest management system of claim 1, wherein the grid has:
two or more columns and one row; or
two or more rows and one column.

4. The contest management system of claim 1, wherein the boxes are square.

5. The contest management system of claim 1, wherein the boxes are not square.

6. The contest management system of claim 1, wherein there are a plurality of grids, each grid corresponding to a particular fantasy sports contest, and each grid is displayed via the GUI to resemble a different side of a three dimensional object.

7. The contest management system of claim 6, wherein a first one of the grids has columns that correspond to rows of a second one of the grids so that at least some of the Names of the corresponding columns and rows are the same.

8. A contest management computer program product for determining and managing contests that are available to participants, the computer program product comprising at least one non-transitory computer-readable storage medium having computer-executable program code instructions stored therein, the computer-executable program code instructions comprising program code instructions for:

accessing a contest definition database for storing contest-definition information;

accessing a participant information database for storing participant information;

accessing a contest information database for storing contest information; and causing a processing apparatus having at least one processor capable of executing the program code to:

enable contest participants to interact with a contest management system via a graphical user interface (the "GUI"), the GUI being configured by a contest organizer to provide contest configuration information to contest participants, and enable contest participants to participate in the contest via a participant device;

receive configuration information provided by the contest organizer via a device associated with the contest organizer; and store the configuration information in the contest definition database;

wherein the configuration information is provided to contest participants via the GUI in the form of a grid having rows and columns, each intersection of one or the rows with one of the columns forming a box, wherein participants are able to select one or more of the boxes in order to participate in the contest, and wherein each column is associated with a Name of a real-world sports player or sports team, and each row is associated with a Name of a real-world sports player or sports team, and wherein each Name is associated prior to boxes being selected by participants;

wherein at least one milestone is identified, the milestone being a preselected goal that may be achieved by the players or teams, and when the milestone is achieved by one of the players or teams, one or more of the following occur:

(a) the processing apparatus indicates at least one of the participants will receive a prize;

(b) at least one of the participants receives milestone-points, and the milestone-points are used to determine one or more winners from among the participants;

(c) the contest ends; and wherein the contest information includes a scoring system which correlates performances of the sports players or sports teams to fantasy points, the scoring system being used to determine how many fantasy points should be assigned to each row (the "row fantasy points") and how many fantasy points should be assigned to each column (the "column fantasy points") of the grid; and the program code causes the processing apparatus to determine:
the row fantasy points and the column fantasy points according to the scoring system; and
a cumulative number of fantasy points for each box by mathematically combining the row fantasy points with the column fantasy points for each box.

9. The contest management computer program product of claim 8, wherein for each box the cumulative number is determined by adding or multiplying the row fantasy points for the box to the column fantasy points for the box.

10. The contest management computer product of claim 8, wherein the grid has:
two or more columns and one row; or
two or more rows and one column.

11. The contest management computer product of claim 8, wherein the boxes are square.

12. The contest management computer product of claim 8, wherein the boxes are not square.

13. The contest management computer product of claim 8, wherein the configuration information is provided in the form of a plurality of grids, each grid corresponding to a particular fantasy sports contest, and each grid is provided via the GUI to resemble a different side of a three-dimensional object.

14. The contest management computer product of claim 13, wherein a first one of the grids has columns that correspond to rows of a second one of the grids so that at least some of the Names of the corresponding columns and rows are the same.

15. A computer-implemented method to carry out a contest, the method comprising:
providing a contest definition database for storing contest-definition information;
providing a participant information database for storing participant information;
providing a contest information database for storing contest information;
providing a processing apparatus comprising at least one non-transitory memory having computer-executable program code stored thereon, and at least one processor capable of executing the program code;
using the processor, the at least one non-transitory memory, and the program code, causing the processing apparatus to:
enable contest participants to interact with the contest management system via a graphical user interface (GUI), the GUI being configured by a contest organizer to provide contest configuration information to contest participants, and enable contest participants to participate in the contest via a participant device;
receive configuration information provided by the contest organizer via a device associated with the contest organizer;
store the configuration information in the contest definition database;
wherein the configuration information is provided to contest participants via the GUI in the form of a grid having rows and columns, each intersection of one or the rows with one of the columns forming a box, wherein participants are able to select one or more of the boxes in order to participate in the contest, and wherein each column is associated with a Name of a real-world sports player or sports team, and each row is associated with a Name of a real-world sports player or sports team, and wherein each Name is associated prior to boxes being selected by participants; and
identifying at least one milestone, the milestone being a preselected goal that may be achieved by the players or teams, and when the milestone is achieved by one of the players or teams, one or more of the following occur:
(a) the processing apparatus indicates at least one of the participants will receive a prize;
(b) at least one of the participants receives milestone-points, and the milestone-points are used to determine one or more winners from among the participants;
(c) the contest ends;
wherein the contest information includes a scoring system which correlates performances of the sports players or sports teams to fantasy points, the scoring system being used to determine how many fantasy points should be assigned to each row (the "row fantasy points") and how many fantasy points should be assigned to each column (the "column fantasy points") of the grid; and
the program code causes the processing apparatus to determine:
the row fantasy points and the column fantasy points according to the scoring system; and
a cumulative number of fantasy points for each box by mathematically combining the row fantasy points with the column fantasy points for each box.

16. The method of claim 15, wherein for each box the cumulative number is determined by adding or multiplying the row fantasy points for the box to the column fantasy points for the box.

17. The method of claim 15, wherein the grid has:
two or more columns and one row; or
two or more rows and one column.

18. The method of claim 15, wherein the boxes are square.

19. The method of claim 15, wherein the boxes are not square.

20. The method of claim 15, wherein the configuration information is provided in the form of a plurality of grids, each grid corresponding to a particular fantasy sports contest, and each grid is provided via the GUI to resemble a different side of a three-dimensional object.

21. The method of claim 20, wherein a first one of the grids has columns that correspond to rows of a second one of the grids so that at least some of the Names of the corresponding columns and rows are the same.

22. A contest management system for determining and managing contests that are available to one or more participants, the contest management system comprising:
a contest definition database for storing contest-definition information;
a participant information database for storing participant information;
a contest information database for storing contest information; and
a processing apparatus comprising at least one non-transitory memory having computer-executable program code stored thereon, and at least one processor capable of executing the program code, wherein the processor, the at least one non-transitory memory, and the program code are configured to cause the processing apparatus to:
enable contest participants to interact with the contest management system via a graphical user interface (GUI), the GUI being configured by a contest organizer to provide contest configuration information to contest participants, and enable contest participants to participate in the contest via a participant device;
receive configuration information provided by the contest organizer via a device associated with the contest organizer; and
store the configuration information in the contest definition database;

wherein the configuration information is provided to contest participants via the GUI in the form of a grid having rows and columns, each intersection of one or the rows with one of the columns forming a box, wherein participants are able to select one or more of the boxes in order to participate in the contest, and wherein each column is associated with a Name of a real-world sports player or sports team, and each row is associated with a Name of a real-world sports player or sports team, and wherein each Name is associated prior to boxes being selected by participants;

wherein at least one milestone is identified, the milestone being a preselected goal that may be achieved by the players or teams, and when the milestone is achieved by one of the players or teams, one or more of the following occur:
(a) the processing apparatus indicates at least one of the participants will receive a prize;
(b) at least one of the participants receives milestone-points, and the milestone-points are used to determine one or more winners from among the participants;
(c) the contest ends; and wherein there are a plurality of grids, each grid corresponding to a particular fantasy sports contest, and each grid is displayed via the GUI to resemble a different side of a three dimensional object.

23. The contest management system of claim 22, wherein:
the contest information includes a scoring system which correlates performances of the sports players or sports teams to fantasy points, the scoring system being used to determine how many fantasy points should be assigned to each row (the "row fantasy points") and how many fantasy points should be assigned to each column (the "column fantasy points") of the grid; and
the processing apparatus determines:
the row fantasy points and the column fantasy points according to the scoring system; and
a cumulative number of fantasy points for each box by mathematically combining the row fantasy points with the column fantasy points for each box.

24. The contest management system of claim 23, wherein for each box the cumulative number is determined by adding or multiplying the row fantasy points for the box to the column fantasy points for the box.

25. The contest management system of claim 22, wherein the grid has:
two or more columns and one row; or
two or more rows and one column.

26. The contest management system of claim 22, wherein the boxes are square.

27. The contest management system of claim 22, wherein the boxes are not square.

28. The contest management system of claim 22, wherein a first one of the grids has columns that correspond to rows of a second one of the grids so that at least some of the Names of the corresponding columns and rows are the same.

29. A contest management computer program product for determining and managing contests that are available to participants, the computer program product comprising at least one non-transitory computer-readable storage medium having computer-executable program code instructions stored therein, the computer-executable program code instructions comprising program code instructions for:
accessing a contest definition database for storing contest-definition information;
accessing a participant information database for storing participant information;
accessing a contest information database for storing contest information; and
causing a processing apparatus having at least one processor capable of executing the program code to:
enable contest participants to interact with a contest management system via a graphical user interface (the "GUI"), the GUI being configured by a contest organizer to provide contest configuration information to contest participants, and enable contest participants to participate in the contest via a participant device;
receive configuration information provided by the contest organizer via a device associated with the contest organizer; and
store the configuration information in the contest definition database;
wherein the configuration information is provided to contest participants via the GUI in the form of a grid having rows and columns, each intersection of one or the rows with one of the columns forming a box, wherein participants are able to select one or more of the boxes in order to participate in the contest, and wherein each column is associated with a Name of a real-world sports player or sports team, and each row is associated with a Name of a real-world sports player or sports team, and wherein each Name is associated prior to boxes being selected by participants;

wherein at least one milestone is identified, the milestone being a preselected goal that may be achieved by the players or teams, and when the milestone is achieved by one of the players or teams, one or more of the following occur:
(a) the processing apparatus indicates at least one of the participants will receive a prize;
(b) at least one of the participants receives milestone-points, and the milestone-points are used to determine one or more winners from among the participants;
(c) the contest ends; and wherein the configuration information is provided in the form of a plurality of grids, each grid corresponding to a particular fantasy sports contest, and each grid is provided via the GUI to resemble a different side of a three-dimensional object.

30. The contest management computer program product of claim 29, wherein:
the contest information includes a scoring system which correlates performances of the sports players or sports teams to fantasy points, the scoring system being used to determine how many fantasy points should be assigned to each row (the "row fantasy points") and how many fantasy points should be assigned to each column (the "column fantasy points") of the grid; and
the program code causes the processing apparatus to determine:
the row fantasy points and the column fantasy points according to the scoring system; and
a cumulative number of fantasy points for each box by mathematically combining the row fantasy points with the column fantasy points for each box.

31. The contest management computer program product of claim 30, wherein for each box the cumulative number is determined by adding or multiplying the row fantasy points for the box to the column fantasy points for the box.

32. The contest management computer product of claim 29, wherein the grid has:
two or more columns and one row; or
two or more rows and one column.

33. The contest management computer product of claim 29, wherein the boxes are square.

34. The contest management computer product of claim 29, wherein the boxes are not square.

35. The contest management computer product of claim 29, wherein a first one of the grids has columns that correspond to rows of a second one of the grids so that at least some of the Names of the corresponding columns and rows are the same.

36. A computer-implemented method to carry out a contest, the method comprising:
providing a contest definition database for storing contest-definition information;
providing a participant information database for storing participant information;
providing a contest information database for storing contest information;
providing a processing apparatus comprising at least one non-transitory memory having computer-executable program code stored thereon, and at least one processor capable of executing the program code;
using the processor, the at least one non-transitory memory, and the program code, causing the processing apparatus to:
enable contest participants to interact with the contest management system via a graphical user interface (GUI), the GUI being configured by a contest organizer to provide contest configuration information to contest participants, and enable contest participants to participate in the contest via a participant device;
receive configuration information provided by the contest organizer via a device associated with the contest organizer;
store the configuration information in the contest definition database;
wherein the configuration information is provided to contest participants via the GUI in the form of a grid having rows and columns, each intersection of one or the rows with one of the columns forming a box, wherein participants are able to select one or more of the boxes in order to participate in the contest, and wherein each column is associated with a Name of a real-world sports player or sports team, and each row is associated with a Name of a real-world sports player or sports team, and wherein each Name is associated prior to boxes being selected by participants;
wherein the configuration information is provided in the form of a plurality of grids, each grid corresponding to a particular fantasy sports contest, and each grid is provided via the GUI to resemble a different side of a three-dimensional object; and
identifying at least one milestone, the milestone being a preselected goal that may be achieved by the players or teams, and when the milestone is achieved by one of the players or teams, one or more of the following occur:
(a) the processing apparatus indicates at least one of the participants will receive a prize;
(b) at least one of the participants receives milestone-points, and the milestone-points are used to determine one or more winners from among the participants;
(c) the contest ends.

37. The method of claim 36, wherein:
the contest information includes a scoring system which correlates performances of the sports players or sports teams to fantasy points, the scoring system being used to determine how many fantasy points should be assigned to each row (the "row fantasy points") and how many fantasy points should be assigned to each column (the "column fantasy points") of the grid; and
the program code causes the processing apparatus to determine:
the row fantasy points and the column fantasy points according to the scoring system; and
a cumulative number of fantasy points for each box by mathematically combining the row fantasy points with the column fantasy points for each box.

38. The method of claim 37, wherein for each box the cumulative number is determined by adding or multiplying the row fantasy points for the box to the column fantasy points for the box.

39. The method of claim 36, wherein the grid has:
two or more columns and one row; or
two or more rows and one column.

40. The method of claim 36, wherein the boxes are square.

41. The method of claim 36, wherein the boxes are not square.

42. The method of claim 36, wherein a first one of the grids has columns that correspond to rows of a second one of the grids so that at least some of the Names of the corresponding columns and rows are the same.

* * * * *